United States Patent
Ray et al.

(10) Patent No.: US 10,896,294 B2
(45) Date of Patent: Jan. 19, 2021

(54) SCRIPT WRITING AND CONTENT GENERATION TOOLS AND IMPROVED OPERATION OF SAME

(71) Applicant: RivetAI, Inc., Culver City, CA (US)

(72) Inventors: Debajyoti Ray, Culver City, CA (US); Andrew Kortschak, Culver City, CA (US); Walter Kortschak, Culver City, CA (US)

(73) Assignee: END CUE, LLC, Culver City, CA (US)

( * ) Notice: Subject to any disclaimer, the term of this patent is extended or adjusted under 35 U.S.C. 154(b) by 66 days.

(21) Appl. No.: 16/244,967

(22) Filed: Jan. 10, 2019

(65) Prior Publication Data

US 2019/0213253 A1    Jul. 11, 2019

Related U.S. Application Data

(60) Provisional application No. 62/616,364, filed on Jan. 11, 2018.

(51) Int. Cl.
*G06F 40/289*    (2020.01)
*G06F 16/35*    (2019.01)
(Continued)

(52) U.S. Cl.
CPC .......... *G06F 40/289* (2020.01); *G06F 16/353* (2019.01); *G06N 3/0454* (2013.01);
(Continued)

(58) Field of Classification Search
CPC .............................. G06F 40/30; G06F 40/289
See application file for complete search history.

(56) References Cited

U.S. PATENT DOCUMENTS 5,604,855 A    2/1997 Crawford
7,027,974 B1    4/2006 Busch et al.
(Continued)

FOREIGN PATENT DOCUMENTS

EP    3012776 A1    4/2016
WO    01/50668 A2    7/2001
(Continued)

OTHER PUBLICATIONS

Tsai et al., "Scene-Based Movie Summarization Via Role-Community Networks" IEEE Transactions on Circuits and Systems for Video Technology, vol. 23, No. 11, Nov. 2013, p. 1927-1940. (Year: 2013).*

(Continued)

*Primary Examiner* — Amelia L Tapp
(74) *Attorney, Agent, or Firm* — Cozen O'Connor

(57) ABSTRACT

In various embodiments, the system provides input to and facilitates various operations of media production. An automated script content generator uses recurrent artificial neural networks trained using machine learning on a corpus of stories or scripts to generate and suggest script content and indicates effects changes to the script would have of the scenes, characters, interactions and other entities of the script. An automated producer breaks down the script to automatically generate storyboards, calendars, schedules and budgets and provides this as input to the pre-production operation within a media production environment. The system also provides information to affect and facilitate the greenlighting operation and other operations in the media production environment in an iterative script review and revision process.

23 Claims, 36 Drawing Sheets

(51) Int. Cl.
- *G06Q 30/02* (2012.01)
- *G06N 20/00* (2019.01)
- *G06N 3/08* (2006.01)
- *G06N 3/04* (2006.01)
- *G06N 5/04* (2006.01)

(52) U.S. Cl.
CPC ............. *G06N 3/088* (2013.01); *G06N 5/046* (2013.01); *G06N 20/00* (2019.01); *G06Q 30/0283* (2013.01)

(56) References Cited

U.S. PATENT DOCUMENTS

| | | | |
|---|---|---|---|
| 8,094,881 B2* | 1/2012 | Matsugu | G06K 9/00342 348/152 |
| 8,824,861 B2* | 9/2014 | Gentile | G06T 5/50 386/278 |
| 9,106,812 B1 | 8/2015 | Price et al. | |
| 2005/0081159 A1 | 4/2005 | Gupta et al. | |
| 2008/0221892 A1 | 9/2008 | Nathan et al. | |
| 2009/0024963 A1 | 1/2009 | Lindley et al. | |
| 2009/0094039 A1 | 4/2009 | MacDonald et al. | |
| 2011/0135278 A1 | 6/2011 | Klappert | |
| 2012/0173980 A1 | 7/2012 | Dachs | |
| 2013/0124984 A1 | 5/2013 | Kuspa | |
| 2013/0211841 A1 | 8/2013 | Ehsani et al. | |
| 2014/0143183 A1 | 5/2014 | Sigal et al. | |
| 2015/0186771 A1 | 7/2015 | Bhatt et al. | |
| 2015/0199995 A1* | 7/2015 | Silverstein | H04N 21/812 386/249 |
| 2015/0205762 A1 | 7/2015 | Kulikowska | |
| 2016/0147399 A1 | 5/2016 | Berajawala et al. | |
| 2017/0039883 A1 | 2/2017 | Hunt et al. | |
| 2017/0078621 A1 | 3/2017 | Sahay et al. | |
| 2018/0136828 A1* | 5/2018 | Threewits | G06F 3/04845 |
| 2019/0213254 A1 | 7/2019 | Ray et al. | |

FOREIGN PATENT DOCUMENTS

| | | |
|---|---|---|
| WO | 2010/081225 A1 | 7/2010 |
| WO | 2019/0140120 A1 | 7/2019 |
| WO | 2019/140129 A1 | 7/2019 |

OTHER PUBLICATIONS

Si et al., "Thespian: Using Multi-Agent Fitting to Craft Interactive Drama," AMAS '05, copyright 2005 ACM, p. 21-28. (Year: 2005).*

International Search Report and Written Opinion for PCT/US2019/013095, dated Jun. 5, 2019, 15 pages.

International Search Report and Written Opinion for PCT/US2019/013105, dated May 2, 2019, 14 pages.

Lopez, M., "Netflix's New App Aims to Simplify the Film Production Process," *Videoink*, URL= https://www.thevideoink.com/2018/03/07/netflixs-new-app-aims-simplify-film-production-process/, Mar. 7, 2018, 1 page.

Olah, C., "Understanding LSTM Networks," URL=http://colah.github.io/posts/2015-08-Understanding-LSTMs></URL:>, Aug. 27, 2015, 8 pages.

Ray, D., "Generating Creative Works with AI," URL = https://www.slideshare.net/DataScienceAssociati/generating-creative-works-with-ai, Dec. 6, 2017, 34 pages.

Roettgers, J. "Netflix's Newest App Isn't for Consumers, but the People Making Its Shows," *Variety*, URL = http://variety.com/2018/digital/news/netflix-move-app-production-technology-1202720581/, Mar. 7, 2018, 3 pages.

* cited by examiner

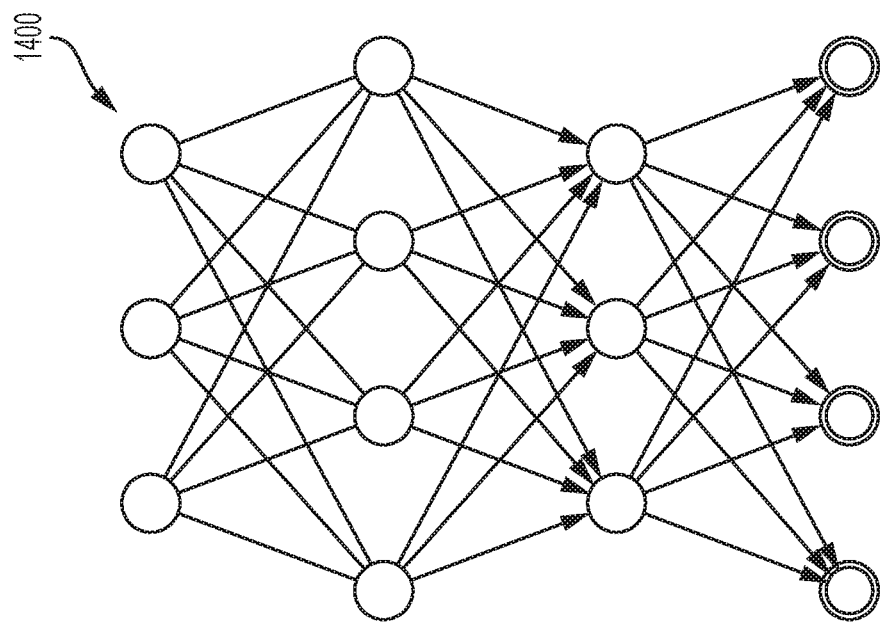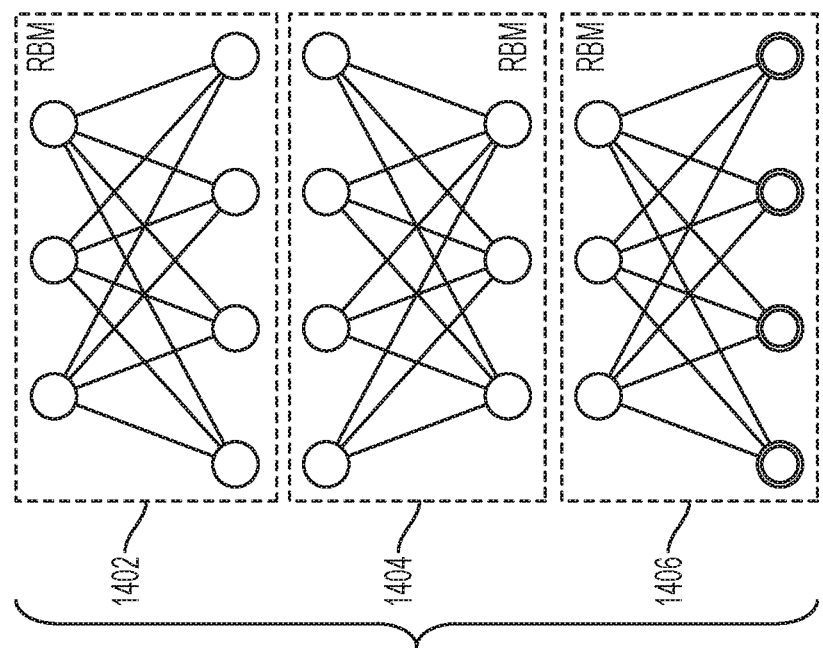
FIG. 14

1500

The place is quaint and quiet. A WOMAN behind the counter un-boxes store bought pastries and places them in the display case. An UNASSUMING MAN sits alone at one of the tables with a Hershey's syrup-drizzled chocolate croissant, a child's sized orange juice and a newspaper. A YOUNG BACKPACKING COUPLE (both early 20's) enters the establishment. The young man takes the girl's pack and sets it, along with his, on the floor beside one of the tables...

BAKERY WOMAN
 Hi, there.

The couple speak with a thick French accent...

FRENCH GIRL
 Hello.

French Guy steps over joins the girl over [ Select Sentiment(s): ] look at the assorted pastries...

FRENCH GUY
 All shit. Espresso.

BAKERY WOMAN
 We've just got the regular type o[f]

Select Sentiment(s):

Excitement
Frustration
Anticipation
Disbelief
Sadness
Confusion
Anger

— 1506

He looks at his girlfriend and [rolls his eyes] slightly...
  1502     — 1504
    FRENCH GIRL
 Two.

The woman grabs two empty mugs and sets them on the counter...

BAKERY WOMAN
 Two dollars, please.

French Guy pulls out two dollar bills and hands them to the woman. She places them in the register and smiles. The couple look down at the empty mugs and back up to the woman, confused...

The place is quaint and quiet. A WOMAN behind the counter un-boxes store bought pastries and places them in the display case. An UNASSUMING MAN sits alone at one of the tables with a Hershey's syrup-drizzled chocolate croissant, a child's sized orange juice and a newspaper. A YOUNG BACKPACKING COUPLE (both early 20's) enters the establishment. The young man takes the girl's pack and sets it, along with his, on the floor beside one of the tables...

BAKERY WOMAN
    Hi, there.

The couple speak with a thick French accent...

FRENCH GIRL
    Hello.

French Guy steps over joins the girl over by the case. They look at the assorted pastries...

FRENCH GUY
    All shit. Espresso.

BAKERY WOMAN
    We've just got the regular type of coffee here.

He looks at [Select Category:] his eyes slightly...
1604 —
      Staging Directions  NCH GIRL
      Dialog The woman grabs two empty mugs and sets them on the counter...
    1504
1602             BAKERY WOMAN
    Two dollars, please.

French Guy pulls out two dollar bills and hands them to the woman. She places them in the register and smiles. The couple look down at the empty mugs and back up to the woman, confused...

The place is quaint and quiet. A WOMAN behind the counter un-boxes store bought pastries and places them in the display case. An UNASSUMING MAN sits alone at one of the tables with a Hershey's syrup-drizzled chocolate croissant, a child's sized orange juice and a newspaper. A YOUNG BACKPACKING COUPLE (both early 20's) enters the establishment. The young man takes the girl's pack and sets it, along with his, on the floor beside one of the tables...

BAKERY WOMAN
  Hi, there.

The couple speak with a thick French accent...

FRENCH GIRL
  Hello.

French Guy steps over joins the girl over by the case. They look at the assorted pastries...

FRENCH GUY
  All shit. Espresso.

BAKERY WOMAN
  We've just got the regular type of coffee here.

1604 — He looks a[t] Select Category: his eyes slightly...

1606 — Staging Directions CH GIRL

Dialog — 1504

[The woman grabs] two empty mugs and sets them on the counter...

1602

BAKERY WOMAN
  Two dollars, please.

French Guy pulls out two dollar bills and hands them to the woman. She places them in the register and smiles. The couple look down at the empty mugs and back up to the woman, confused...

FIG. 16B

| | No issues. |
|---|---|
| 1  I looked at Monsieur Fogg | I looked at Monsieur Fogg |
| 2  * ... and I could contain myself no longer. | |
| 3  'What is the purpose of our journey, Monsieur?' | ... and I could contain myself no longer. |
| 4  'A wager,' he replied. | |
| 5  * 'A wager!' [] I returned. | 'What is the purpose of our journey, Monsieur?' |
| 6  He nodded | |
| 7  * * * "But surely that is foolishness!" | 'A wager,' he replied. |
| 8  * * * 'A most serious matter then!' | |
| 9  — — He nodded again. | 'A wager!' I returned. |
| 10 * * * 'But can we win?' | |
| 11 'That is what we will endeavour to find out,' he answered. | He nodded. |
| 12 * * * 'A modest wager, I trust?' | |
| 13 'Twenty thousand pounds,' he replied, quite flatly. | "But surely that is foolishness!" 1804 |
| 14 * * * I asked nothing further of him then[.], and after a final, polite cough, he offered nothing more to me. <> | "A most serious matter then!" |
| 15 * * 'Ah[ ],' I replied, uncertain what I thought. | 1802 |
| 16 — — After that, <> | |
| 17 * ... but I said nothing[] and <> | |
| 18 — we passed the day in silence. | |
| 19 — —> END | |

FIG. 18

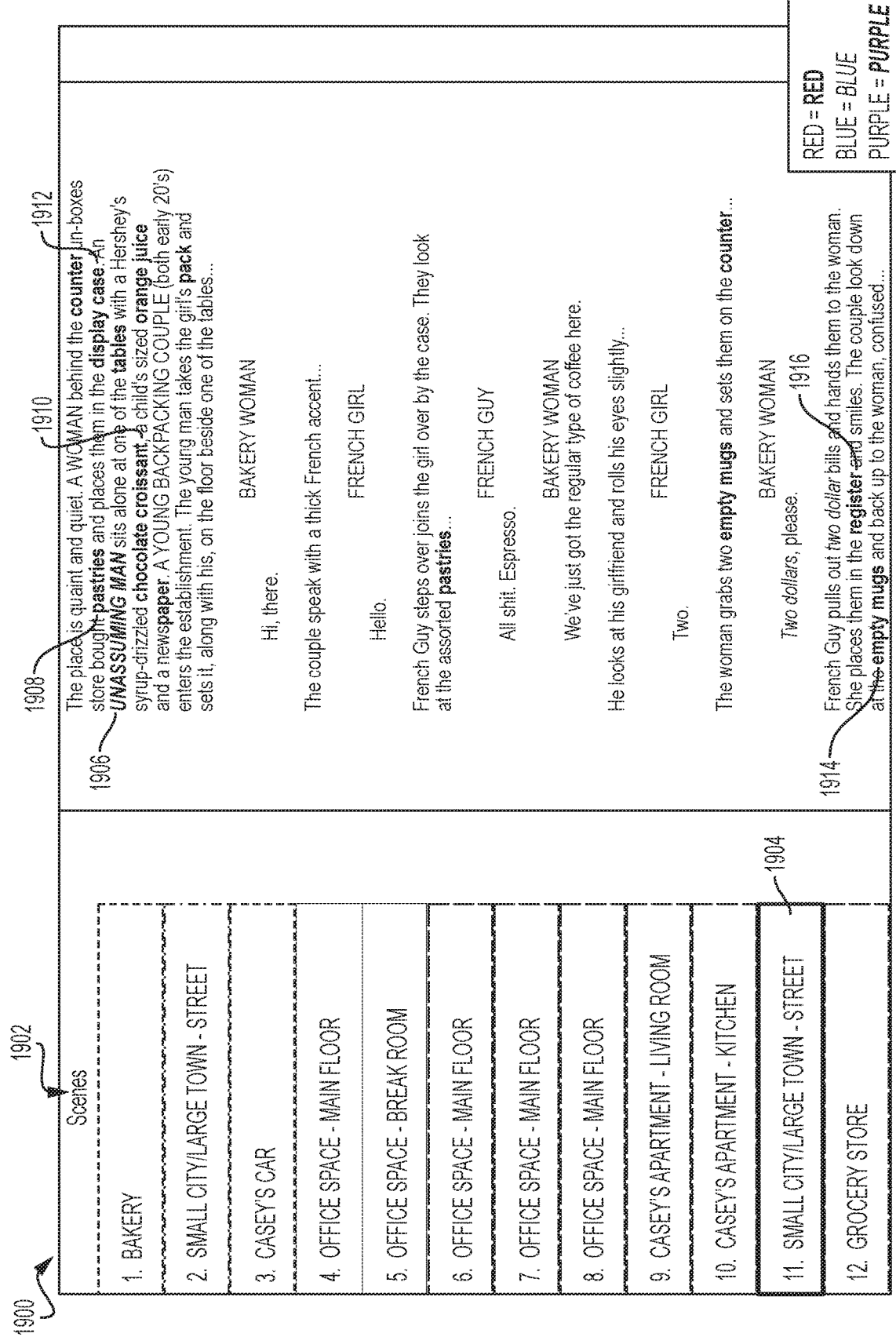

| SCENES |
|---|
| 1. BAKERY |
| 2. SMALL CITY/LARGE TOWN - STREET |
| 3. CASEY'S CAR |
| 4. OFFICE SPACE - MAIN FLOOR |
| 5. OFFICE SPACE - BREAK ROOM |

| SCENE | SHOT | DESCRIPTION | SHOT SIZE | SHOT TYPE | MOVEMENT |
|---|---|---|---|---|---|
| 2 | 1 | WALKING TO CAR | MS | RACK FOCUS / HA / SINGLE | STATIC |
| 2 | 2 | FLYER ON WINDSHIELD | MS | EYE LEVEL / SINGLE | STATIC |

FIG. 20

Producer | Screenplay  Shot List  Schedule  Calendar  Budget

RE-ENTER PARAMETERS

| Scene | I/E | Scene Setting | D/N | Character ID | Pages |
|---|---|---|---|---|---|
| 13 | EXT | SMALL CITY/LARGE TOWN - STREET<br>Casey carries the dog food under his arm. He hears the motorcycle engine off in... | NIGHT | 19 | 1 7/8 |
| 49 | INT | GROCERY STORE<br>Casey is in the checkout lane. He's sweating and breathing like he just did a... | DAY | 19 12 | 3/8 |
| 30 | INT | KARATE DOJO<br>Casey is partnered up with Man Wearing Underwear only now he's fully clothed. His purple... | DAY | 0 19 4 7 | 2 2/8 |
| 104 | INT | KARATE DOJO<br>The blackout curtains are still covering the windows from the night before. We hear the... | MORNING | | 2/8 |

End of Day 1 of 22

| 89 | EXT | SMALL CITY/LARGE TOWN - STREETS<br>The gang race through the empty streets at night. Finally they come to a stop... | NIGHT | 4 6 | 7/8 |
| 2 | EXT | SMALL CITY/LARGE TOWN - STREET<br>Casey walks to his car and notices a flyer on his windshield under the wiper.... | MORNING | | 2/8 |
| 62 | INT | OFFICE SPACE - MAIN FLOOR<br>Casey sits at his desk. The work beside him has piled up even more but... | DAY | 16 19 | 1 3/8 |
| 106 | INT | KARATE DOJO - HALLWAY<br>Sensei drags Henry's corpse across the floor by his wrists. | MORNING | | 0/8 |

FIG. 21

SCRIPT WRITING AND CONTENT GENERATION TOOLS AND IMPROVED OPERATION OF SAME

BACKGROUND

Field

This disclosure generally relates to artificial intelligence, and particularly, to artificial intelligence systems in script writing, content generation and pre-production.

Description of the Related Art

In media productions such as in filmmaking and television production environments, the highest leverage decisions affecting the final product are made in the writing and pre-production stages. The most tedious and time-consuming parts of pre-production are performing script breakdowns, storyboards and shot list generation, optimizing schedules, and creating budgets. Thus, automaton of those processes would help filmmakers to focus their time on the more creative and human-centric aspects and generating these parts automatically reduces pre-production time. Also, the agility provided by automation in these areas would help in adapting and responding to unforeseen events in these production stages.

BRIEF SUMMARY

A method of operation of a computational system that implements at least one artificial neural network to perform pre-production operations including script breakdown may be summarized as including: receiving at least one of a sample script or a portion of a sample script by the computational system, the at least one artificial neural network trained on a corpus of one or more annotated scripts or portions of annotated scripts, the received script or portion of the script including a plurality of scenes, a number of characters who appear in one or more of the scenes, and dialog that occurs during the scenes; processing the at least one of the sample script or the portion of the sample script via the at least one artificial neural network trained at least on the corpus of the at least one of annotated scripts or annotated portions of scripts to identify each of a plurality of script elements of two or more different categories or elements, the categories of script elements including at least: i) scenes, ii) characters that appear in one or more scenes, iii) mise en scène elements, iv) character interactions, and v) dialog for each of the characters; and generating a script breakdown that represents at least: i) the scenes, ii) any of one or more main characters that appear in each of the scenes, and iv) interactions between the scenes and the any of one or more main characters that appear in each of the scenes.

The method of operation of a computational system that implements at least one artificial neural network to perform pre-production operations including script breakdown may further include processing the at least one of the sample script or the portion of the sample script via the at least one artificial neural network to identify a scene type for each of the scenes, and wherein generating a script breakdown includes generating a script breakdown that represents the scene type of each of the scenes.

The method of operation of a computational system that implements at least one artificial neural network to perform pre-production operations including script breakdown may further include processing the at least one of the sample script or the portion of the sample script via the at least one artificial neural network to estimate a scene length for each of the scenes, and wherein generating a script breakdown includes generating a script breakdown that represents the estimated scene length of each of the scenes.

The method of operation of a computational system that implements at least one artificial neural network to perform pre-production operations including script breakdown may further include processing the at least one of the sample script or the portion of the sample script via the at least one artificial neural network to estimate a number of shots for each of the scenes, and wherein generating a script breakdown includes generating a script breakdown that represents the estimated number of shots for each of the scenes.

The categories of script elements may further include interactions, and processing the at least one of the sample script or the portion of the sample script via the at least one artificial neural network to identify each of a plurality of script elements of two or more different categories or elements may further include identifying one or more interactions between two or more characters that occur in one or more scenes. Generating a script breakdown may include generating a script breakdown that represents interactions between characters for one or more scenes. Generating a script breakdown may include generating a script breakdown that, for each scene, represents interactions between characters that occur in the respective scene. Generating a script breakdown may include generating a script breakdown that represents which, if any, of the characters interact with one another in the scene. Generating a script breakdown may include generating a script breakdown that, for each scene, represents any dialog that occurs during the respective scene. The categories of script elements may further include props, and processing the at least one of the sample script or the portion of the sample script via the at least one artificial neural network to identify each of a plurality of script elements of two or more different categories or elements may further include identifying one or more props that appear in one or more scenes. The categories of script elements may further include audio effects, and processing the at least one of the sample script or the portion of the sample script via the at least one artificial neural network to identify each of a plurality of script elements of two or more different categories or elements may further include identifying one or more audio effects that appear in one or more scenes. The categories of script elements may further include visual effects, and processing the at least one of the sample script or the portion of the sample script via the at least one artificial neural network to identify each of a plurality of script elements of two or more different categories or elements may further include identifying one or more visual effects that appear in one or more scenes. The categories of script elements may further include audio-visual effects, and processing the at least one of the sample script or the portion of the sample script via the at least one artificial neural network to identify each of a plurality of script elements of two or more different categories or elements may further include identifying one or more audio-visual effects that appears in one or more scenes.

The method of operation of a computational system that implements at least one artificial neural network to perform pre-production operations including script breakdown may further include storing at least one data structure that represents the identified information as a plurality of nodes and a plurality of edges, the edges which respectively define a logical association between respective pairs of the nodes.

Storing at least one data structure may include storing at least one data structure in which scenes and characters are represented as respective nodes, and respective relationships between respective pairs of the scenes and, or characters, are represented by respective edges. Processing the at least one of the sample script or the portion of the sample script via the at least one artificial neural network trained at least on the corpus of the at least one of annotated scripts or annotated portions of scripts to identify each of a plurality of script elements may include performing natural language processing on the sample script or portion of the sample script via at least one element of the computational system. Processing the at least one of the sample script or the portion of the sample script via the at least one artificial neural network trained at least on the corpus of the at least one of annotated scripts or annotated portions of scripts to identify each of a plurality of script elements may include unsupervised processing of the sample script or the portion of the sample script via the at least one artificial neural network. The at least one artificial neural network may be an auto-encoder and processing the at least one of the sample script or the portion of the sample script may include processing the at least one of the sample script or the portion of the sample script via the auto-encoder. The auto-encoder may be a variational auto-encoder and processing the at least one of the sample script or the portion of the sample script may include processing the at least one of the sample script or the portion of the sample script via the variational auto-encoder with a set of assumptions regarding a distribution of a number of latent variables. The at least one artificial neural network may be a hierarchical variational auto-encoder comprising a recurrent encoder artificial neural network, and a recurrent decoder artificial neural network with a loss function that is a variational upper bound on a log-likelihood of the corpus of annotated scripts or the portions of annotated scripts, and processing the at least one of the sample script or the portion of the sample script may include processing the at least one of the sample script or the portion of the sample script via the hierarchical variational auto-encoder. The at least one artificial neural network may be a recurrent artificial neural network and processing the at least one of the sample script or the portion of the sample script may include processing the at least one of the sample script or the portion of the sample script via the recurrent artificial neural network. The at least one the artificial neural network may be a long short term memory recurrent artificial neural network and processing the at least one of the sample script or the portion of the sample script may include processing the at least one of the sample script or the portion of the sample script via the long short term memory recurrent artificial neural network. The long short term memory recurrent artificial neural network may include two or more of: a generation artificial neural network that generates predictions during a number of iterations, a memory structure that reintroduces previously generated predictions in subsequent iterations of predictions, and a forgetting artificial neural network that determines which of the previously generated predictions are reintroduced by the memory structure in the subsequent iterations of predictions. The long short term memory recurrent artificial neural network may further include one or more of: an ignoring artificial neural network that filters the generated predictions based on relevancy, and a selection artificial neural network that determines which of the generated predictions to release to an output system and which of the predictions to retain internally in the artificial neural networks only for use in the subsequent iterations of predictions.

A computational system that implements at least one artificial neural network for script generation may be summarized as including: at least one processor trained on a corpus of one or more annotated scripts or portions of annotated scripts; and at least one nontransitory processor-readable medium that stores at least one of processor-executable instructions or data which, when executed by the at least one processor, causes the at least one processor to: receive at least one of a sample script or a portion of a sample script by the computational system, the at least one artificial neural network trained on a corpus of one or more annotated scripts or portions of annotated scripts, the received script or portion of the script including a plurality of scenes, a number of characters who appear in one or more of the scenes, and dialog that occurs during the scenes; process the at least one of the sample script or the portion of the sample script via the at least one artificial neural network trained at least on the corpus of the at least one of annotated scripts or annotated portions of scripts to identify each of a plurality of script elements of two or more different categories or elements, the categories of script elements including at least: i) scenes, ii) characters that appear in one or more scenes, iii) mise en scène elements, iv) actions that appear in one or more scenes, and v) dialog for each of the characters; and generate a script breakdown that represents at least: i) the scenes, and ii) any of one or more main characters that appear in each of the scenes.

The at least one of processor-executable instructions or data, when executed by the at least one processor, may further cause the at least one processor to perform any of the methods described above. The at least one artificial neural network may be an auto-encoder. The auto-encoder may be a variational auto-encoder. The at least one artificial neural network may be a hierarchical variational auto-encoder. The at least one artificial neural network may be a recurrent artificial neural network. The at least one of the artificial neural network may be a long short term memory recurrent artificial neural network. The long short term memory recurrent artificial neural network may include two or more of: a generation artificial neural network that generates predictions during a number of iterations, a memory structure that reintroduces (adds) previously generated predictions in subsequent iterations of predictions, and a forgetting artificial neural network that determines which of the previously generated predictions are reintroduced by the memory structure in the subsequent iterations of predictions. The long short term memory recurrent artificial neural network may further include one or more of: an ignoring artificial neural network that filters the generated predictions based on relevancy, and a selection artificial neural network that determines which of the generated predictions to release to an output system and which of the predictions to retain internally in the artificial neural networks only for use in the subsequent iterations of predictions.

A method of operation of a computational system that implements at least one artificial neural network to perform pre-production operations including storyboard generation may be summarized as including: receiving at least one of a sample script or a portion of a sample script by the computational system, the at least one artificial neural network trained on a corpus of one or more annotated scripts or portions of annotated scripts, the received script or portion of the script including a plurality of scenes, a number of characters who appear in one or more of the scenes, and dialog that occurs during the scenes; processing the at least one of the sample script or the portion of the sample script via the at least one artificial neural network trained at least on the corpus of the at least one of annotated scripts or annotated portions of scripts to identify each scene in the sample script or the portion of the sample script and, for each of a number of the scenes, identify each of a number of shots in the scene, and for each of a number of the identified shots, classifying the respective shot as one of a plurality of shot classes; for each of one or more of the identified shots, finding a representative image based on the respective shot class; and generating a storyboard using the identified representative images.

Classifying the respective shot as one of a plurality of shot types may include processing dialog from the at least one of the sample script or the portion of the sample script that corresponds to the respective shot via a text-to-image classifier. Classifying the respective shot as one of a plurality of shot classes may include classifying the respective shot based on one or more of: a shot size, a shot type, a type of camera movement, a type of equipment, or a type of visual effect. Processing the at least one of the sample script or the portion of the sample script via the at least one artificial neural network trained at least on the corpus of the at least one of annotated scripts or annotated portions of scripts to identify each scene in the sample script or the portion of the sample script and, for each of a number of the scenes, identify each of a number of shots in the scene may include, for at least one scene, identifying the dialog in the scene, and determining the number of shots in the respective scene via at least one of the artificial neural networks based at least in part on the identified dialog that occurs during the respective scene. Processing the at least one of the sample script or the portion of the sample script via the at least one artificial neural network trained at least on the corpus of the at least one of annotated scripts or annotated portions of scripts to identify each scene in the sample script or the portion of the sample script and, for each of a number of the scenes, identify each of a number of shots in the scene may include, for at least one scene, identifying the dialog in the scene via at least one of the artificial neural networks, and based at least in part on the identified dialog that occurs during the respective scene determining the number of shots in the respective scene via at least one of the artificial neural networks. Finding a representative image based on the respective shot type may include searching an archival database of archival images. Generating a storyboard using the identified representative images may include generating a storyboard where at least one shot is represented by two images. Generating a storyboard using the identified representative images may include generating a storyboard where at least one shot is represented by two user selectable image options.

The method of operation of a computational system that implements at least one artificial neural network to perform pre-production operations including storyboard generation may further include training the at least one artificial neural network on the corpus of one or more annotated scripts or portions of annotated scripts.

Training the at least one artificial neural network on a corpus of one or more annotated scripts or portions of annotated scripts may include training the at least one artificial neural network on a corpus of one or more annotated scripts or portions of annotated scripts which includes frame-by-frame annotations that identify each frame by one or more of: a shot size, a shot type, a type of camera movement, a type of equipment, or a type of visual effect.

A computational system that implements at least one artificial neural network for script generation may be summarized as including: at least one processor trained on a corpus of one or more annotated scripts or portions of annotated scripts; and at least one nontransitory processor-readable medium that stores at least one of processor-executable instructions or data which, when executed by the at least one processor, causes the at least one processor to: receive at least one of a sample script or a portion of a sample script by the computational system, the at least one artificial neural network trained on a corpus of one or more annotated scripts or portions of annotated scripts, the received script or portion of the script including a plurality of scenes, a number of characters who appear in one or more of the scenes, and dialog that occurs during the scenes; process the at least one of the sample script or the portion of the sample script via the at least one artificial neural network trained at least on the corpus of the at least one of annotated scripts or annotated portions of scripts to identify each of a plurality of script elements of two or more different categories or elements, the categories of script elements including at least: i) scenes, ii) characters that appear in one or more scenes, iii) mise en scène elements, and iiv) dialog for each of the characters; and generate a script breakdown that represents at least: i) the scenes, and ii) any of one or more main characters that appear in each of the scenes.

The at least one of processor-executable instructions or data, when executed by the at least one processor, may further causes the at least one processor to perform any of the methods described above. The at least one artificial neural network may be an auto-encoder. The auto-encoder may be a variational auto-encoder. The at least one artificial neural network may be a hierarchical variational auto-encoder. The at least one artificial neural network may be a recurrent artificial neural network. The at least one the artificial neural network may be a long short term memory recurrent artificial neural network. The long short term memory recurrent artificial neural network may include two or more of: a generation artificial neural network that generates predictions during a number of iterations, a memory structure that reintroduces (adds) previously generated predictions in subsequent iterations of predictions, and a forgetting artificial neural network that determines which of the previously generated predictions are reintroduced by the memory structure in the subsequent iterations of predictions. The long short term memory recurrent artificial neural network may further include one or more of: an ignoring artificial neural network that filters the generated predictions based on relevancy, and a selection artificial neural network that determines which of the generated predictions to release to an output system and which of the predictions to retain internally in the artificial neural networks only for use in the subsequent iterations of predictions.

A method may be summarized as including: for each of a plurality of cast members, ingesting a respective schedule or calendar of the cast members; for each of a plurality of shoot locations, ingesting a plurality of dates that represent when the respective shoot location is available; performing an optimization on at least a combination of the ingested schedule or calendar of the cast members; and the dates that represent when the respective shoot locations are available; and generating one or more common calendars based on the optimization.

The method may further include, for one or more pieces of equipment or one or more props, ingesting a plurality of dates that represent when the respective piece of equipment or the respective prop is available, and wherein performing an optimization may include performing the optimization on at least a combination of the ingested schedule or calendar of the cast members indicating cast availability; the dates that represent when the respective shoot locations are available, and the dates that represent when the respective piece of equipment or the respective prop is available.

The method may further include, for one or more of the locations, ingesting a plurality of predicted weather conditions predicted for the location during one or more of the dates that represent when the respective shoot location is available, and wherein performing an optimization may include performing the optimization on at least a combination of the ingested schedule or calendar of the cast members; the dates that represent when the respective shoot locations are available, and the predicted weather conditions.

The method may further include, for one or more pieces of equipment or one or more props, ingesting a plurality of dates that represent when the respective piece of equipment or the respective prop is available, for one or more of the locations, ingesting a plurality of predicted weather conditions predicted for the location during one or more of the dates that represent when the respective shoot location is available, and wherein performing an optimization includes performing the optimization on at least a combination of the ingested schedule or calendar of the cast members; the dates that represent when the respective shoot locations are available, the dates that represent when the respective piece of equipment or the respective prop is available, and the predicted weather conditions predicted for the location during one or more of the dates that represent when the respective shoot location is available.

The method may further include ingesting one or more costs constraints, and wherein performing an optimization may include performing the optimization taking into account the one or more cost constraints.

Performing an optimization may include preforming the optimization via at least one artificial neural network. Performing an optimization may include casting the ingested information as a mixed integer linear programming problem and performing the optimization via at least one mixed integer linear programming solver.

The method may further include decomposing the problem before preforming the optimizing.

The method may further include generating a common calendar for the shoot based on the optimization, the common calendar including a plurality of tasks and dates for respective action items for at least the cast members.

The method may further include, for each day of shooting, generating a respective one or more call sheets that specify activities occurring on the respective day.

The method may further include: receiving at least one of a sample script or a portion of a sample script by the computational system, the at least one artificial neural network trained on a corpus of one or more annotated scripts or portions of annotated scripts, the received script or portion of the script including a plurality of scenes, a number of characters who appear in one or more of the scenes, and dialog that occurs during the scenes; processing the at least one of the sample script or the portion of the sample script via the at least one artificial neural network trained at least on the corpus of the at least one of annotated scripts or annotated portions of scripts to identify each of a plurality of script elements of two or more different categories or elements, the categories of script elements including at least: i) scenes, ii) characters that appear in one or more scenes, iii) mise en scène elements, and iv) dialog for each of the characters; and generating a script breakdown that represents at least: i) the scenes, and ii) any of one or more main characters that appear in each of the scenes.

The method may further include, for each of a number of the characters, identifying a respective cast member who will play the character.

The method may further include, for each of a number of the scenes, identifying each of a number of shots in the scene, and for each of a number of the identified shots, classifying the respective shot as one of a plurality of shot classes.

The ingesting a respective schedule or calendar of the cast members may include ingesting one or more of: One-liner, Day Out of Days (DOOD) and a stripboard schedule.

A computational system that implements at least one artificial neural network for script generation may be summarized as including: at least one processor trained on a corpus of one or more annotated scripts or portions of annotated scripts; and at least one nontransitory processor-readable medium that stores at least one of processor-executable instructions or data which, when executed by the at least one processor, causes the at least one processor to: for each of a plurality of cast members, ingesting a respective schedule or calendar of the cast members; for each of a plurality of shoot locations, ingest a plurality of dates that represent when the respective shoot location is available; perform an optimization on at least a combination of the ingested schedule or calendar of the cast members; and the dates that represent when the respective shoot locations are available; and generate one or more common calendars based on the optimization.

The at least one of processor-executable instructions or data, when executed by the at least one processor, may further cause the at least one processor to perform any of the methods described above.

A method of operation of a computational system that implements at least one artificial neural network to perform pre-production operations including script breakdown may be summarized as including: receiving a sample script by the computational system, the at least one artificial neural network trained on a corpus of one or more annotated scripts or portions of annotated scripts and a corpus of budgets associated with respective productions of one or more of the annotated scripts, the received script including a plurality of scenes, a number of characters who appear in one or more of the scenes, and dialog that occurs during the scenes; processing the sample script via the at least one artificial neural network trained at least on the corpus of the at least one of annotated scripts or annotated portions of scripts to identify each of a plurality of script elements of two or more different categories or elements, the categories of script elements including at least: i) scenes, ii) characters that appear in one or more scenes, iii) mise en scène elements, and iv) dialog for each of the characters; generating a script breakdown that represents at least: i) the scenes, and ii) any of one or more main characters that appear in each of the scenes; and generating an estimated budget for a production of the script based at least in part on the generated script breakdown and the corpus of budgets.

Generating an estimated budget for a production of the script may include generating an estimated budget in the form of a tree structure with a plurality of line items as end nodes of the tree structure. Generating an estimated budget for a production of the script may include automatically generating respective estimates of costs for each of a plurality of line items that are below the line from the sample script.

The method of operation of a computational system that implements at least one artificial neural network to perform pre-production operations including script breakdown may further include receiving manually entered at least estimates of costs for each of a plurality of line items that are above the line.

A plurality of line items that are the end nodes of the tree structure may be generated automatically from the sample script without manual entry.

The method of operation of a computational system that implements at least one artificial neural network to perform pre-production operations including script breakdown may further include grouping sets of lowest level line items into respective next higher categories.

The method of operation of a computational system that implements at least one artificial neural network to perform pre-production operations including script breakdown may further include grouping sets of next higher categories into even higher categories.

Generating an estimated budget for a production of the script may occur before the production is approved.

The method of operation of a computational system that implements at least one artificial neural network to perform pre-production operations including script breakdown may further include: processing a revised sample script via the at least one artificial neural network trained at least on the corpus of the at least one of annotated scripts or annotated portions of scripts to identify each of a plurality of script elements of two or more different categories or elements, the categories of script elements including at least: i) scenes, ii) characters that appear in one or more scenes, iii) mise en scène elements, and iv) dialog for each of the characters; generating a revised script breakdown that represents at least: i) the scenes, and ii) any of one or more main characters that appear in each of the scenes; and generating a revised estimated budget for a production of the script based at least in part on the generated script breakdown and the corpus of budgets.

The ingested information may be from a previous shoot, and may further include comparing the generated estimated budget for a production of the script to an actual budget for the production of the script.

The method of operation of a computational system that implements at least one artificial neural network to perform pre-production operations including script breakdown may further include presenting a difference in costs between the generated estimated budget for a production of the script to an actual budget for the production of the script.

A computational system that implements at least one artificial neural network for script generation may be summarized as including: at least one processor trained on a corpus of one or more annotated scripts or portions of annotated scripts; and at least one nontransitory processor-readable medium that stores at least one of processor-executable instructions or data which, when executed by the at least one processor, causes the at least one processor to: receive a sample script by the computational system, the at least one artificial neural network trained on a corpus of one or more annotated scripts or portions of annotated scripts and a corpus of budgets associated with respective productions of one or more of the annotated scripts, the received script including a plurality of scenes, a number of characters who appear in one or more of the scenes, and dialog that occurs during the scenes; process the sample script via the at least one artificial neural network trained at least on the corpus of the at least one of annotated scripts or annotated portions of scripts to identify each of a plurality of script elements of two or more different categories or elements, the categories of script elements including at least: i) scenes, ii) characters that appear in one or more scenes, iii) mise en scène elements, and iv) dialog for each of the characters; generate a script breakdown that represents at least: i) the scenes, and ii) any of one or more main characters that appear in each of the scenes; and generate an estimated budget for a production of the script based at least in part on the generated script breakdown and the corpus of budgets.

The at least one of processor-executable instructions or data, when executed by the at least one processor, may further cause the at least one processor to perform any of the methods described above.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 14 is a graphical representation of an artificial deep neural network based on a restricted Boltzmann machine (RBM) that is trained to generate script content in the system for automated script generation and media production, according to one illustrated embodiment.

FIG. 15A is an example user interface screen for generating an annotated training corpus in the system for automated script generation and media production showing a cursor being within a defined spatial relationship with respect to one of the visually identified terms in the script, according to one illustrated embodiment.

FIG. 16A is another instance of the example user interface screen of FIGS. 15A and 15B for generating an annotated training corpus in the system for automated script generation and media production showing a cursor being within a defined spatial relationship with respect to one of the visually identified terms in the script, according to one illustrated embodiment.

FIG. 16B is the example user interface screen of FIG. 16A for generating an annotated training corpus in the system for automated script generation and media production showing another context sensitive menu with a set of user selectable annotations for the visually identified term in the script.

FIG. 18 is an example user interface screen of a text editor in the system for automated script generation and media production that shows the currently written scene and generates dialogues between the characters based on the nature of their interaction, according to one illustrated embodiment.

FIG. 19 is an example user interface screen of the system for automated script generation and media production showing a sample script and various script elements identified and extracted during a process of breaking down the script for automated media production, according to one illustrated embodiment.

FIG. 20 is an example user interface screen of the system for automated script generation and media production showing an example storyboard generated automatically from the sample script processed by the system, according to one illustrated embodiment.

FIG. 21 is an example user interface screen of the system for automated script generation and media production showing an example order of shooting various scenes generated automatically by the system for automated script generation and media production based on ingested parameters, according to one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, neural networks, machine learning, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
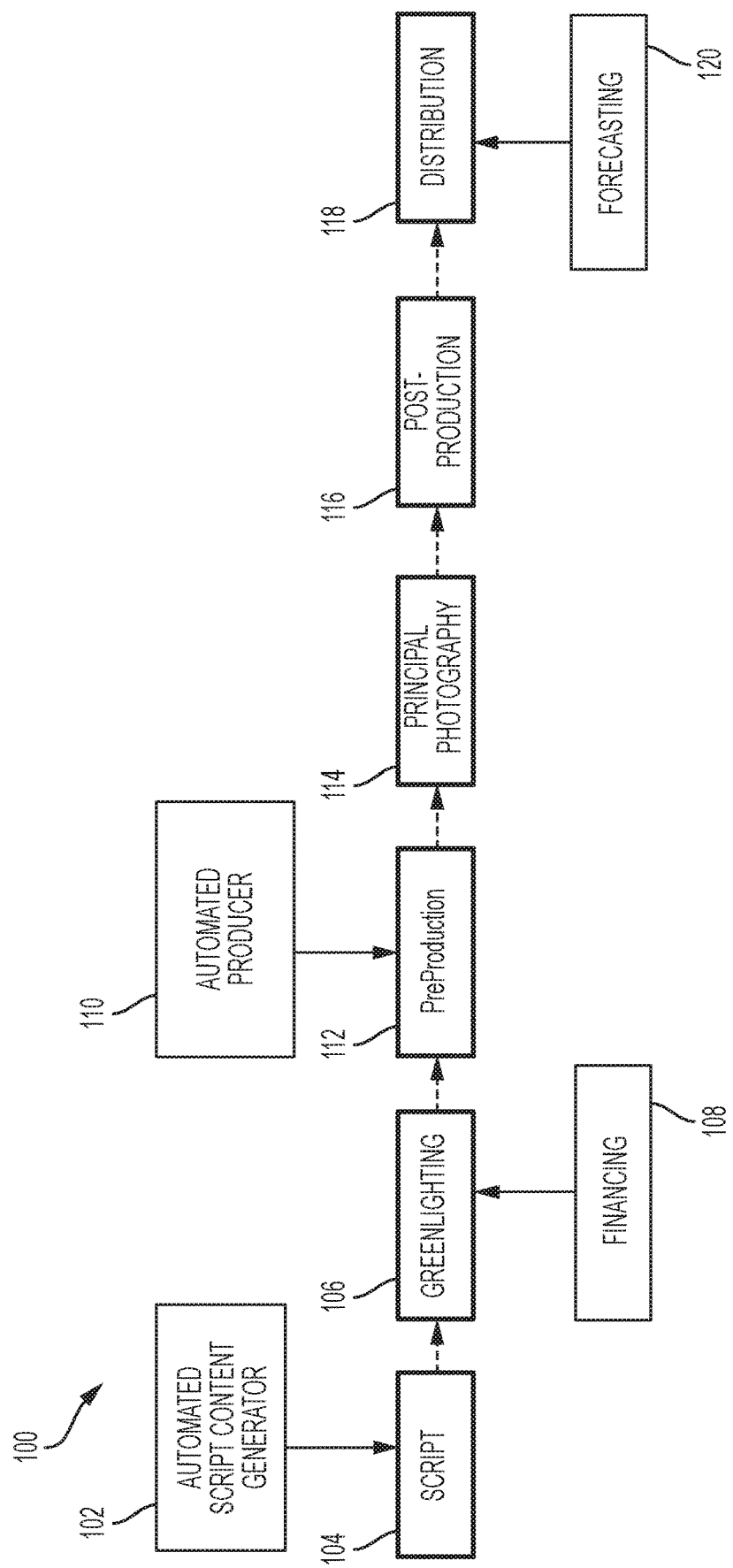
FIG. 1 is a block diagram of a media production environment, in which systems, devices and methods for automated script generation and media production may be a part, or in which they may be implemented, according to one illustrated embodiment.

FIG. 1 is a block diagram of a media production environment 100, in which systems, devices and methods for automated script generation and media production 200 may be a part, or in which they may be implemented, according to one illustrated embodiment. Shown are blocks representing various items and operations of the media production process. The system for automated script generation and media production 200 may be a part of and/or affect many aspects to the media production environment 100 to make the media production process more efficient, flexible and faster. Shown in the media production environment 100 are operations of media production that often represent different stages of media production. The media production process starts with a script 104 and then moves to the greenlighting operation 106 where it is decided whether production of the script is approved. This may include production of the script into various types of media, including, but not limited to, production in to a film, short film, television show or series, web series, video game, or interactive game, virtual reality media, or augmented reality media. Production of a film will be used in the present example. The financing operation 108 often provides input to the greenlighting operation 108 and affects whether a script is approved for production because there is often a cost analysis performed to determine whether there exists enough money for production of the script.

Once the script is approved for production (i.e., "greenlighted") the process moves to the pre-production operation 112 and then to the principle photography operation 114, which includes shooting various scenes of the film. After principle photography is completed, the process proceeds to the post-production operation 116, which involves editing the scenes shot for the film into a finished product. The film may then move to the distribution operation 118 where it is released to the public in various formats and venues and on various platforms. The forecasting operation 108 often provides input to the distribution operation 108 and affects whether and how the film will be distributed. The forecasting operation 108 determines factors such as whether distribution of the movie would generate enough revenue to recover the costs of production and turn a profit and how to distribute the movie to generate enough revenue to recover the costs of production and turn a profit.

Figure 24:
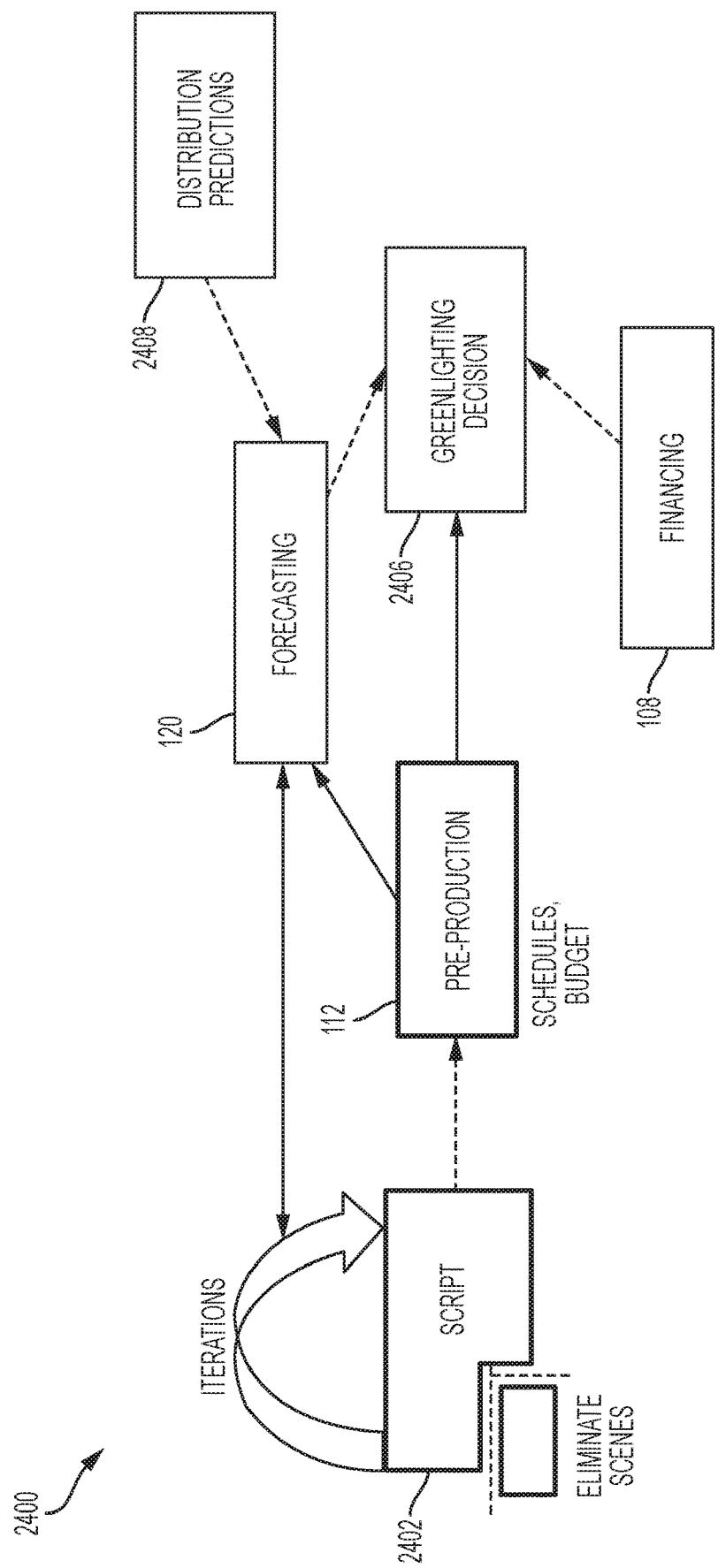
FIG. 24 is a block diagram of a media production process in which the system for automated script generation and media production provides estimated budgets and schedules for production of the script for multiple iterations of the script before the production is approved.

The system for automated script generation and media production 200 provides input to and facilitates various operations of the media production environment 100. For example, the automated script content generator 102 of the system for automated script generation and media production 200 may generate and suggest script content for the script 104 and indicate effects changes to the script 104 would have on the scenes, characters, interactions and other entities of the script. The system for automated script generation and media production 200 also provides input to and facilitates various operations of the pre-production operation 112 of the media production environment 100. For example, the automated producer 110 of the system for automated script generation and media production 200 may break down the script to automatically generate storyboards, calendars, schedules and budgets and provides this as input to the pre-production operation 112 within the media production environment 100. The system for automated script generation and media production 200 may also provide information to affect and facilitate the greenlighting operation 106 and other operations in the media production environment 100 in an iterative script review and revision process as shown in FIG. 24.

Figure 2:
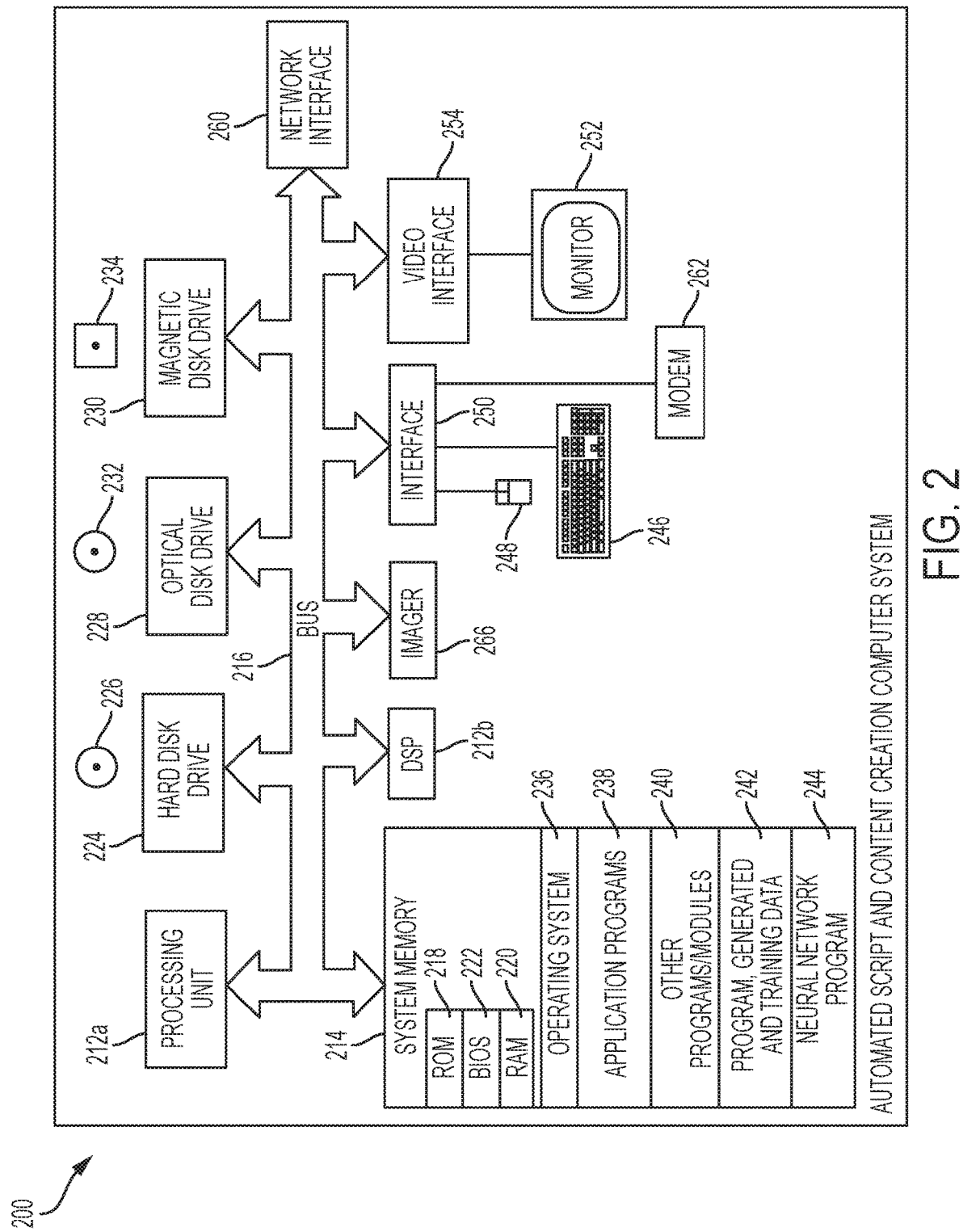
FIG. 2 is a schematic diagram of an example computer system of the automated script content generator and the automated producer of FIG. 1, suitable for implementing systems, devices and methods for automated script generation and media production, according to one illustrated embodiment.

FIG. 2 is a schematic diagram of an example computer system of the system for automated script generation and media production 200 that implements the automated script content generator 102 and the automated producer 110 of FIG. 1. The computer system of the system for automated script generation and media production 200 is suitable for implementing systems, devices and methods for automated script generation and media production, according to various illustrated embodiments described herein. The computer system of the system for automated script generation and media production 200 will at times be referred to in the singular herein, but this is not intended to limit the embodiments to a single device, since in typical embodiments, there may be more than one computer system or devices involved. Unless described otherwise, the construction and operation of the various blocks shown in FIG. 2 are of conventional design. As a result, such blocks need not be described in further detail herein, as they will be understood by those skilled in the relevant art.

The computer system 200 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the computer system of the system for automated script generation and media production 200, such as during start-up.

The computer system of the system for automated script generation and media production 200 may also include a plurality of interfaces such as network interface 260, interface 250, supporting modem 262 or any other wireless/wired interfaces.

The computer system of the system for automated script generation and media production 200 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM or DVD-ROM, while the magnetic disk 234 can be any magnetic storage media. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer readable instructions, data structures, program modules and other data for the computer system of the system for automated script generation and media production 200. Although the depicted computer system of the system for automated script generation and media production 200 is illustrated employing a hard disk 224, optical disk 228 and magnetic disk 230, those skilled in the relevant art will appreciate that other types of computer-readable storage media that can store data accessible by a computer may be employed, such as flash memory, digital video disks ("DVD"), Bernoulli cartridges, RAMs, ROMs, smart cards, various solid state drives, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic storage devices, solid state memory or any other medium which can be used to store the desired information and which may be accessed by processing unit 212a.

Program modules can be stored in the system memory 214, such as an operating system 236; one or more application programs 238; other programs or modules 240; program data, generated data and artificial neural network training data 242; and artificial neural network program 244. Application programs 238 along with the program data, generated data and artificial neural network training data 242, and artificial neural network program 244, may include instructions that cause the processor(s) 212 to automatically generate and suggest script content for a script; indicate effects changes to the script would have of the scenes, characters, interactions and other entities of the script; and break down the script to generate storyboards, calendars, schedules and budgets for production of the script. Other program modules 240 may include instructions for handling security such as password or other access protection and communications encryption. The system memory 214 may also include communications programs, for example, a Web client or browser as part of the application programs 238 for permitting the computer system 200 to access and exchange data with sources such as Web sites of the Internet, corporate intranets, extranets, or other networks and devices as described herein, such as those of the media production operations shown in FIGS. 1 and 24, as well as other server applications on server computing systems.

While shown in FIG. 2 as being stored in the system memory 214, the operating system 236, application programs 238, other programs/modules 240, program data, generated data and artificial neural network training data 242, and artificial neural network program 244 can be stored on the hard disk 226 of the hard disk drive 224, the optical disk 232 of the optical disk drive 228 and/or the magnetic disk 234 of the magnetic disk drive 230, or other memory storage devices, such as solid state drives.

An operator, such as a user, can enter commands and information into the computer system of the system for automated script generation and media production 200 through input devices such as a touch screen or keyboard 246, an imager 266, a pointing device such as a mouse 248, and/or via a graphical user interface. Other input devices can include a touchpad, microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The computer system 200 can include other output devices, such as speakers, printers, etc.

The computer system of the system for automated script generation and media production 200 can operate in a networked environment using logical connections to one or more remote computers and/or devices associated with production operations as described above with reference to FIG. 1. For example, the computer system of the system for automated script generation and media production 200 can operate in a networked environment using logical connections to one or more mobile devices, landline telephones and other service providers or information servers associated with the production operations as described above with reference to FIG. 1. Communications may be via a wired and/or wireless network architecture, for instance wired and wireless enterprise-wide computer networks, intranets, extranets, telecommunications networks, cellular networks, paging networks, and other mobile networks. The computer system of the system for automated script generation and media production 200 may also be that of a wireless device, mobile device, tablet or smartphone, with various components being added or removed from the embodiment illustrated in FIG. 2 accordingly.

Figure 3:
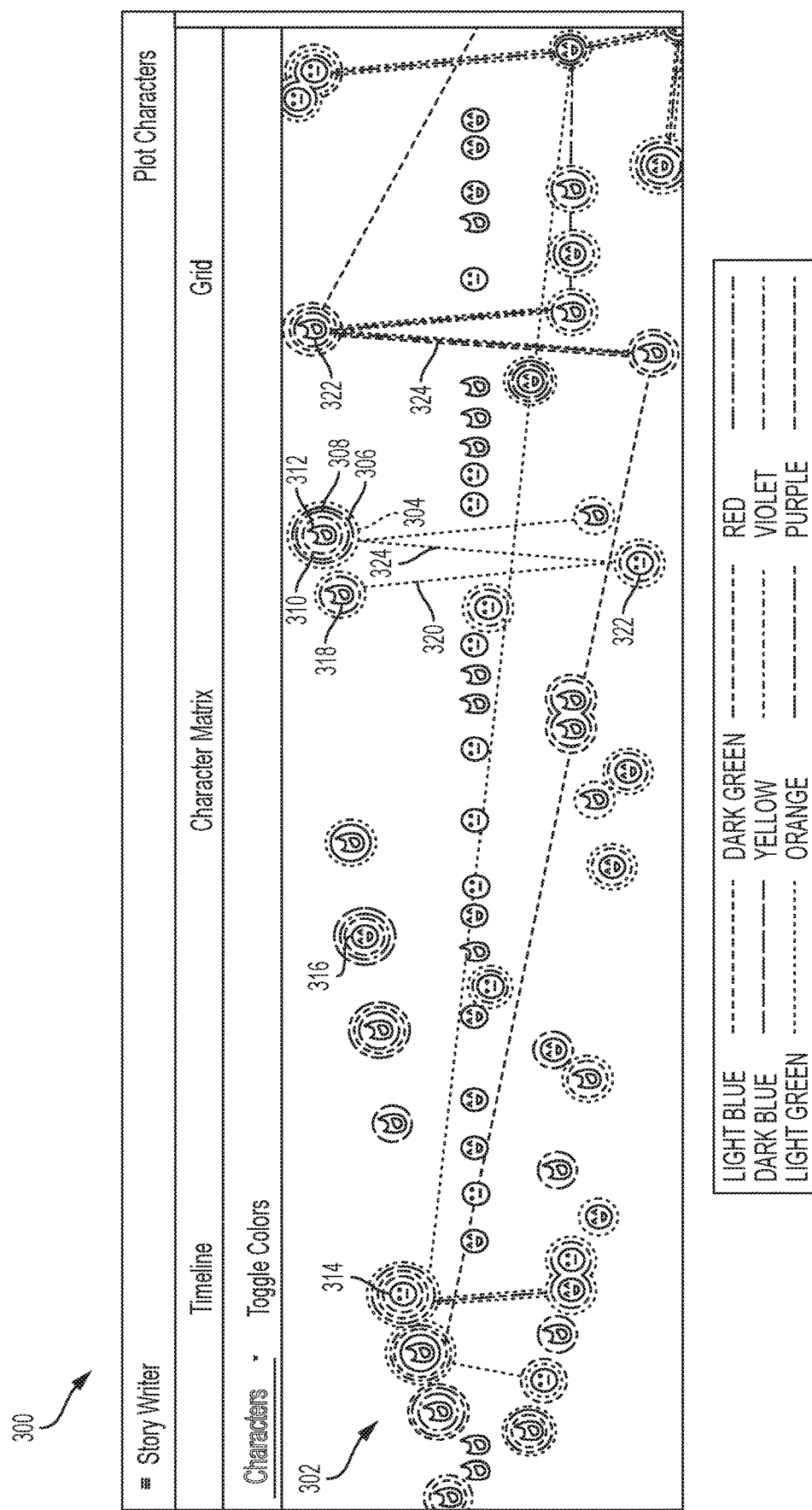
FIG. 3 is an example user interface screen of a system for automated script generation and media production presenting a graph that represents key entities of a script and edges that represent respective key relationships between those entities, according to one illustrated embodiment.

FIG. 3 is an example user interface screen 300 of the system for automated script generation and media production 200 presenting a graph 302 that represents key entities of a script and edges that represent respective key relationships between those entities, according to one illustrated embodiment. The system for automated script generation and media production 200 uses artificial intelligence to augment script writing. In particular, the automated script generation feature of the system for automated script generation and media production 200 helps writers write better stories using deep learning (also known as deep structured learning or hierarchical learning), which is part of a broader family of machine learning methods based on learning data representations using deep neural networks. A deep neural network is an artificial neural network with multiple hidden layers between the input and output layers and can model complex non-linear relationships. Deep neural network architectures generate compositional models where the object is expressed as a layered composition of primitives. The extra layers enable composition of features from lower layers, potentially modeling complex data with fewer units than a similarly performing shallow network. Writers use the system for automated script generation and media production 200 to generate a graph 302 based on deep learning to visualize their stories to see if there are any plot holes, see the effects of changing character interactions, and generate dialogues in different styles. The system for automated script generation and media production 200 also augments the capabilities of a writer to write stores that are more complex, impactful and more performant (have a higher probability of box office or award success).

To generate the graph 302, the system for automated script generation and media production 200 performs a process that ingests text, extracts key elements, visualizes the story and uses natural language processing methods trained on data to suggest improvements in the exposition. The system for automated script generation and media production 200 also infers the effects of changes in the script or text on the overall quality of the story and may also infer the effects on characters or events in a later temporal stage. The system for automated script generation and media production 200 also produces multiple paths from a given point in the story, and generates appropriate dialogues or interactions using deep learning. The system for automated script generation and media production 200 learns by using a training corpus or database of scripts or stories (e.g., film, TV, interactive games). These may be obtained by the system for automated script generation and media production 200 through a database dump, through scraping the Internet, and/or through application programming interfaces (APIs).

The script processed by the system for automated script generation and media production 200 includes a narrative which comprises of a plurality of scenes and a number of characters who appear in one or more of the scenes. For example, the script processed by the system for automated script generation and media production 200 may be a film script, TV script, interactive game script, or any other media script. The script may be in a finished or intermediate (incomplete, or not fully developed) state. The system for automated script generation and media production 200 processes the narrative by a natural language processor trained on an annotated data set to extract a number of key entities and a number of key relationships that appear in the narrative.

The natural language processor may have been trained using supervised or unsupervised learning, or may perform supervised or unsupervised learning during operation. Supervised learning is the machine learning task of inferring a function from labeled training data and unsupervised learning is a type of machine learning algorithm used to draw inferences from datasets consisting of input data without labeled responses. The natural language processor of the system for automated script generation and media production 200 may use supervised learning in that the data set used for training may be a set of labeled or annotated scripts used as training examples. The natural language processor of the system for automated script generation and media production 200 may also or instead use unsupervised learning in that the data set used for training may be scripts that are not labeled. For example, when performing unsupervised learning, the system for automated script generation and media production 200 may use cluster analysis, which is used for exploratory data analysis to find hidden patterns or grouping in the key entities and relationships extracted from the scripts or other data used to train the natural language processor.

In one embodiment, prior to the processing of the script, there exists categories of possible extracted items and each category is associated with a list of words and their variants belonging to that category. The process may then match the words in the category to words in the script. However, this may create false positives. For example, in the text "Drones buzzed like bees in the sky", the word "bees" is used in a metaphor. Thus, "bees" may be categorized incorrectly and extracted as a particular category of entity (e.g., as a prop). Therefore, the system for automated script generation and media production 200 may employ a plurality of n-grams to process the narrative to understand context, where at least some of the n-grams comprise more than a single word. In using n-grams, the system for automated script generation and media production 200 determines what the probability is that an entity belongs to a particular category if it is surrounded by nearby words. In the example above using "Drones buzzed like bees in the sky", this may be denoted as P(entity="bees"|"drones", "bees", "sky"). The system for automated script generation and media production 200 may also characterize interactions between entities of the script. In scenes that contain one or more characters, the system for automated script generation and media production 200 determines what the "sentiment" of the interaction of the characters is. This may also be accomplished using n-grams to put the language in context and avoid misinterpretations that may happen when statements are taken out of context, such as when characters are using irony or sarcasm.

The system for automated script generation and media production 200 generates a data structure that represents the extracted key entities and the extracted key relationships as a plurality of nodes and a plurality of edges that define logical associations between pairs of the nodes. One example of such a structure is the graph 302 shown in FIG. 3. The key entities are each represented by a respective node. The key entities and relationships may be based on extraction of, or may be, one or more of: scenes represented by the narrative, characters who appear in any of the scenes, non-character objects that appear in any of the scenes, a visual effect, an audio effect or an audio-visual effect that occurs in any of the scenes, locations in which any of the scenes take place, character interactions between at least two characters who appear in any of the scenes, relationships between interactions of pairs of scenes, actions that occur in any of the scenes, emotions displayed by one or more characters in any of the scenes, and sentiments of one or more characters in any of the scenes.

The nodes of the data structure that represent respective key entities may represent various elements regarding the narrative of the script. For example, the nodes may represent one or more of: characters, scenes, events, an action sequences, set pieces, plot, dialogs or character interactions from the narrative. The nodes may also include a visual representation of a sentiment associated with the scene, and/or the event, the action sequence, the dialog or the character interaction represented by the respective node.

The edges each respectively represent a respective relationship between a respective pair of the key entities which are each represented by respective nodes. Each edge may include a visual representation of a level of significance of the scene, the event, the action sequence, the dialog or the character interaction represented by the respective nodes. In some embodiments, the system for automated script generation and media production 200 generates a data structure that represents the extracted key entities and the extracted key relationships as a Bayesian network.

The system for automated script generation and media production 200 may generate respective sparse vector representation for various elements regarding the narrative. A sparse vector is a one-dimensional array of elements comprising a plurality of binary values in which most of the elements are zero. The system for automated script generation and media production 200 may use such sparse vectors to represent various types of data to be input to, or that are output from, nodes of artificial neural networks used in machine learning. For example, the system for automated script generation and media production 200 may use such sparse vectors to represent various elements regarding the script, including, but not limited to, one or more of: nodes of the data structure that represent the extracted key entities of the script, each key entity of the script, each of the key relationships of the script, and each key entity and each of a number of sentiments of one or more characters in the script.

FIG. 3 shows one example graph 302 that may be produced by the system for automated script generation and media production 200 using the processes described above, according to one embodiment. In particular, the system for automated script generation and media production 200 ingests a script, for example, in pdf or Final Draft format, and automatically generates a scene-by-scene visual representation of the script as graph 302. The graph 302 shows the key character interactions. In the embodiment shown in FIG. 3, multiple concentric circles around a node represent different characters in the respective scene represented by the node. For example, for one scene in the script processed by the system for automated script generation and media production 200, represented by node 312, concentric circle 304 represents a first character in that scene, concentric circle 306 represents a second character in that scene, concentric circle 308 represents a third character in that scene and concentric circle 310 represents a fourth character in that scene. Concentric circles of the same color surrounding different nodes represent the same character is present in the other scenes represented by those different nodes.

The different images in each node represent either the type of scene or the sentiment of the scene. For example, the face with a neutral expression shown in node 314 may represent that the system for automated script generation and media production 200 has determined the scene represented by node 314 has a neutral sentiment. The face with a smile shown in node 316 may represent that the system for automated script generation and media production 200 has determined the characters in the scene represented by node 316 had a friendly interaction, while the flame shown in node 312 may represent that the system for automated script generation and media production 200 has determined the characters in the scene represented by node 312 had interactions indicating a conflict. In the embodiment shown in FIG. 3, the edges of the graph 302 between the nodes represent which scenes have interactions that affect interactions in other scenes. For example, the edge 320 connecting the scene represented by node 318 and the scene represented by node 322 represents that the conflict between the characters in the scene represented by node 318 may affect interactions in the scene represented by node 322. The edge 324 connecting the scene represented by node 310 and the scene represented by node 322 represents that the conflict between the characters in the scene represented by node 310 may also affect interactions in the scene represented by node 322.

The images and various visual indicators in FIG. 3 representing different aspects of the script are examples and any number of different images and visual indicators may be used to show the same type of entities, relationships and other aspects in other embodiments, such as, for example, as shown in FIGS. 4 through 8.

The graph 302, which represents key entities of a script and edges that represent respective key relationships between those entities, is interactive. For example, the user may use a mouse or other input mechanism to change or remove nodes, characters, and edges. The system for automated script generation and media production 200 will then indicate on the graph 302 what possible effects such changes may have on the various entities, such as the scenes, relationships and other aspects of the narrative. The system for automated script generation and media production 200 may also suggest new or modified content to include based on the changes made. Various examples of such operations are provided in FIGS. 4 through 8 below.

Figure 4:
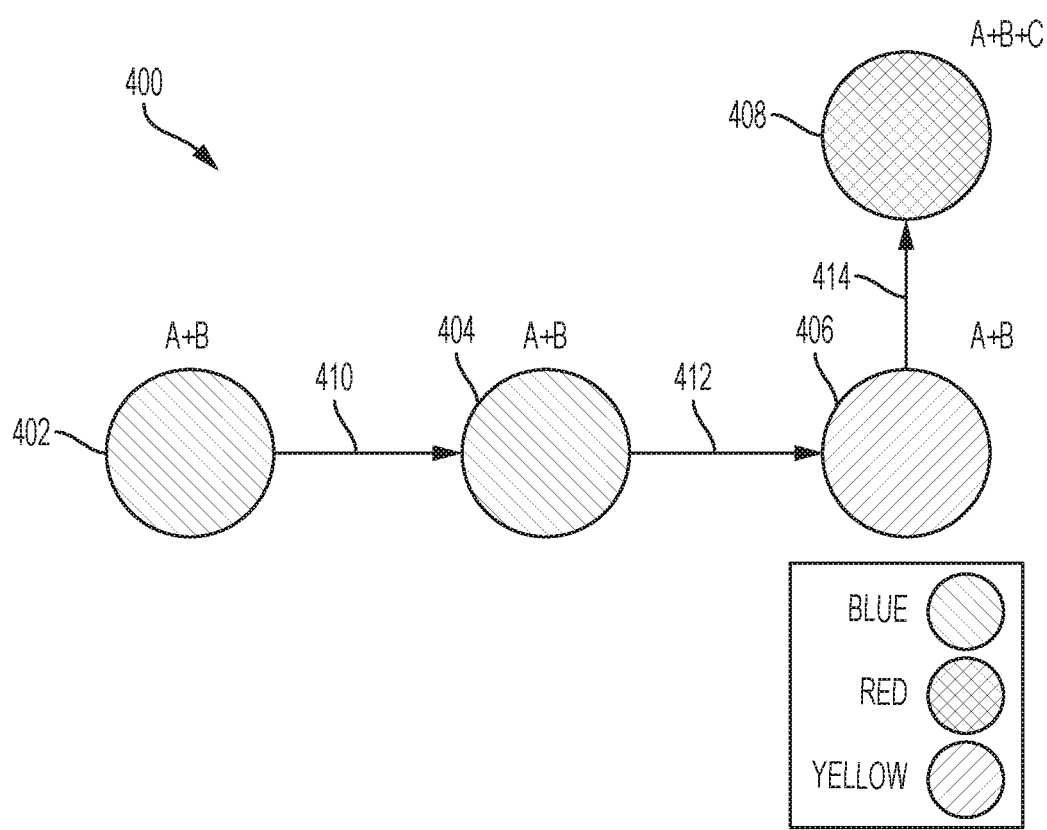
FIG. 4 is an example portion of graph that may be presented on a user interface screen of a system for automated script generation and media production with nodes that represent key entities of a script and are colored according to the sentiment they represent and edges that represent respective key relationships between those entities, according to one illustrated embodiment.

FIG. 4 is an example portion of graph 400 that may be presented on a user interface screen of the system for automated script generation and media production 200 with nodes 402, 404, 406, 408 that represent key entities of a script and are colored according to the sentiment they represent, and edges 410, 412, 414 that represent respective key relationships between those entities. In the example shown in FIG. 4, a blue color indicates the system for automated script generation and media production 200 has determined that a friendly sentiment is associated with the scene, a yellow color indicates the system for automated script generation and media production 200 has determined that a conflict has occurred in the scene and a red color indicates the system for automated script generation and media production 200 has determined that a fight has occurred in the scene. In particular, based on the natural language processing of the script and extraction of key entities by the system for automated script generation and media production 200, the system for automated script generation and media production 200 has determined that characters A and B, extracted from the narrative of the script, had two friendly interactions, one each in the first two scenes. In particular, the first two scenes are represented by nodes 402 and 404, respectively, and the sentiment of those scenes is indicated by the blue color of those nodes. This is followed by the scene represented by node 406 in which it was determined a conflict had occurred between those two characters. Thus, the sentiment of the scene represented by node 406 is indicated by the yellow color of node 406. The scene represented by node 406 is followed by the scene represented by node 408 in which the system for automated script generation and media production 200 determined that the characters A and B had a fight with character C. The sentiment of the scene represented by node 408 is therefore indicated by the red color of node 408.

Figure 5:
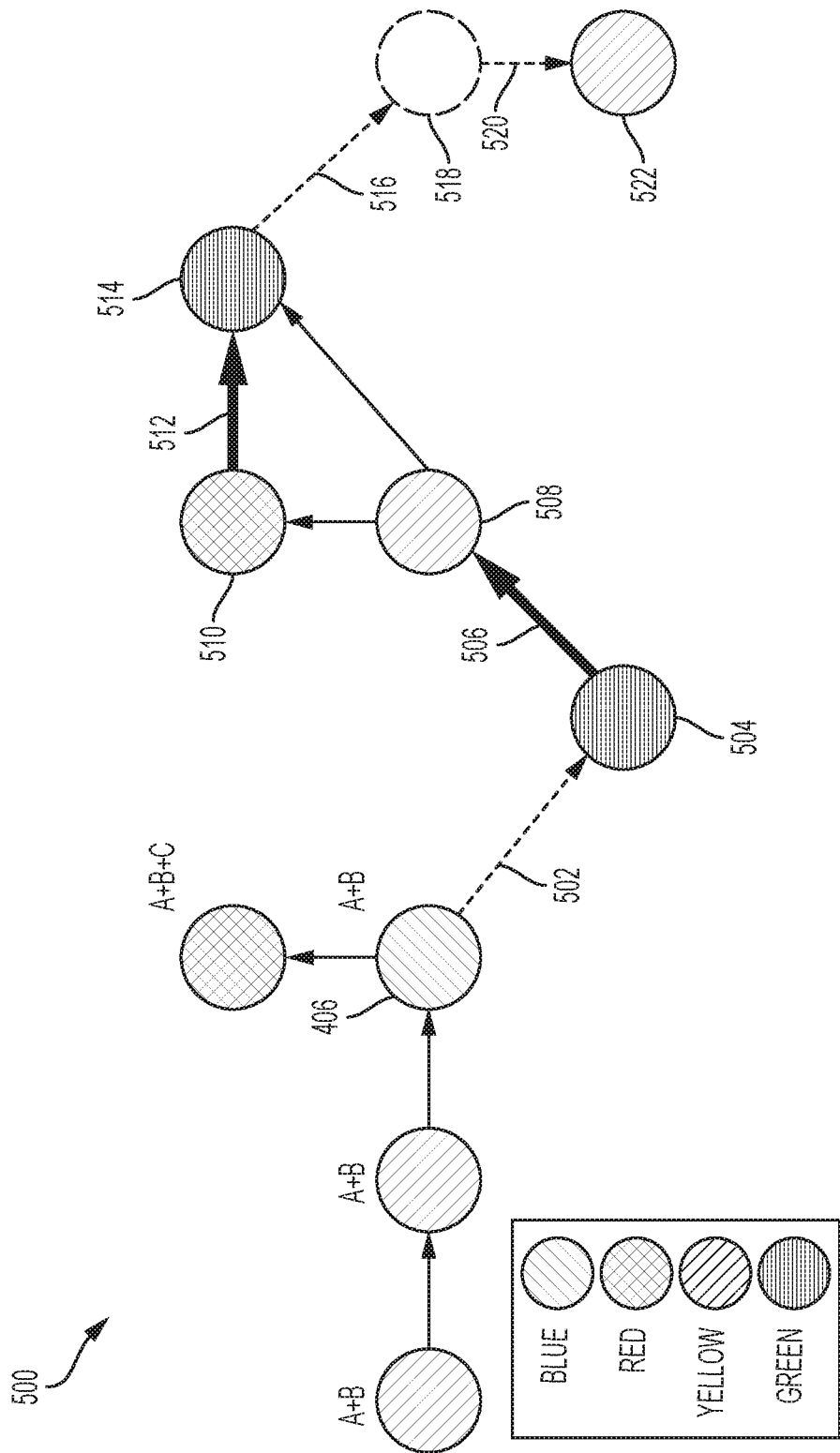
FIG. 5 shows an example expanded portion the graph of FIG. 4 that may be presented on a user interface screen of a system for automated script generation and media production with dotted lines that represent detected aspects of key entities and relationships between the entities represented by the nodes, according to one illustrated embodiment.

FIG. 5 shows an example expanded portion 500 of the graph 400 of FIG. 4 that may be presented on a user interface screen of a system for automated script generation and media production 200 with dotted lines that represent detected aspects of key entities and relationships between the entities represented by the nodes, according to one illustrated embodiment. The width or other characteristic of the edges of the graph 500 represent the significance of the events. In particular, the edge 506 between nodes 504 and 508 with greater width represents a major change between the scenes represented by nodes 504 and 508, for example, a pivotal moment of the story in the script which graph 500 represents. Similarly, the edge 512 between nodes 510 and 514 with greater width represents a major change between the scenes represented by nodes 510 and 514.

Based on the natural language processing of the script and extraction of key entities by the system for automated script generation and media production 200, the system for automated script generation and media production 200 may automatically detect various aspects of the script, including, but not limited to, plot holes and lack of character exposition. In particular, the dotted edge 502 between nodes 406 and 504 represents that the transition between the scenes represented by nodes 406 and 504 has not been fully developed. Similarly, the dotted edge 516 between nodes 514 and 518 and the dotted edge 520 between nodes 518 and 522 represents that the transitions between the scenes represented by nodes 514, 518 and 522 have also not been fully developed. The dotted line defining the bounded area around node 518 represents a lack of character exposition in the scene represented by node 518 in that there should be a scene to make the transition of the characters' relationships more complete. For example, using a sparse vector representation of variables representing the scenes, characters and interactions in the graph 400 as input, the system for automated script generation and media production 200 may predict what events, interactions, scenes or key activities would likely occur given the history of all events represented thus far.

Such predictions by the system for automated script generation and media production 200 may be performed using Bayesian inference. In such an embodiment, the system for automated script generation and media production 200 may generate a data structure that represents the extracted key entities and the extracted key relationships of the sample script as a Bayesian network. If $E_t=\{E_1, E_2, \ldots E_t\}$ is the history of all events (interactions, sentiment, actions) until time t, the system for automated script generation and media production 200 may use Bayesian inference to predict an event, "Joe and Steve start a fight" with a probability $P(E_{t+1}=$"Joe and Steve start a fight"$|E_t)$, given the history of all events until $E_t$. This may be solved recursively with Bayesian surprise according to $P(E_{t+1}|E_t)$ $P(E_{t+1})$, where $P(E_{t+1})$ is the prior probability of event $E_{t+1}$ and $P(E_{t+1}|E_t)$ is evidence based on previous events in the story represented in the narrative of the sample script. The system for automated script generation and media production 200 determines that if $P(E_{t+1}|E_t) P(E_{t+1})>T$ (a threshold), then such an event is surprising. Such information may be useful to the script writer, indicating that the event may either be intended to be surprising or, if not, perhaps more explanation is necessary to fill in a plot hole or lack of character exposition. The threshold, T, may be normalized to the type of story or genre represented in the sample script. T may be set higher for animation scripts and lower for drama scripts.

Figure 6:
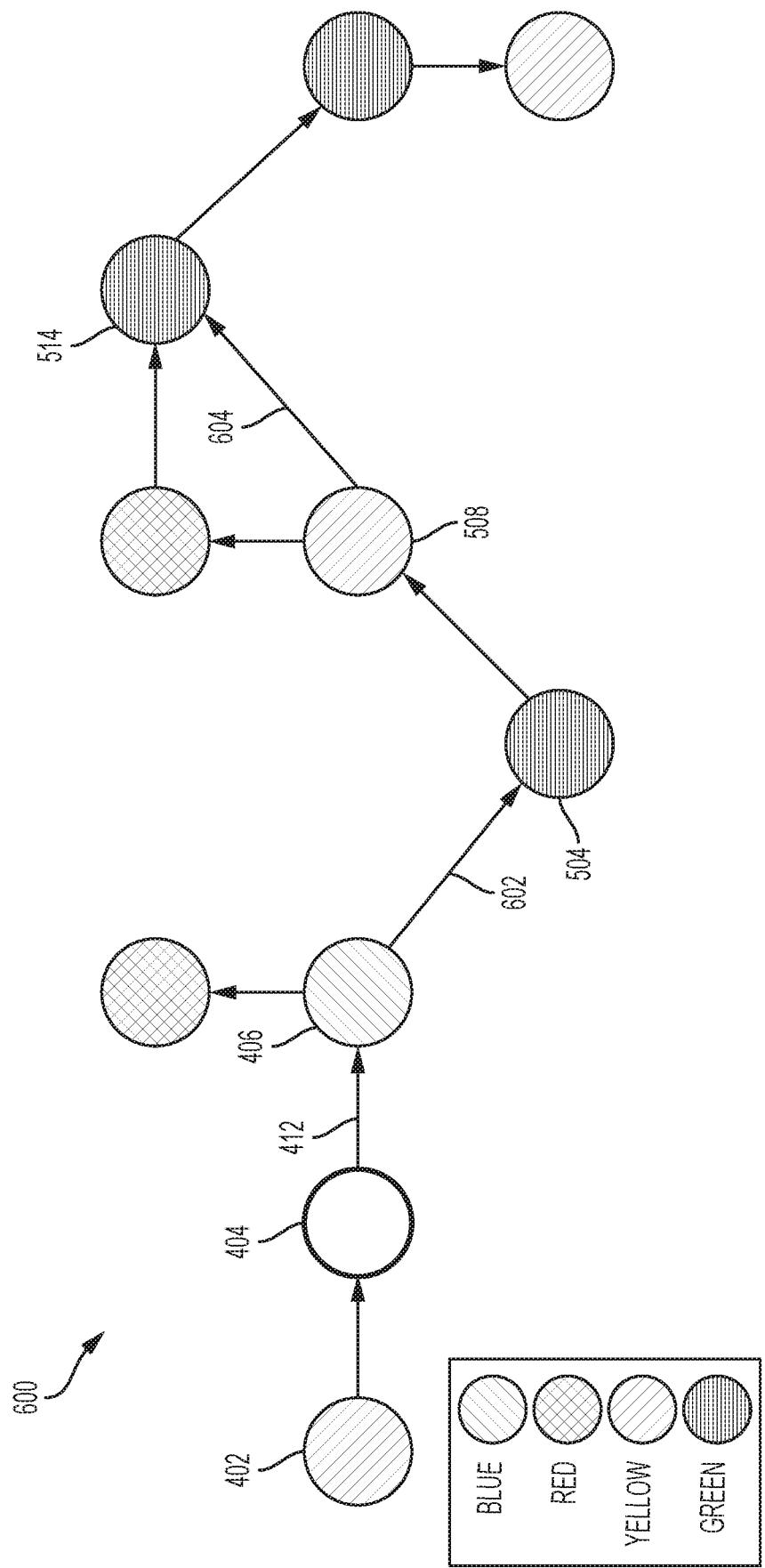
FIG. 6 is an example expanded portion the graph of FIG. 4 that may be presented on a user interface screen of a system for automated script generation and media production, including an indication of an entity in the script represented in the graph that the user would like to change, according to one illustrated embodiment.

FIG. 6 is an example expanded portion 600 of the graph 400 of FIG. 4 that may be presented on a user interface screen of a system for automated script generation and media production 200, including an indication of an entity in the script represented in the graph that the user would like to change, according to one illustrated embodiment. The system for automated script generation and media production 200 may process the sample script, or a portion of the sample script, via the artificial neural network to determine various aspects of the script. In some embodiments, the system for automated script generation and media production 200 may determine an effect that an addition of an instance of new content to the sample script would have on an aspect of a character relationship represented in the sample script. Such an effect may be regarding various different aspects of the narrative. For example, this may be regarding one or more of: a relationship between a pair of characters, a sentiment of a character represented in the sample script, a causal relationship of events represented in the sample script, an event represented in the sample script, an action represented in the sample script, a character represented in the sample script, a scene in the sample script, and a characterization of an interaction between two or more characters represented in the sample script.

As shown in FIG. 6, a user may identify one or more sections of the story represented in the sample script that the user would like to modify. Examples of such modifications include, but are not limited to: removing a character, adding a character, changing an event or nature of interaction between events or characters. As shown in FIG. 6, the system for automated script generation and media production 200 may identify such a change to the scene represented by node 404 by causing node 404 to be displayed as an empty node. Note that before such a desired change was indicated by the user to the system for automated script generation and media production 200, node 404 was blue, as shown in FIG. 4, indicating a friendly sentiment was previously associated with the scene represented by node 404. Therefore, the change in color of node 404 may now indicate the user desires to change the interaction of the characters, which may change the sentiment, and thus color, associated with the node representing the scene. Although a change in color of the node is shown in the present example to indicate such a desired change, other indications may be used in other embodiments, such as bolding, highlighting, marking or other symbol or visual marker. In some embodiments, different types of indications may represent different types of desired changes.

Figure 7:
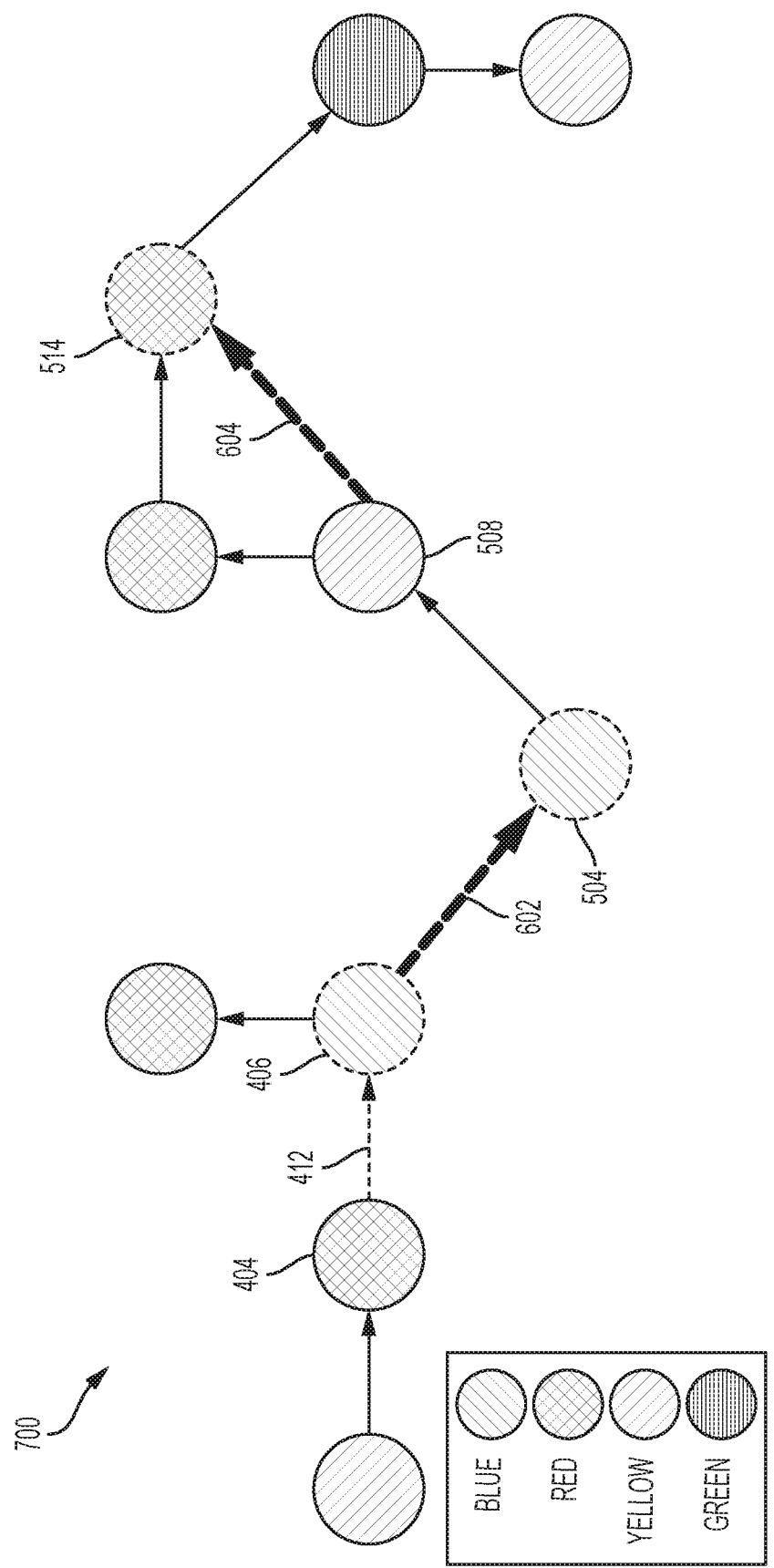
FIG. 7 is a graph comprising an example modified version of the expanded graph portion of FIG. 6 that may be presented on a user interface screen of a system for automated script generation and media production, including indications on the graph of an effect the change indicated in FIG. 6 to the script would have on entities and relationships represented in the script, according to one illustrated embodiment.

FIG. 7 is a graph 700 comprising an example modified version of the expanded graph portion 600 of FIG. 6 that may be presented on a user interface screen of a system for automated script generation and media production 200. This includes indications on the graph 700 of an effect the change indicated in FIG. 6 to the script would have on entities and relationships represented in the script, according to one illustrated embodiment. The graph 700 indicates nodes where the nature of the interactions has changed due to the change in the scene represented by node 404. In particular, the user has indicated changes to the scene represented by node 404 such that the color of node 404 has changed from blue, as previously shown in FIG. 4, to red, as currently shown in FIG. 7, indicating that a change in interactions between the characters would cause a change in sentiment associated with the scene from friendly to a fight occurring between the characters in the scene.

The system for automated script generation and media production 200 determines the effect that this additional instance of new content will have on the other entities and relationships depicted in the graph 600 shown in FIG. 6, such as a change in the nature of the interactions between the characters, and then changes to portions of the graph 600, as shown in graph 700, comprising the modified version of the expanded graph portion 600, to show the effect that this additional instance of new content will have on the other entities and relationships depicted in the graph 600. In particular, the system for automated script generation and media production 200 has indicated that the scenes represented by nodes 406, 504 and 514 would change due to such changes by modifying the solid line defining nodes 406, 504 and 514 to respective dotted lines.

The system for automated script generation and media production 200 has also indicated the nature of the change to the scene represented by node 504 by changing the color of node 504 from green, indicating a neutral interaction between the characters in the scene associated with node 504, to yellow, indicating conflict or animosity. In the present example, the user changing the scene represented by node 404 from the characters having a friendly interaction (represented by the previous blue color of node 404) to having a conflict (represented by the current red color of node 404) causes the system for automated script generation and media production 200 to determine that the nature of the interaction of the characters would change, causing the sentiment of one of the following scenes represented by node 504 to change from neutral (represented by the previous green color of node 504 in FIG. 6) to the characters having a conflict or animosity in that scene (represented by the current yellow color of node 504 in FIG. 7). In the present example, the user changing the scene represented by node 404 from the characters having a friendly interaction (represented by the previous blue color of node 404) to having a fight (represented by the current red color of node 404) causes the system for automated script generation and media production 200 to determine that the sentiment of one of the following scenes represented by node 514 would be changed from neutral (represented by the previous green color of node 514 in FIG. 6) to the characters having a fight in that scene (represented by the current red color of node 514 in FIG. 7).

Furthermore, the system for automated script generation and media production 200 modifies edges 602 and 604 as shown in FIG. 7 to also reflect which nodes or interactions would be more pivotal due to the changes indicated by the user. For example, the edges 602 and 604 are modified to be dotted lines to indicate such a change would occur. The thicker lines of edges 602 and 604 shown in FIG. 7 indicate the change is that the scenes represented by the nodes which edges 602 and 604 connect to would be more pivotal due to the instance of new content added to the sample script as a result of the changes indicated by the user.

The system for automated script generation and media production 200 may also use Bayesian inference to perform this determination of the effect that this additional instance of new content will have on the other entities and relationships depicted in the graph 600 shown in FIG. 6. Using the notation above regarding the event prediction performed by the system for automated script generation and media production 200, the system for automated script generation and media production 200 may predict the effects of what may happen when the user changes an event ($E_t$) at a node in the graph 600. $P(E_{t+1})$ is based on the type of event. For example, if $E_{t+1}$ is a physical action, then the probability represented by $P(E_{t+1})$ may be based on a physics model. If $E_{t+1}$ is an interaction between people, then the probability represented by $P(E_{t+1})$ may be based on a social model. If $E_{t+1}$ is another type of general event, then the probability represented by $P(E_{t+1})$ may be based on a causal model. The system for automated script generation and media production 200 collects a dataset of types of events, encoded as logical predicates, and their probability to perform this analysis. The system for automated script generation and media production 200 may collect such data by querying various engines, for example, physics engines available from Unity Technologies, headquartered in San Francisco, Calif.; causal models; and social behavior from human annotators.

Figure 8:
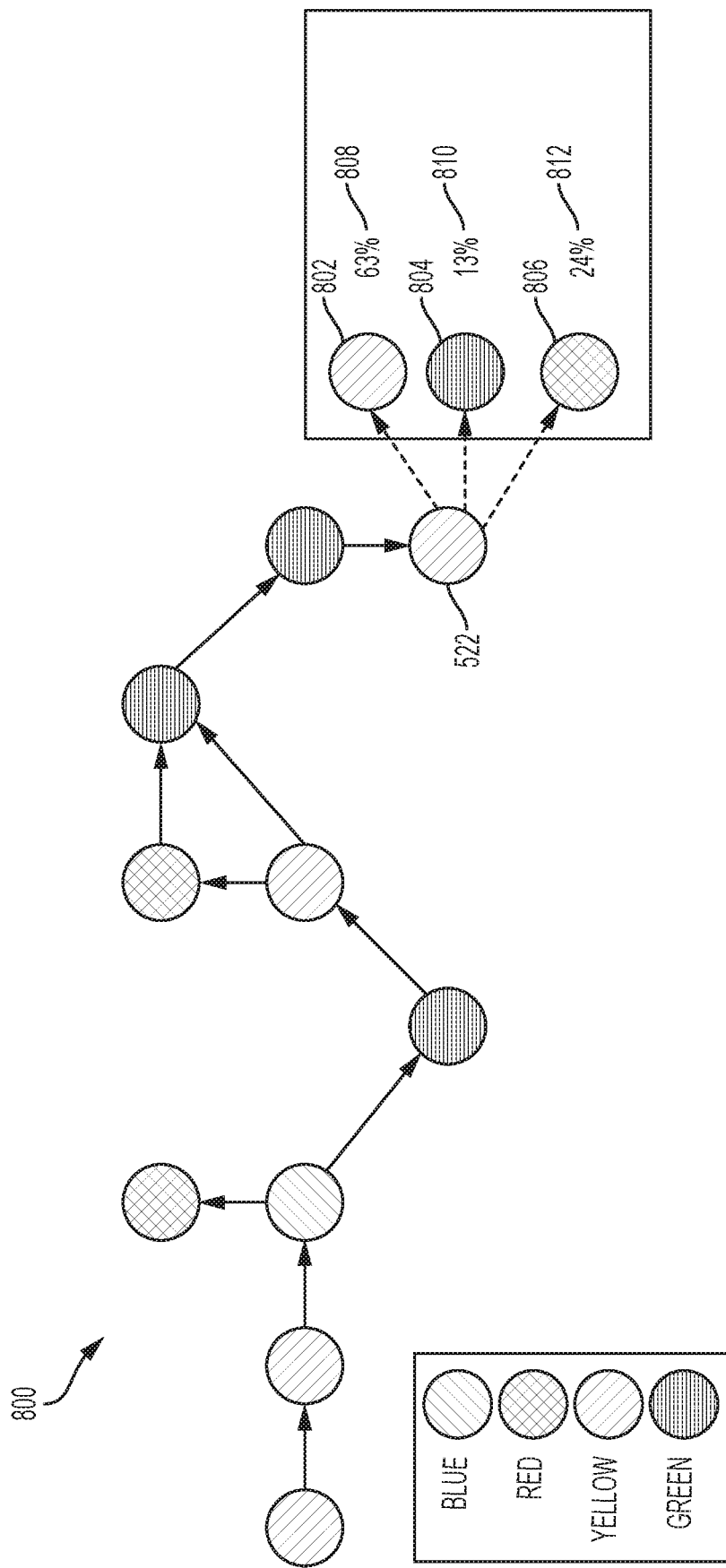
FIG. 8 is graph comprising an example modified version of the expanded graph portion of FIG. 6 that may be presented on a user interface screen of a system for automated script generation and media production including indications on the graph of three additional paths representing instances of new content that are generated as next steps in the story represented in the script, according to one illustrated embodiment.

FIG. 8 is a graph 800 comprising an example modified version of the expanded graph portion 600 of FIG. 6 that may be presented on a user interface screen of a system for automated script generation and media production 200 including indications on the graph 800 of three additional paths represented by nodes 802, 804 and 806 representing instances of new content that are generated as next steps in the story represented in the script, according to one illustrated embodiment. The system for automated script generation and media production 200 may use Bayesian inference to generate the suggested next steps and the respective likelihood of each suggested next step. At any node in graph 800, the user may request the system for automated script generation and media production 200 to provide suggested paths to add to the narrative of the sample script. For example, at the rightmost blue node 522, the user indicates that the user would like the system for automated script generation and media production 200 to generate different paths stemming from the scene represented by node 522. As an example, based on Bayesian inference, three additional paths, represented by nodes 802, 804 and 806, are generated by the system for automated script generation and media production 200 as next steps in the story of the narrative represented by the nodes and edges of graph 800. Node 802 represents a path in the story that could have the characters making peace, indicated by the blue color of node 802. Node 804 represents a path in the story in which the characters have a neutral interaction, indicated by the green of node 804. Node 806 represents a path in the story in which the characters have an interaction characterized by animosity, indicated by the red color node 806.

Furthermore, the system for automated script generation and media production 200 may indicate the corresponding likelihood of occurrence of each path based on the system for automated script generation and media production 200 analyzing the corpus of stories or scripts and determining where such stories or scripts have had a similar path or structure to such indicated paths. For example, based on analyzing a script of a TV show and the corpus of stories or scripts having similar paths in their narratives, the system for automated script generation and media production 200 indicates that, based on the path of the narrative represented by graph 800 so far, the characters make peace in 63% of the cases. This is shown by the indication of "63%" 808 on the graph 800 adjacent to the corresponding blue node 802.

Similarly, the system for automated script generation and media production 200 indicates that, based on the path of the narrative so far, the characters have a neutral interaction in 13% of the cases, shown by the indication of "13%" 810 adjacent to the corresponding green node 804. The system for automated script generation and media production 200 indicates that, based on the path of the narrative so far, the characters have an interaction characterized by animosity in 24% of the cases, shown by the indication of "24%" 812 adjacent to the corresponding red node 806. Such indications may be made in a variety of manners and locations on the user interface screens generated by the system for automated script generation and media production 200, such as in a separate report or list or corner of the screen. In some embodiments, the system for automated script generation and media production 200 may also indicate what effect such changes would have on the narrative, such as, for example, in a similar manner to that shown in FIG. 7.

The user may then select which of the paths, represented by one of nodes 802, 804 and 806, the user would like to include in the narrative. The system for automated script generation and media production 200 may then, in response, generate corresponding content and/or staging directions to include in the narrative according to which path is selected by the user. In some embodiments, such new dialog and/or staging directions may replace existing dialog or staging directions in the sample script. The system for automated script generation and media production 200 may generate a number of instances of new content and/or staging directions for the sample script by processing the sample script, or portion thereof, via the artificial neural network implemented by the system for automated script generation and media production 200. The artificial neural network may be trained on the corpus of one or more annotated scripts or portions of annotated scripts. Such annotated scripts may include both dialog and staging directions used in the training process, thus facilitating the system for automated script generation and media production 200 to perform natural language processing on the sample script to distinguish between dialog and staging directions in the sample script. The corpus of scripts annotated for training purposes may include annotations that distinguish between one or more of the following items that may appear in the corpus of scripts: a number of key entities, a number of key relationships, a number of sentiments, a number of actions, a number of effects, a number of instances of dialog, and a number of instances of staging directions. Such annotations facilitate the system for automated script generation and media production 200 to perform natural language processing on the sample script to distinguish between such items.

Figure 9:
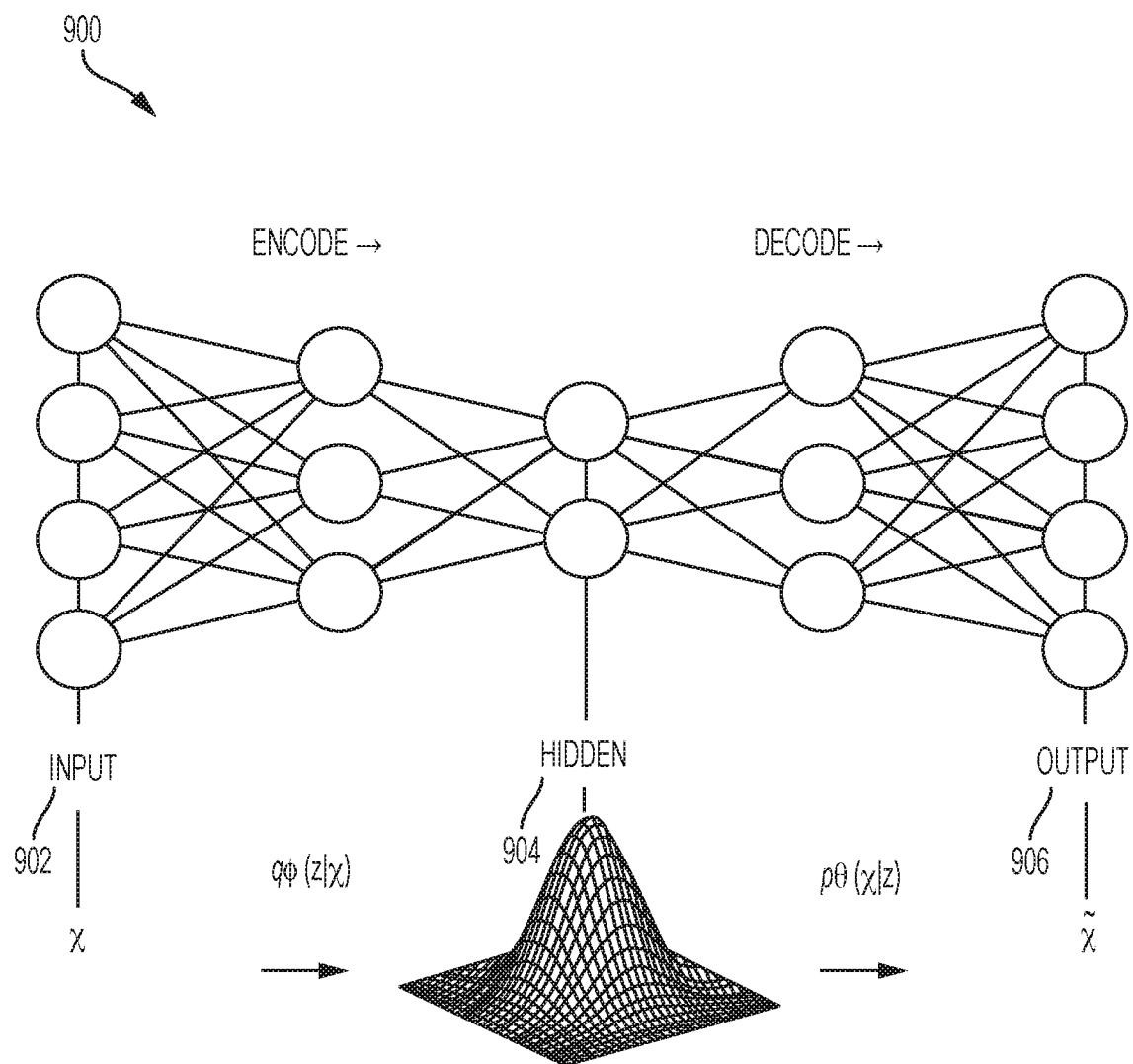
FIG. 9 is a graphical representation of an artificial neural network that is an auto-encoder for processing a sample script in the system for automated script generation and media production, according to one illustrated embodiment.

FIG. 9 is a graphical representation of an artificial neural network that is an auto-encoder for processing a sample script in the system for automated script generation and media production 200, according to one illustrated embodiment. In some embodiments, the artificial neural network for processing the sample script is an auto-encoder 900, such as that represented by FIG. 9. In such embodiments, the system for automated script generation and media production 200 processes the sample script via the auto-encoder 900. The auto-encoder 900 is used for learning generative models of data to generate the suggested next steps in the narrative of the sample script and the respective likelihood of each suggested next step, generate additional instances of new content to include in the narrative of the sample script, and determine the effect that additional instances of new content will have on the entities and relationships represented in the narrative of the sample script.

In one embodiment, the auto-encoder 900 may be a variational auto-encoder, such that the system for automated script generation and media production 200 processes the sample script via the variational auto-encoder with a set of assumptions regarding a distribution of a number of latent (unobserved, inferred) variables. As represented in FIG. 9, the variational auto-encoder 900 includes an input layer 902, an output layer 906 and one or more hidden layers 904 connecting them. The output layer has the same number of nodes as the input layer and has the purpose of reconstructing its own inputs instead of predicting the target value given the inputs x. This reconstruction is represented by $\tilde{x}$.

The variational auto-encoder 900 treats its inputs, hidden representations, and reconstructed outputs as probabilistic random variables within a directed graphical model. In this manner, the encoder portion becomes a variational inference network, mapping observed inputs, represented by x, to (approximate) posterior distributions over latent space, represented by z, and the decoder portion becomes a generative network, capable of mapping arbitrary latent coordinates back to distributions over the original data space. The global encoder and decoder parameters (i.e., neural network weights and biases) are represented as $\phi$ and $\theta$, respectively. The mapping of observed inputs to (approximate) posterior distributions over latent space is represented by $q_\phi(z|x)$. The sampled $\tilde{z}$ is then passed to the decoder/generative network, which symmetrically builds back out to generate the conditional distribution over input space, represented as reconstruction $\tilde{x} \sim p_\theta(x|z)$. The joint distribution of input and latent variables is represented by $P_\theta(x,z) = \int P(z) P_\theta(x|z)$ and a marginal distribution of input variables is represented by $P_\theta(x) = \int P_\theta(x,z)dz$. Calculating the marginal distribution (above) is intractable, so the system for automated script generation and media production 200 uses a variational lower bound, represented by $\log P_\theta(x) \geq \log P_\theta(x) - KL(q_\theta(z|x) \| p_\theta(z|x))$, where KL represents the Kullback-Leibler divergence and is a measure of how one probability distribution diverges from a second, expected probability distribution. The KL-divergence is with a variational posterior $q_\theta(z|x)$. The posterior distribution is a normal distribution parameterized by an artificial deep neural network 1400, such as that shown in FIG. 14.

Figure 10A:
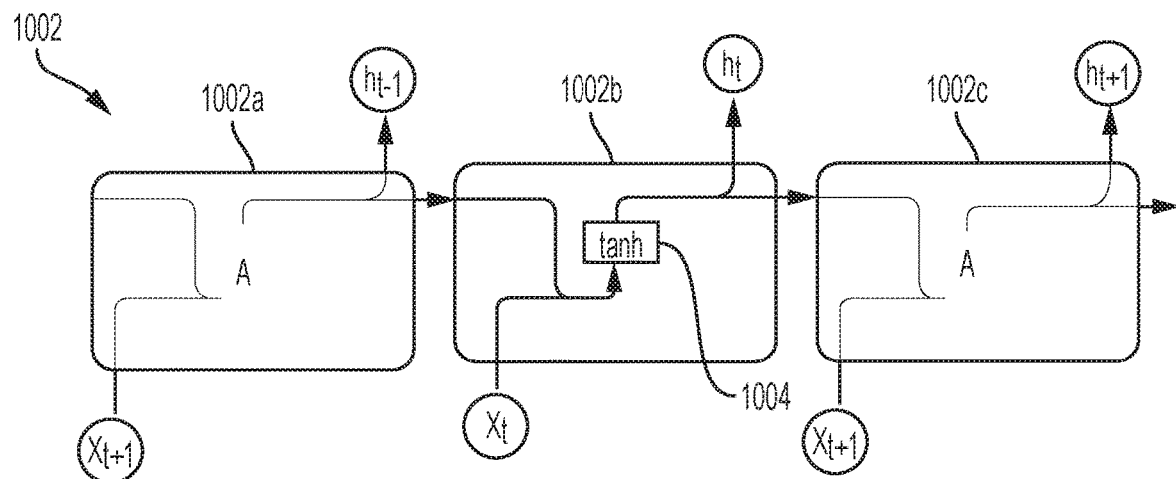
FIG. 10A is a schematic diagram of example recurrent artificial neural network blocks.

FIG. 10A is a schematic diagram of an example portion of a recurrent artificial neural network 1002, including blocks 1002a, 1002b and 1002c. The example recurrent artificial neural network blocks 1002a, 1002b and 1002c represent blocks of a recurrent neural network capable of learning long-term dependencies. All recurrent neural networks have the form of a chain of repeating modules of neural network. In standard recurrent neural networks, this repeating module will have a simple structure, such as a single tanh layer 1004 as shown in FIG. 10A. While using such a standard recurrent neural network may often be effective for processing images and sounds, which have a continuous input space, using such a standard recurrent neural network may be problematic for learning language models because the input space is discrete (e.g., processing "Cats are good pets" and "Bats are good pets"). Thus, to more efficiently and accurately process language models in which more context and long-term dependency is useful to connect previous information in the script to the present task, the system for automated script generation and media production 200 may use Long Short Term Memory (LSTM) networks, which is a type of recurrent artificial neural network.

Figure 10B:
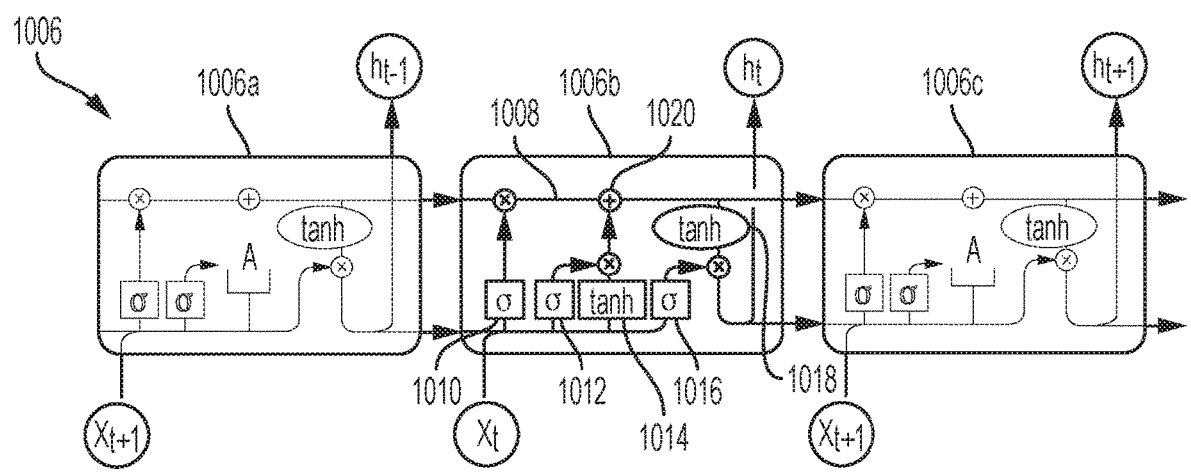
FIG. 10B is a schematic diagram of example long short term memory recurrent artificial neural network blocks for processing a sample script in the system for automated script generation and media production, according to one illustrated embodiment.

FIG. 10B is a schematic diagram 1006 of an example portion of a LSTM recurrent artificial neural network 1006, including blocks 1006a, 1006b and 1006c for processing a sample script in the system for automated script generation and media production 200, according to one illustrated embodiment. LSTMs are a kind of recurrent artificial neural network capable of learning long-term dependencies. LSTMs also have a chain like structure, but the repeating module has a different structure than the more basic recurrent neural network blocks 1002a, 1002b and 1002c of FIG. 10A. In particular, the LSTM recurrent artificial neural network blocks 1006a, 1006b and 1006c include a "cell state" 1008 represented by the horizontal line running through the top of block 1006b. The cell state can be analogized to a conveyor belt that runs straight down the entire chain of blocks 1006a, 1006b and 1006c, with only some minor linear interactions. This allows information to easily flow along it unchanged. Instead of having a single neural network layer, there are multiple layers interacting in a specific way to enable the long-term dependencies.

In particular, there is a sigmoid layer called the "forget gate layer" 1010 which decides what information gets discarded from the cell state 1008. This may also be referred to as a "forgetting artificial neural network" that, in one embodiment, determines which of the previously generated predictions of the LSTM 1006 of the system for automated script generation and media production 200 are reintroduced by the LSTM 1006 in the subsequent iterations of predictions.

The LSTM block 1006b also includes a tanh layer 1014 that creates a vector of new candidate values that could be added to the cell state 1008. This may also be referred to as a "generation artificial neural network" that, in one embodiment, generates predictions during a number of iterations of the LSTM 1006 of the system for automated script generation and media production 200.

The LSTM block 1006b also decides what new information is going to be stored in the cell state 1008. This is performed by a sigmoid layer called the "input gate layer" 1012 that decides which values will be updated. This may also be referred to as an "ignoring artificial neural network" that, in one embodiment, filters the generated predictions of the LSTM of the system for automated script generation and media production 200 based on relevancy. The memory structure 1020 reintroduces (adds) these previously generated predictions from this layer to be used in subsequent iterations of predictions.

There also exists another sigmoid gate 1016 which decides what parts of the cell state 1008 are going to be output. The cell state is then output to a tanh layer 1018 (to push the values to be between −1 and 1) and then multiplied by the output of the sigmoid gate 1016, so that only the parts decided by the previous layers are output from the block 1006b. This may also be referred to as a "selection artificial neural network" that, in one embodiment, determines which of the generated predictions of the LSTM of the system for automated script generation and media production 200 to release to an output system and which of the predictions to retain internally in the artificial neural networks only for use in the subsequent iterations of predictions. The LSTM artificial neural network architecture shown in FIG. 10B is one example embodiment and other LSTM architectures that enable learning of learning long-term dependencies may also be used by the system for automated script generation and media production 200.

Figures 11A, 11B:
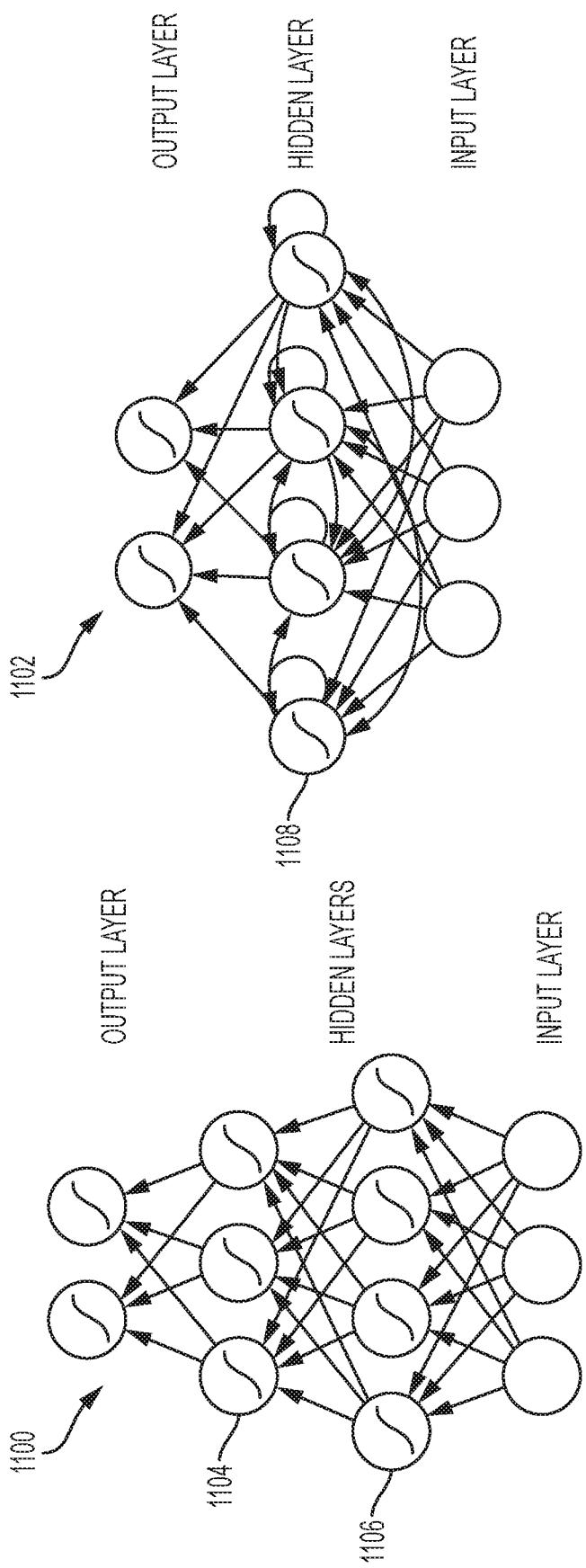
FIG. 11A is a graphical representation of a feedforward artificial neural network.
FIG. 11B is a graphical representation of a recurrent artificial neural network for processing a sample script in the system for automated script generation and media production, according to one illustrated embodiment.

FIG. 11A is a graphical representation of a feedforward artificial neural network 1100 and FIG. 11B is a graphical representation of a recurrent artificial neural network 1102 for processing a sample script in the system for automated script generation and media production, according to one illustrated embodiment. A feedforward artificial neural network, such as the feedforward artificial neural network 1100 of FIG. 11A is an artificial neural network wherein connections between the units do not form a cycle. In the feedforward artificial neural network 1100, the information moves in only one direction, forward, from the input nodes, through the hidden nodes in hidden layers 1106 and 1104, to the output nodes. There are no cycles or loops in the feedforward artificial neural network 1100 and thus, it is stateless. As such, it does not lend itself well to natural language processing because, being stateless, lacks the ability to retain information to provide the context and ability to learn conditional probabilities useful in processing sentences of natural language.

However, the recurrent artificial neural network 1102 of FIG. 11B maintains a state via the example hidden layer 1108, and thus is able to retain information to provide the context and ability to learn conditional probabilities useful in processing sentences of natural language. For example, given training data including the sentence "The quick brown fox", the system for automated script generation and media production 200 may employ the recurrent artificial neural network 1102, which may use LSTM such as LSTM 1006 of FIG. 10B, to learn the conditional probability, such as P (fox|"The quick brown"). This is because of the textual context it can retain surrounding the word "fox." The system for automated script generation and media production 200 may use such learned conditional probabilities for words and sentences to generate text for the sample script. For example, the system for automated script generation and media production 200 may use such a recurrent artificial neural network 1102 to generate text, by running through words and sentences that it predicts have a high likelihood of appearing next based on the corpus of training data and the words and sentences read so far by the system for automated script generation and media production 200 from the sample script.

Figure 12:
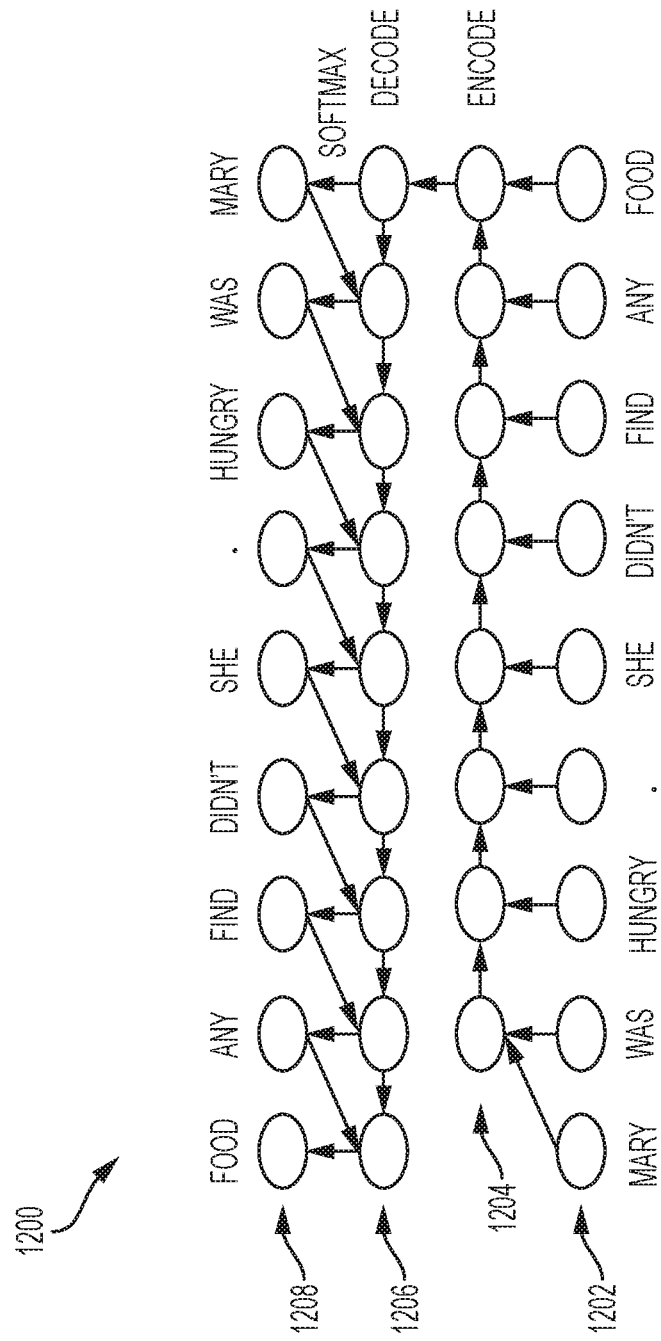
FIG. 12 is a graphical representation of encoding and decoding example sentences using an artificial neural network that is an auto-encoder with long short term memory.

FIG. 12 is a graphical representation of an encoding and decoding process 1200 for example sentences using an artificial neural network that is an auto-encoder with LSTM, such as the LSTM 1006 of FIG. 10B. Each word and punctuation of the example sentences is provided at input nodes 1202, which are provided to an encode layer 1204 and then to a decode layer 1206 to provide the decoded output at output nodes 1208. The encode layer 1204 and decode layer 1206 takes each word and punctuation as it comes individually and encodes and decodes it without regard to any hierarchical relationship between words and sentences.

Figure 13:
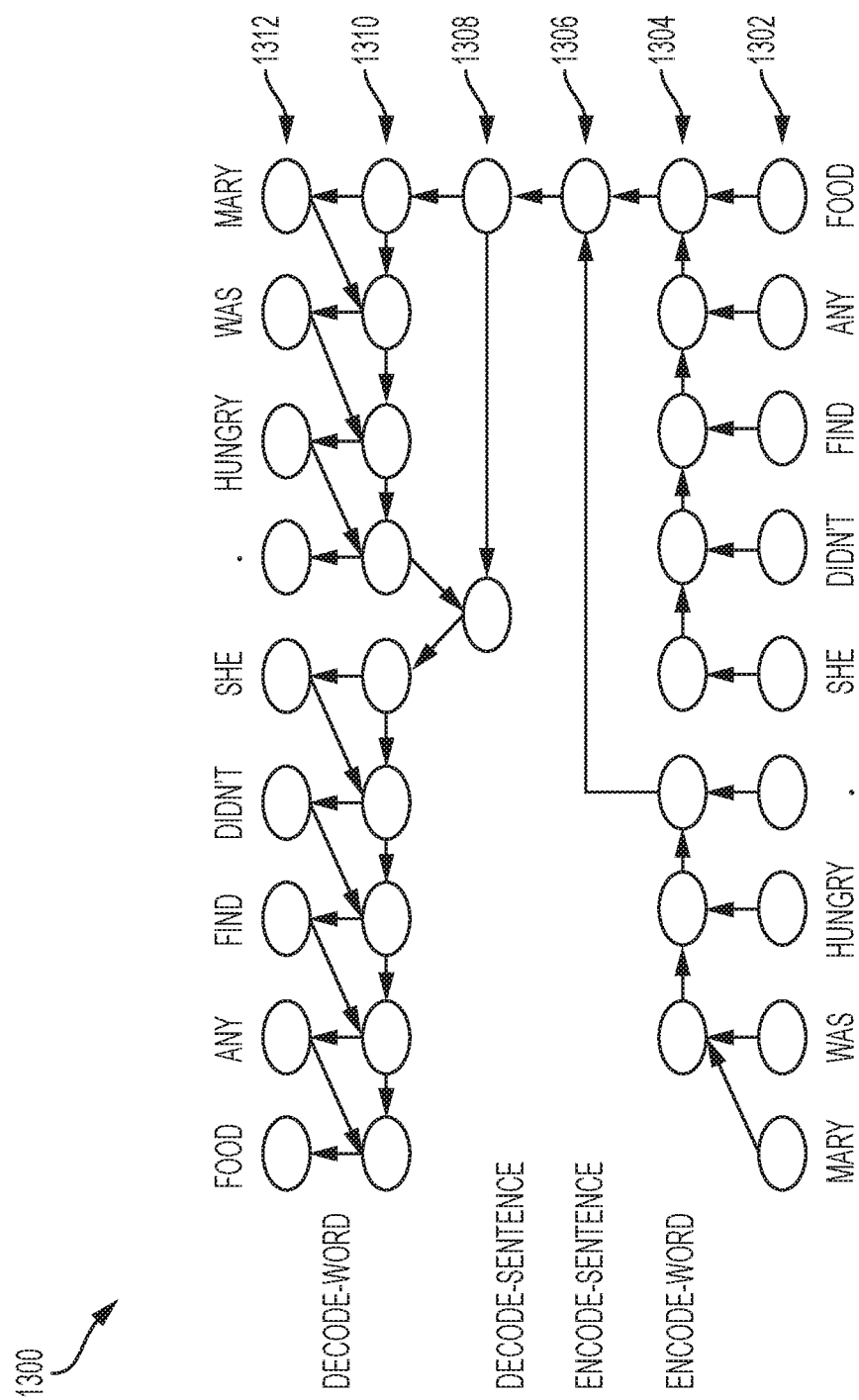
FIG. 13 is a graphical representation of encoding and decoding example sentences using an artificial neural network that is a hierarchical variational auto-encoder with long short term memory for processing a sample script in the system for automated script generation and media production, according to one illustrated embodiment.

FIG. 13 is a graphical representation of an encoding and decoding process 1300 for the same example sentences of FIG. 12, but using an artificial neural network that is a hierarchical variational auto-encoder with LSTM for processing a sample script in the system for automated script generation and media production 200, according to one illustrated embodiment. In contrast to the encoding and decoding process 1200 of FIG. 12, the encoding and decoding process 1300 of FIG. 13 uses a hierarchical variational auto-encoder that encodes and decodes according to a hierarchical relationship between words and sentences. In particular, each word and punctuation of the example sentences is provided at input nodes 1302, but shown is an encode-word layer 1304 that first encodes just the words of the sentences and then an encode-sentence layer 1306 that encodes the sentences after the words are encoded according to the punctuation of a period separating the sentences. This may also be referred to as a "recurrent encoder artificial neural network."

The decode process works the same, but in reverse, first decoding the sentences at decode-sentence layer 1308 according to the punctuation of the period separating the sentences and then decoding the words of each sentence at the decode-word layer 1310 to provide the decoded output at output nodes 1312. This may also be referred to as a "recurrent decoder artificial neural network" and in an embodiment where the system for automated script generation and media production 200 processes a corpus of annotated scripts, may have a loss function that is a variational upper bound on a log-likelihood of the corpus of annotated scripts. This hierarchical nature of a hierarchical variational auto-encoder with long short term memory, shown by the encoding and decoding process 1300, is useful to the system for automated script generation and media production 200 for treating sentences as separate, individual entities and learning conditional probabilities on a sentence by sentence basis, rather than just a word-by-word basis.

FIG. 14 is a graphical representation of an artificial deep neural network 1400 based on a restricted Boltzmann machine (RBM) that is trained to generate script content in the system for automated script generation and media production 200, according to one illustrated embodiment. As shown in FIG. 14, the artificial deep neural network 1400 comprises an input layer 1402, one or more hidden layers 1404 and an output layer 1406. An RBM is a generative stochastic artificial neural network that can learn a probability distribution over its set of inputs. In particular, the RBM of FIG. 14, may model the joint probability of inputs at input layer 1402 and outputs at output layer 1402, represented as P(x, y, θ), to generate script content. In particular, the artificial deep neural network 1400 may be used by the system for automated script generation and media production 200 to determine the probability distribution that gives the probability that each of x and y, representing entities extracted from scripts, falls in any particular range or discrete set of values represented by θ. The artificial deep neural network 1400 of the system for automated script generation and media production 200 may also be trained on an annotated data set to extract a number of key entities and a number of key relationships that appear in the narrative. In particular, the artificial deep neural network 1400 may use machine learning wherein the data set used for training may be a set of labeled or annotated scripts used as training examples. The system for automated script generation and media production 200 may provide functionality for annotating such scripts for training purposes in machine learning.

FIG. 15A is an example user interface screen 1500 for generating an annotated training corpus in the system for automated script generation and media production 200 showing a cursor 1504 being within a defined spatial relationship with respect to one of the visually identified terms in the script, according to one illustrated embodiment. The system for automated script generation and media production 200 presents a script from the training corpus to be annotated in the interactive user interface screen 1500. The script is presented with a plurality of terms in the presented portion of the script visually identified as compared with other terms in the portion of the script. For example, the term "roll his eyes" is visually identified by a box 1502 surrounding that term. Although a box 1502 is shown, other visual identifications may be used, including, but not limited to: highlighting, bolding, coloring and other markings, etc. The user may then position the cursor 1504 next to, over or within another defined spatial relationship with respect to the term identified by the box 1502. This will, in response, cause a presentation of a defined menu 1506 to appear. The menu 1506 has a plurality of user selectable annotations for the term "roll his eyes." The menu 1506 may be a context sensitive menu and has user selectable annotations in the set shown based on a class to which the visually identified term belongs. In particular, the system for automated script generation and media production 200 may determine a category to which the term belongs and determine a set of human selectable annotations to present via the respective menu 1506 based on the determined category to which the term belongs. In the example embodiment shown in FIG. 15A, the visually identified term "rolls his eyes" belongs to a class of terms associated with sentiment. Therefore, the selectable annotations in menu 1506 are different sentiments the user may select to associate with the visually identified term "roll his eyes."

The menu 1506 may be a different type of menu in various different embodiments, including, but not limited to: a drop-down menu, a pop-up window and a static menu. The menu 1506 may also appear at various different locations on the user interface screen 1500 in different embodiments. Also, the user interface screen 1500 need not employ a cursor, but may be a touch screen that enables the user to select the visually identified term to cause the menu 1506 to appear by touching, pressing, holding or performing other touch gestures on the user interface screen 1500 with respect to the visually identified term 1502.

Figure 15B:
FIG. 15B is the example user interface screen of FIG. 15A for generating an annotated training corpus in the system for automated script generation and media production showing a context sensitive menu with a set of user selectable annotations for the visually identified term in the script.

FIG. 15B is the example user interface screen 1500 of FIG. 15A for generating an annotated training corpus in the system for automated script generation and media production 200 showing a context sensitive menu 1506 with a set of user selectable annotations for the visually identified term 1502 in the script. The user may move the cursor 1504 over one of the user selectable annotations in the context sensitive menu 1506 to select one of the user selectable annotations in the context sensitive menu 1506. In the example embodiment shown in FIG. 15B, the user has moved the cursor 1504 over the annotation "Frustration" 1508 to select that annotation to be the sentiment associated with the visually identified term "rolls his eyes" to facilitate the system for automated script generation and media production 200 to train the artificial deep neural network 1400 or other artificial network described herein. The selectable annotation 1508 may also become highlighted or otherwise marked when the cursor 1504 is moved over it, when it is clicked on and/or the selectable annotation 1508 is otherwise selected.

The user selecting the user selectable annotation 1508 causes the system for automated script generation and media production 200 to store a logical relationship between the visually identified term and a value that represents the selected annotation 1508. Thus, during training, when the artificial deep neural network 1400 selects the sentiment "Frustration" to be associated with the term "roll his eyes" within the context of the script shown in FIG. 15B, it will be indicated and stored for future reference and training purposes during the training process as a correct categorization. The user interface screen 1500 need not employ a cursor, but may be a touch screen that enables the user to select the annotation 1508 by touching, pressing, holding or performing other touch gestures on the user interface screen 1500 with respect to the annotation 1508.

FIG. 16A is another instance of the example user interface screen 1500 of FIGS. 15A and 15B for generating an annotated training corpus in the system for automated script generation and media production 200, showing a cursor 1504 being within a defined spatial relationship with respect to one of the visually identified terms in the script, according to one illustrated embodiment. In the example of FIG. 16A, the term "The woman grabs" is visually identified by a box 1602 surrounding that term. The user may then position the cursor 1504 next to, over or within another defined spatial relationship with respect to the term identified by the box 1602. This will, in response, cause a presentation of a defined menu 1604 to appear. The menu 1604 has a plurality of user selectable annotations for the term "The woman grabs." The menu 1604 may be a menu of user selectable annotations providing categories for the user to select which category the term belongs to. In particular, the system for automated script generation and media production 200 may determine a set of human selectable annotations to present via the respective menu 1604 based on the context in which the term appears. In the example embodiment shown in FIG. 16A, the selectable annotations in menu 1506 are different categories the user may select to associate with the visually identified term "The woman grabs." The menu 1604 may be a different type of menu in various different embodiments, including, but not limited to: a drop-down menu, a pop-up window and a static menu. The menu 1604 may also appear at various different locations on the user interface screen 1500 in different embodiments. Also, the user interface screen 1500 need not employ a cursor, but may be a touch screen that enables the user to select the visually identified term to cause the menu 1604 to appear by touching, pressing, holding or performing other touch gestures on the user interface screen 1500 with respect to the visually identified term.

FIG. 16B is the example user interface screen 1500 of FIG. 16A for generating an annotated training corpus in the system for automated script generation and media production 200 showing the context sensitive menu 1604 with a set of user selectable annotations for the visually identified term in the script. The user may move the cursor 1504 over one of the user selectable annotations in the context sensitive menu 1604 to select one of the user selectable annotations in the context sensitive menu 1604. In the example embodiment shown in FIG. 16B, the user has moved the cursor 1504 over the annotation "Staging Directions" 1606 to select that annotation to be the sentiment associated with the visually identified term "The woman grabs" to facilitate the system for automated script generation and media production 200 to train the artificial deep neural network 1400 or other artificial network described herein. The selectable annotation 1606 may also become highlighted or otherwise marked when the cursor 1504 is moved over it, when it is clicked on and/or the selectable annotation 1606 is otherwise selected.

The user selecting the user selectable annotation 1606 causes the system for automated script generation and media production 200 to store a logical relationship between the visually identified term and a value that represents the selected annotation 1606. Thus, during training, when the artificial deep neural network 1400 selects the category "Staging Directions" to be associated with the term "The woman grabs" within the context of the script shown in FIG. 16B, it will be indicated and stored for future reference and training purposes during the training process as a correct categorization.

Figure 17:
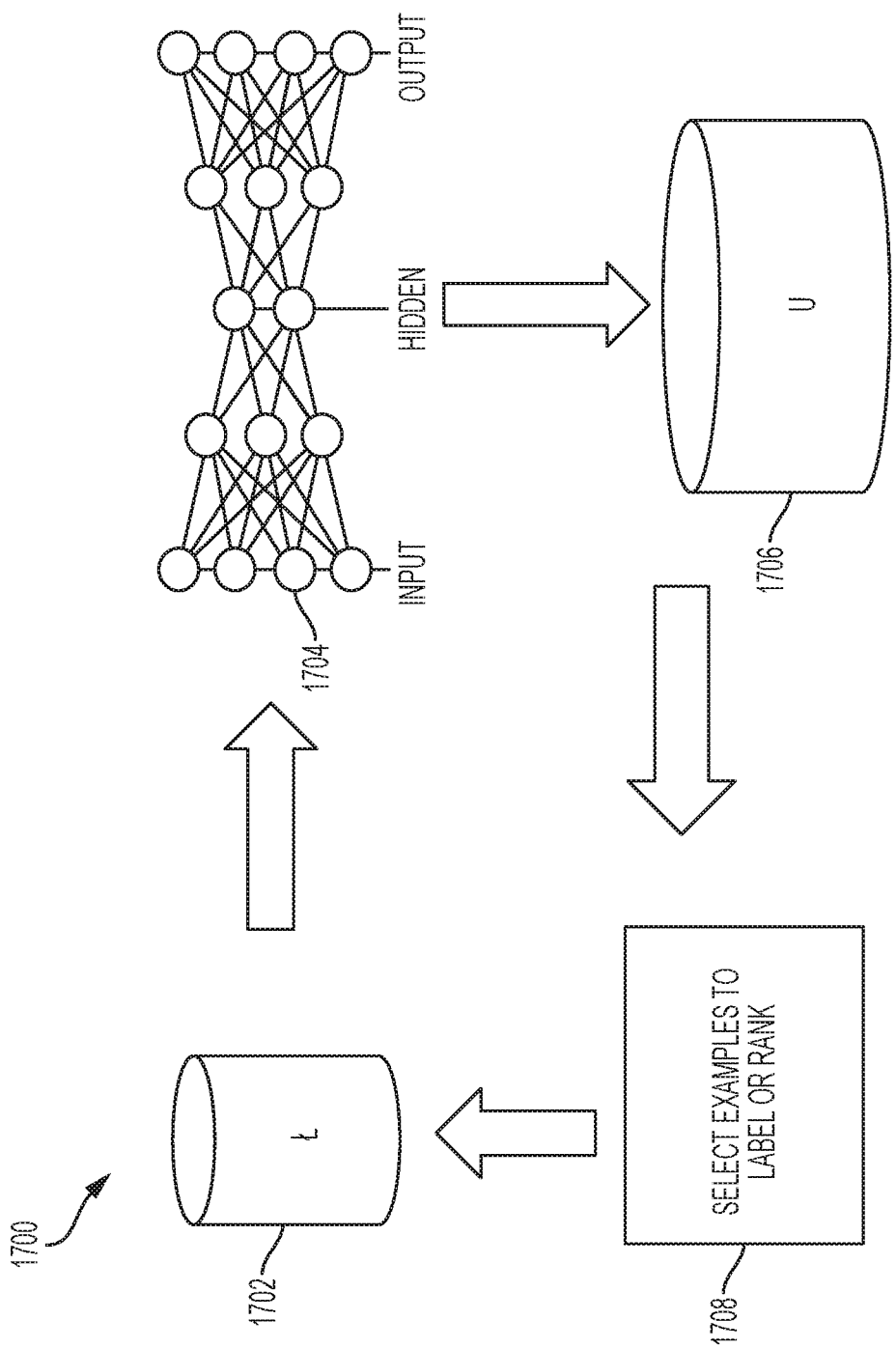
FIG. 17 is a block diagram illustrating a generative active learning process combining reinforcement learning and feedback in the system for automated script generation and media production, according to one illustrated embodiment.

FIG. 17 is a block diagram illustrating a generative active learning process 1700 combining reinforcement learning and feedback in the system for automated script generation and media production 200, according to one illustrated embodiment. Training data may be labeled, for example, via the system for automated script generation and media production 200 as described herein with respect to FIGS. 15A through 16B and stored at labeled training data storage 1702. This training data may comprise a corpus of annotated scripted material. Shown is an artificial neural network 1704, which may be a hierarchical autoencoder with LSTMs as described herein. The labeled training data may be provided as input to the artificial neural network 1704 to train the artificial neural network 1704, such as on a corpus of annotated scripted material. As a result of receiving the training data from storage 1702, the artificial neural network 1704 processes the training data and outputs unlabeled generated data, which is stored at unlabeled training data storage 1706. The system for automated script generation and media production 200 then selects examples of such unlabeled training data to label or rank at 1708, which may be based on criteria to select data points such as, for example, information gain or uncertainty sampling. The system for automated script generation and media production 200 then provides this new selected set of unlabeled training data from unlabeled training data storage 1706 to users to label, for example, via the system for automated script generation and media production 200 as described herein with respect to FIGS. 15A through 16B. This labeled training data is then stored as new instances of labeled training data in labeled training data storage 1702, to be used in the training process, thus providing reinforcement learning and feedback in the system for automated script generation and media production 200.

FIG. 18 is example user interface screen of a text editor 1800 in the system for automated script generation and media production 200 that shows the currently written scene and generates dialogues between the characters based on the nature of their interaction, according to one illustrated embodiment. As described above, the artificial neural network of system for automated script generation and media production 200 may be trained on a corpus of one or more annotated scripts or portions of annotated scripts. The system for automated script generation and media production 200 then receives a sample script and processes the sample script, generating a graph of the narrative, for example, as shown in any of FIGS. 3-8. The system for automated script generation and media production 200 may then generate, via the artificial neural network, a number of instances of new content for the sample script. For example, at any node of the graph as shown in any of FIGS. 3-8, the system for automated script generation and media production 200 may enable the user to request the system for automated script generation and media production 200 to generate dialogues or fill in the details of the scene represented by the selected node of the graph. As shown in FIG. 18, this causes the system for automated script generation and media production 200 to open a text editor 1800 that shows the currently written scene represented by the selected node of the graph, and to make suggestions of dialog or fill in the details of a scene, such as the details of an action sequence. In the embodiment shown in FIG. 18, the system for automated script generation and media production 200 generates dialogues 1802 between the characters based on the nature of the interaction. The user may then use a cursor 1804 to select the dialogs 1802 to be inserted into the script in the script editor 1800. The dialogs 1802 may also be selected by the user touching, pressing, holding or performing other touch gestures on the user interface screen of the text editor 1800 with respect to the generated dialogs 1802.

FIG. 19 is an example user interface screen 1900 of the system for automated script generation and media production 200 showing a sample script and various script elements identified and extracted during a process of breaking down the script for automated media production, according to one illustrated embodiment. The system for automated script generation and media production 200 may implement at least one artificial neural network, such as, for example, at least one the artificial neural networks described with respect to FIG. 9 through FIG. 14, to perform pre-production operations. This may include first including breaking down a sample script that the system for automated script generation and media production 200 receives as input.

Among other elements, the received sample script may include a plurality of scenes, a number of characters who appear in one or more of the scenes, and dialog that occurs during the scenes. The system for automated script generation and media production 200 may process the sample script via the artificial neural network, which had been trained on a corpus of annotated scripts, to identify the various script elements. In one embodiment, the system for automated script generation and media production 200 may generate a script breakdown that represents such elements. These elements may include, but are not limited to, one or more of: the scenes, any of one or more main characters that appear in each of the scenes, mise en scène elements, dialog for each of the characters, scene type, scene length, a number of shots for each of the scenes, interactions between characters for one or more scenes, interactions between two or more characters that occur in one or more scenes, which of the characters interact with one another in a scene, props, visual effects, and audio-visual effects.

The system for automated script generation and media production 200 may store at least a data structure that represents the identified information as a plurality of nodes and a plurality of edges. The edges may respectively define a logical association between respective pairs of the nodes. An example of such a plurality of nodes and a plurality of edges is represented by any one of the graphs in FIGS. 3 through 8.

Interactive user interface screen 1900 shows an example of a portion of such a sample script and various script elements identified and extracted during a process of breaking down the script. In particular, the user interface 1900 shows the sample script has been broken down into a number of scenes 1902. Shown as currently selected by the user is scene 1904, which has been identified by the system for automated script generation and media production 200 as a "Small City/Large Town—Street" scene. The script text of the scene 1904 is shown on the right side of the user interface 1900, with the different types of elements extracted being identified by corresponding different colors. For example, props in the scene 1904 are identified for by the system for automated script generation and media production 200 coloring the text in the script red that identifies the props. Examples of these identified props are "pastries" 1908, "display case" 1912, "chocolate croissant" 1910, "register" 1916 and "empty mugs" 1914.

Characters identified in the scene 1904 by the system for automated script generation and media production 200 are identified by coloring the text in the script purple that identifies the character. For example, the system for automated script generation and media production 200 has identified the text in the script "UNASSUMING MAN" 1906 as a character in the scene and has thus colored that text purple and italicized it. Other types items may be colored differently (e.g., blue) indicating another type of element and/or may be italicized. Various other ways of identifying particular types of script elements may be used in various embodiments, including by highlighting boxing or including other distinctive markings to identify particular types of elements extracted by the system for automated script generation and media production 200.

FIG. 20 is an example user interface screen 2000 of the system for automated script generation and media production 200 showing an example storyboard 2000 generated automatically from the sample script processed by the system, according to one illustrated embodiment. In the example shown in FIG. 20, the system for automated script generation and media production 200 has processed the sample script via the at least one artificial neural network. As described above, the artificial neural network of the system for automated script generation and media production 200 may be trained on a corpus of annotated scripts or portions of annotated scripts. The corpus of annotated scripts may include frame-by-frame annotations that identify each frame by one or more of: a shot size, a shot type, a type of camera movement, a type of equipment, or a type of visual effect. The system for automated script generation and media production 200 then receives a sample script and processes the sample script to identify each scene in the sample script.

For each of a number of the scenes, the system for automated script generation and media production 200 identifies each of a number of shots in the scene. For each of the identified shots, the system for automated script generation and media production 200 classifies the respective shot as one of a plurality of shot classes. In the example shown in FIG. 20, the identified scenes 2002 are listed such that the user may select which scene to view the storyboard for. As shown in FIG. 20, the user has selected scene 2 by selecting the user selectable interface element 2004. In response, each identified shot for that selected scene is listed in order as a storyboard. Using a text-to-image classifier, the system for automated script generation and media production selects an image from an archive of images that best matches each identified shot and/or scene, stores an association of that image with the corresponding shot and/or scene and displays that image in the storyboard 2000 in association with information 2010 regarding the corresponding shot. For example, image 2006 is an image of a man walking to his car, which is selected by the system for automated script generation and media production 200 as corresponding to shot 1 in scene 2, having the description of "walking to car." Similarly, image 2008 is an image of a flyer on a car windshield, which is selected by the system for automated script generation and media production 200 as corresponding to shot 2 in scene 2, having the description "flyer on windshield."

The system for automated script generation and media production also identifies and presents shot information 2010 for each shot in the selected scene, including the scene number, the shot number, the shot description, the shot size, the shot type (or class) and movement associated with the shot. Such shot information 2010 may be presented adjacent to, near or otherwise in association with the image corresponding to that shot in the storyboard. 2000. In various embodiments, more or less shot information 2010 may be identified and/or presented in the storyboard 2000. Also, in some embodiment, the user may reorder the scenes or shots by dragging and dropping the respective scene or shots within the interactive storyboard 2000. The system for automated script generation and media production 200 may then modify the corresponding graph as described above regarding FIGS. 3 through 8 to indicate effects this change would have of the scenes, characters, interactions and other entities of the sample script. The system for automated script generation and media production 200 may also generate and suggest new instances of dialog based on such changes.

FIG. 21 is example user interface screen 2100 of the system for automated script generation and media production 200 showing an example order of shooting various scenes generated automatically by the system for automated script generation and media production 200 based on ingested parameters, according to one illustrated embodiment. The system for automated script generation and media production 200 may ingest a respective schedule or calendar of the cast members of the sample script and dates that represent when the respective shoot location is available. The user may select interactive user interface element 2108 to input such parameters.

The system for automated script generation and media production 200 then performs an optimization on a combination of the dates that represent when the respective shoot locations are available and the ingested schedule or calendar of the cast members. Based on that optimization, the system for automated script generation and media production 200 generates a suggested order, shown in user interface screen 2100, in which the scenes may be shot that fits the ingested schedule or calendar of the cast members and when the respective shoot locations are available. The system for automated script generation and media production 200 may also base the optimization on various other parameters, including, but not limited to, dates that represent when the pieces of equipment or props are available, predicted weather conditions for shoot location(s) and cost constraints.

In the example order shown in FIG. 21, scenes 13, 49, 30 and 104 are suggested to be shot in that listed order on day 1 as shown in the top section 2102 of the user interface screen 2100. Scenes 89, 2, 62 and 106 are suggested to be shot in that listed order on day 2 as shown in the bottom section 2104 of the user interface screen 2100. Days 1 and 2 are separated by a heading 2106 labeled "End of Day 1 of 22." The user may re-enter the parameters regarding the respective schedule or calendar of the cast members of the sample script and dates that represent when the respective shoot location is available by selecting the user interface element 2108 to input such parameters. The suggested order may then change accordingly based on the different parameters that are input.

Figure 22:
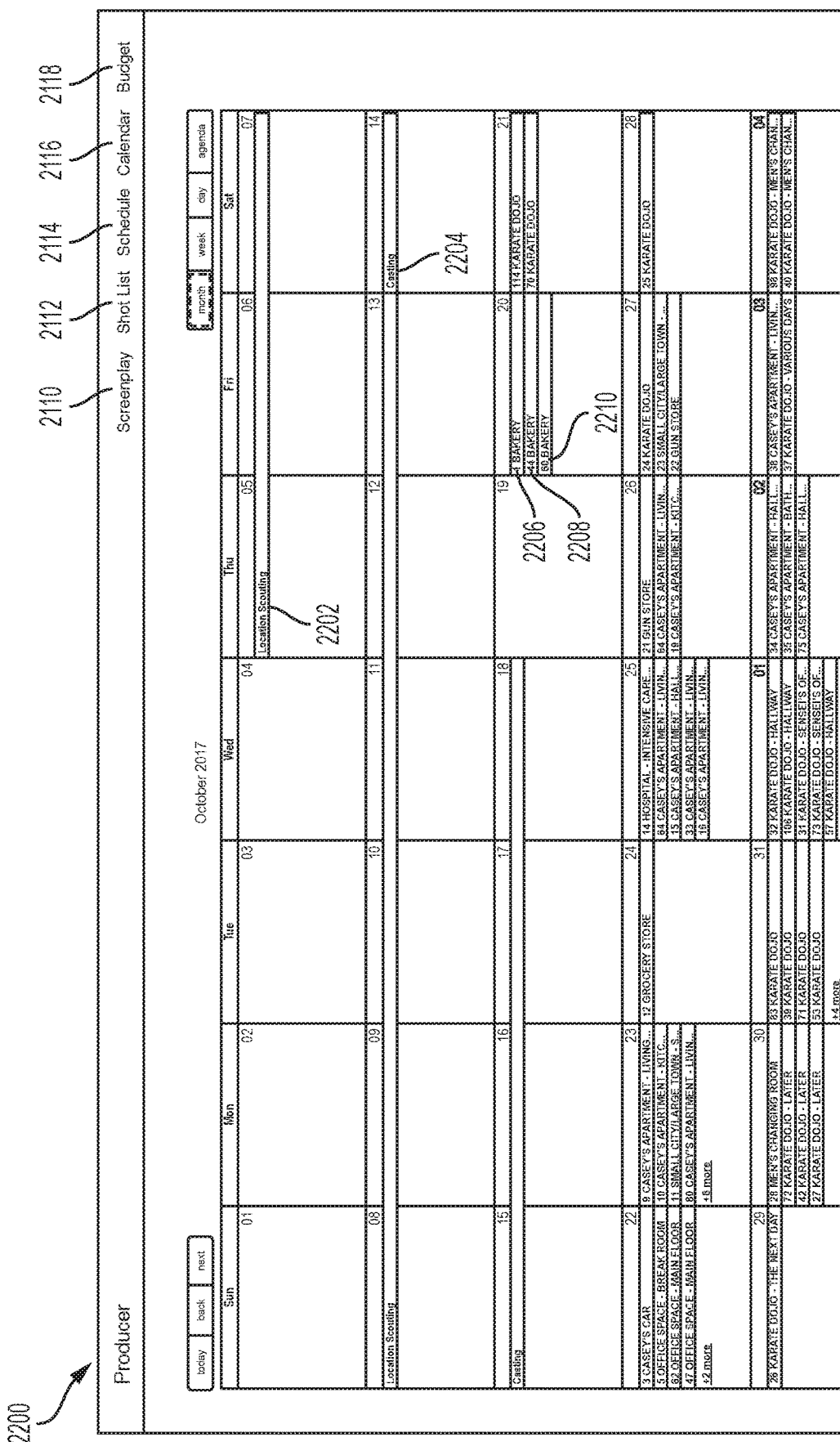
FIG. 22 is an example user interface screen of the system for automated script generation and media production showing an example calendar for shooting various scenes generated automatically by the system for automated script generation and media production based on ingested parameters, according to one illustrated embodiment.

Also shown on the user interface screen 2100 are user selectable menu items that may be selected to view or enter information regarding different aspects of automated script generation and media production. For example, the selectable "Screenplay" user interface element 2110 may be selected by the user for the system for automated script generation and media production 200 to bring up one or more user interface screens regarding the screenplay, such as the user interface screen of a text editor 1800 shown in FIG. 18 or the user interface screen 1900 shown in FIG. 19. The selectable "shot list" user interface element 2112 may be selected by the user to bring up one or more user interface screens regarding the shot list, such as, for example the user interface screen 2000 of the system for automated script generation and media production 200 showing an example storyboard 2000. The selectable "Schedule" user interface element 2114 may be selected by the user to bring up one or more user interface screens regarding the production schedule, such as, for example the user interface screen 2100, showing an order in which the scenes may be shot. The selectable "Calendar" user interface element 2116 may be selected by the user to bring up one or more user interface screens regarding the production calendar, such as, for example the user interface screen 2200 of FIG. 22, showing an example calendar for shooting various scenes. The selectable "Budget" user interface element 2118 may be selected by the user to bring up one or more user interface screens regarding the production budget, such as, for example the media production budget 2300 of FIG. 23.

FIG. 22 is an example user interface screen 2200 of the system for automated script generation and media production 200 showing an example calendar for shooting various scenes generated automatically by the system for automated script generation and media production 200 based on ingested parameters, according to one illustrated embodiment. The system for automated script generation and media production 200 may ingest a respective schedule or calendar of the cast members of the sample script and dates that represent when the respective shoot location is available. The user may select interactive user interface element 2108 to input such parameters. The system for automated script generation and media production 200 then performs an optimization on a combination of the dates that represent when the respective shoot locations are available and the ingested schedule or calendar of the cast members. Based on that optimization, the system for automated script generation and media production 200 generates a suggested calendar. This optimization may include the system for automated script generation and media production 200 decomposing the problem before performing the optimizing and the system for automated script generation and media production 200 may also cast the ingested information as a mixed integer linear programming problem and performing the optimization via at least one mixed integer linear programming solver.

An example of such a calendar according to one embodiment is shown in user interface screen 2200. The system for automated script generation and media production 200 may also base the optimization on various other parameters, including, but not limited to, dates that represent when the pieces of equipment or props are available, predicted weather conditions for shoot location(s) and cost constraints. In the example calendar shown in FIG. 22, a current month of October 2017 is shown as being selected. On each day of the selected month, shown are scenes and corresponding locations scheduled for that day. For example, on October $20^{th}$, scenes "1 Bakery" 2206, "44 Bakery" 2208 and "60 Bakery" 2210 are scheduled to be shot at the bakery location that day. Individual shots may also be itemized and shown on each day of the calendar. Also, other production activities may be shown. For example, October 5 through October 13 is shown on the calendar in the user interface 2200 as being scheduled for location scouting, according to calendar item 2202. Also, October 14 through October 18 is shown on the calendar in the user interface 2200 as being scheduled for casting, according to calendar item 2204. The items on the calendar may also be interactive such that the user can select an item shown on any calendar day and the system for automated script generation and media production 200 will in response bring up the user interface screen associated with that item. For example, if the user selects "1 Bakery" 2206, the system for automated script generation and media production 200 may bring up the interactive storyboard generated by the system for automated script generation and media production for that scene. Using some or all the parameters used to generate the calendar, the system for automated script generation and media production 200 may also automatically generate one or more call sheets that specify activities occurring on the respective day. For example, if the user selects "1 Bakery" 2206, the system for automated script generation and media production 200 may bring up one or more call sheets generated associated with shooting that scene.

Figure 23:
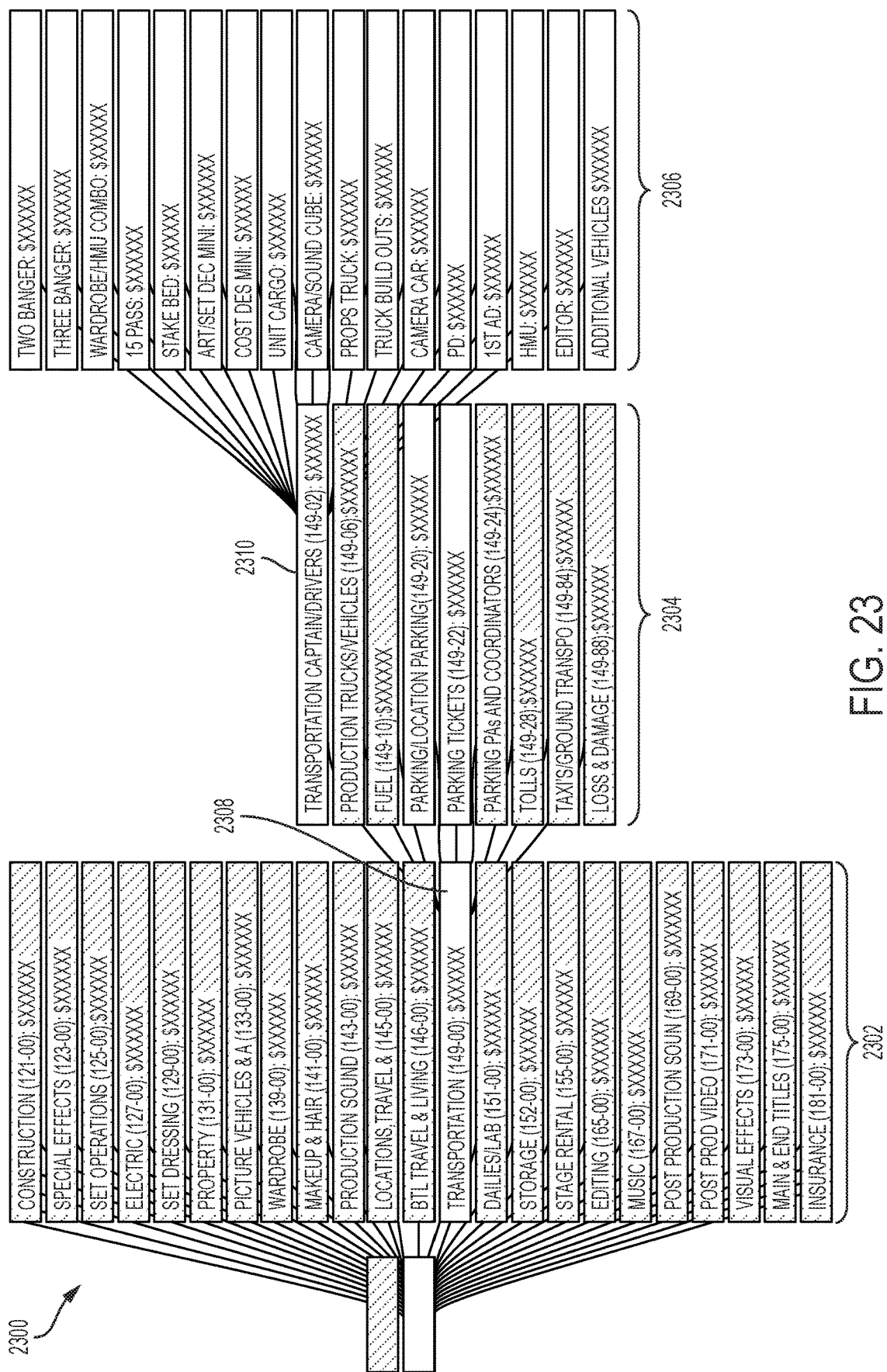
FIG. 23 is an illustration of an example media production budget represented in a tree structure generated by the system for automated script generation and media production, according to one illustrated embodiment.

FIG. 23 is an illustration of an example media production budget 2300 represented in a tree structure generated by the system for automated script generation and media production 200, according to one illustrated embodiment. In the example shown in FIG. 23, the system for automated script generation and media production 200 has processed the sample script via the at least one artificial neural network trained on a corpus of one or more annotated scripts. The artificial neural network of the system for automated script generation and media production 200 may be trained on a corpus of budgets associated with respective productions of one or more of the annotated scripts. In some embodiments, the corpus of annotated scripts may include frame-by-frame annotations that identify each frame by one or more of: a shot size, a shot type, a type of camera movement, a type of equipment, or a type of visual effect.

The system for automated script generation and media production 200 then receives a sample script and processes the sample script to identify each scene in the sample script. The system for automated script generation and media production 200 may process the script by breaking down the script, such as, for example, according to the process described above regarding FIG. 19 to identify script elements of different categories or elements. The categories of script elements may include, but are not limited to, one or more of: scenes, characters that appear in one or more scenes, mise en scène elements, dialog for each of the characters and interactions between such elements. The system for automated script generation and media production 200 generates a script breakdown that represents the scenes and at least the main characters that appear in each of the scenes. The system for automated script generation and media production 200 then generates an estimated budget, such as, for example, the budget 2300 shown in FIG. 23, for a production of the script based at least in part on the generated script breakdown and the corpus of budgets.

As shown in FIG. 23, the budget 2300 may be generated and/or presented in the form of a tree structure with a plurality of line items as end nodes of the tree structure, which may include grouping sets of lowest level line items into respective next higher categories. For example, line item 2308 labeled "Transportation" is part of the top level group of line items 2302 and is an expandable end node that, when selected, expands the budget in a tree structure to present line items 2304 that fall under line item 2308. Furthermore, line item 2310 labeled "Transportation Captain/Drivers" falling under the line item 2308 is also an expandable end node that, when selected, expands the budget 2300 in a tree structure to present line items 2306 that fall under line item 2310. The system for automated script generation and media production 200 may automatically generate respective estimates of costs for each of a plurality of line items that are below the line from the sample script. The system for automated script generation and media production 200 may also receive manually entered estimates of costs for line items that are above the line. The budget 2300 may also be automatically revised when the system for automated script generation and media production 200 receives or generates revisions to the sample script based on a breakdown of the revised script. The system for automated script generation and media production 200 may also compare the generated estimated budget for a production of the script to an actual budget for the production of the script and present a difference in costs between the generated estimated budget and the actual budget for the production of the script accordingly.

FIG. 24 is a block diagram of a media production process 2400 in which the system for automated script generation and media production 200 provides estimated budgets and schedules for production of the script for multiple iterations of the script before the production is approved. Shown are blocks representing various items and operations of the media production process. The media production process starts with a script 2402, which may be revised many times, each time potentially affecting all other production operations. FIG. 24 shows the other production operations as pre-production operation 112 (which includes scheduling and generating budgets), forecasting operation 120, financing operation 108, greenlighting decision 2406 and distribution predictions 2408. The automated processes of the system for automated script generation and media production 200 described herein allows the user to immediately obtain production estimates from the script for each script iteration. Even if it isn't the final production schedule or budget, these are new data that can impact the greenlighting decision 2406. For each iteration of the script, the system for automated script generation and media production 200 provides the script and production estimates to run through forecasting models of the forecasting operation 120 and such script and production estimates also inform the greenlighting decision operation 2406.

The media production process 2400 also receives feedback from the forecasting operation 120 and the distribution predictions 2408 operations and makes adjustments to the script accordingly. Based on the revised script, the system for automated script generation and media production 200 then automatically generates the script and production estimates at the pre-production operation 112 that are then provided to the forecasting operation 120 and greenlighting decision operation 2406 to make decisions regarding greenlighting the production. Because it greatly compresses the time for script rewriting and pre-production planning, the user can use the system for automated script generation and media production 200 to explore "What if . . . " scenarios in a data-driven way. In particular, the user can run the modified script through the system for automated script generation and media production 200 to generate production data. Coupled with a forecasting model used in the forecasting operation 120 and data on distribution predictions from the distribution predictions operation 2408, the system for automated script generation and media production 200 can be used to iterate through different versions of the story and find the most impactful one. The system for automated script generation and media production 200 improves the technology of automated media production by enabling production studios to more efficiently look at the effects of removing certain high-budget spectacles to see how that affects predicted outcomes. For example, the system for automated script generation and media production 200 enables independent filmmakers to more efficiently see the effect of adding a female lead to the story, and how that impacts the chances of signing up distributors.

Figure 25:
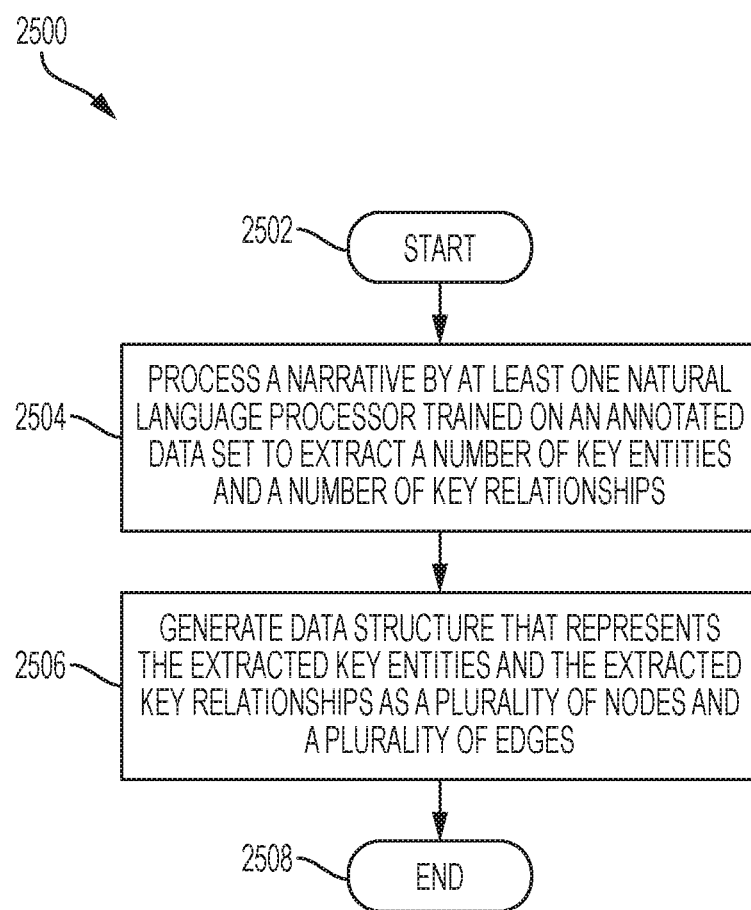
FIG. 25 is a flow diagram showing a method to perform mapping of a narrative of a script to a graph, according to one illustrated embodiment.

FIG. 25 is a flow diagram showing a method 2500 to perform mapping of a narrative of a script to a graph, according to one illustrated embodiment. The narrative may comprise of a plurality of scenes, and a number of characters who appear in one or more of the scenes. The method 2500 to perform mapping of a narrative of a script to a graph commences at 2502.

At 2504, for at least a portion of a narrative, the system for automated script generation and media production 200 processes the at least a portion of a narrative by at least one natural language processor trained on an annotated data set to extract a number of key entities and a number of key relationships that appear in the narrative.

At 2506, the system for automated script generation and media production 200 generates at least one data structure that represents the extracted key entities and the extracted key relationships as a plurality of nodes and a plurality of edges that define logical associations between pairs of the nodes. The plurality of the key entities are each represented by a respective node. A number of the edges each respectively represent a respective relationship between a respective pair of the key entities which are each represented by respective nodes of a respective pair of the nodes. The method 2500 to perform mapping of a narrative of a script to a graph concludes at 2508.

Figure 26:
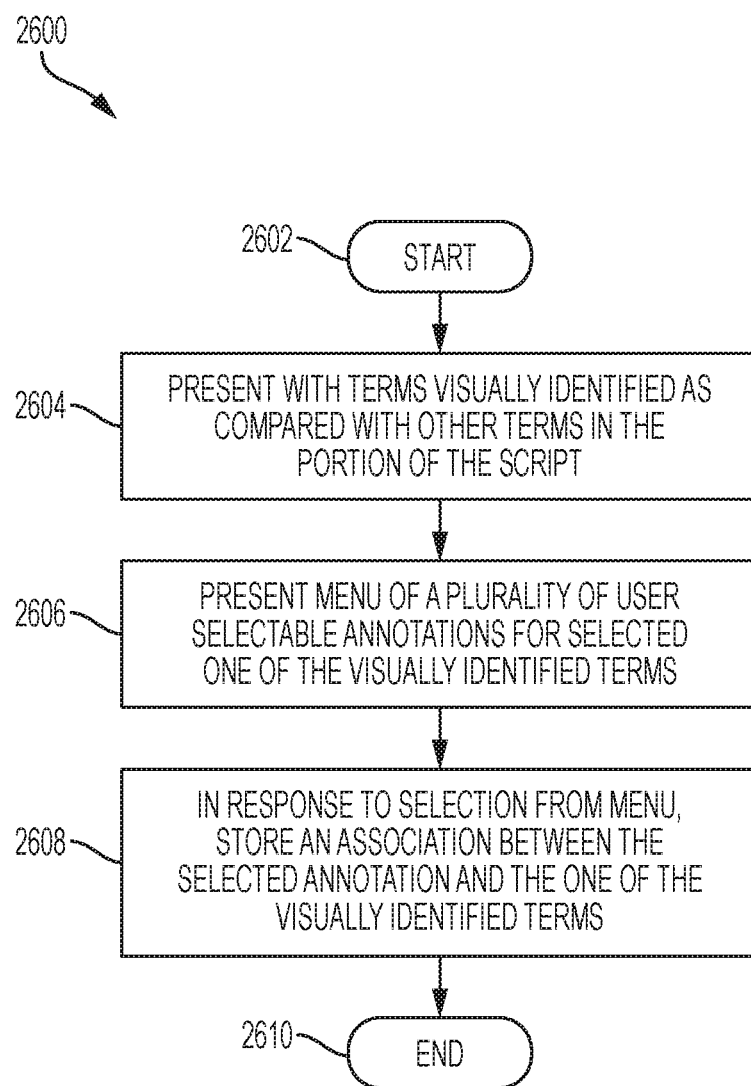
FIG. 26 is a flow diagram showing a method to perform script annotation to generate an annotated training corpus for machine learning, according to one illustrated embodiment.

FIG. 26 is a flow diagram showing a method 2600 to perform script annotation to generate an annotated training corpus for machine learning, according to one illustrated embodiment. The method 2600 to perform script annotation to generate an annotated training corpus for machine learning commences at 2602.

At 2604, the system for automated script generation and media production 200 causes a presentation of at least a portion of a script with a plurality of terms in the presented portion of the script visually identified as compared with other terms in the portion of the script.

At 2606, the system for automated script generation and media production 200, in response to a position of a cursor being within a defined spatial relationship with respect to one of the visually identified terms, causes a presentation of a defined menu of a plurality of user selectable annotations for the respective one of the visually identified terms.

At 2608, the system for automated script generation and media production 200, in response to a selection of one of the user selectable annotations of the respective defined menu that is presented, stores an association between the selected annotation and the one of the visually identified terms. The method 2600 to perform script annotation to generate an annotated training corpus for machine learning concludes at 2610.

Figure 27:
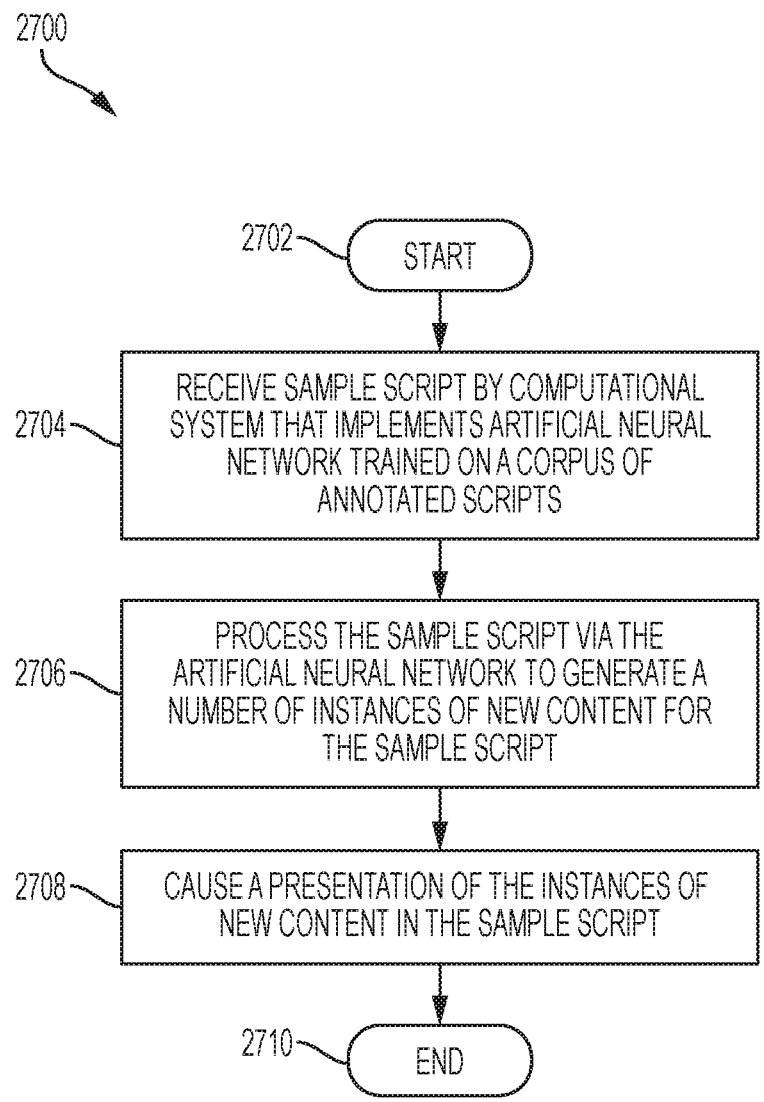
FIG. 27 is a flow diagram showing a method that implements an artificial neural network to generate new script content, according to one illustrated embodiment.

FIG. 27 is a flow diagram showing a method 2700 that implements an artificial neural network to generate new script content, according to one illustrated embodiment. The method 2700 that implements an artificial neural network to generate new script content commences at 2702.

At 2704, the system for automated script generation and media production 200 receives at least one of a sample script or a portion of a sample script by the computational system. The at least one artificial neural network is trained on a corpus of one or more annotated scripts or portions of annotated scripts.

At 2706, the system for automated script generation and media production 200 processes the at least one of the sample script or the portion of the sample script via the at least one artificial neural network implemented by the computational system to generate a number of instances of new content for the sample script.

At 2708, the system for automated script generation and media production 200 causes a presentation of a number of at least one of the instances of new content for the sample script. The method 2700 that implements an artificial neural network to generate new script content concludes at 2710.

Figure 28:
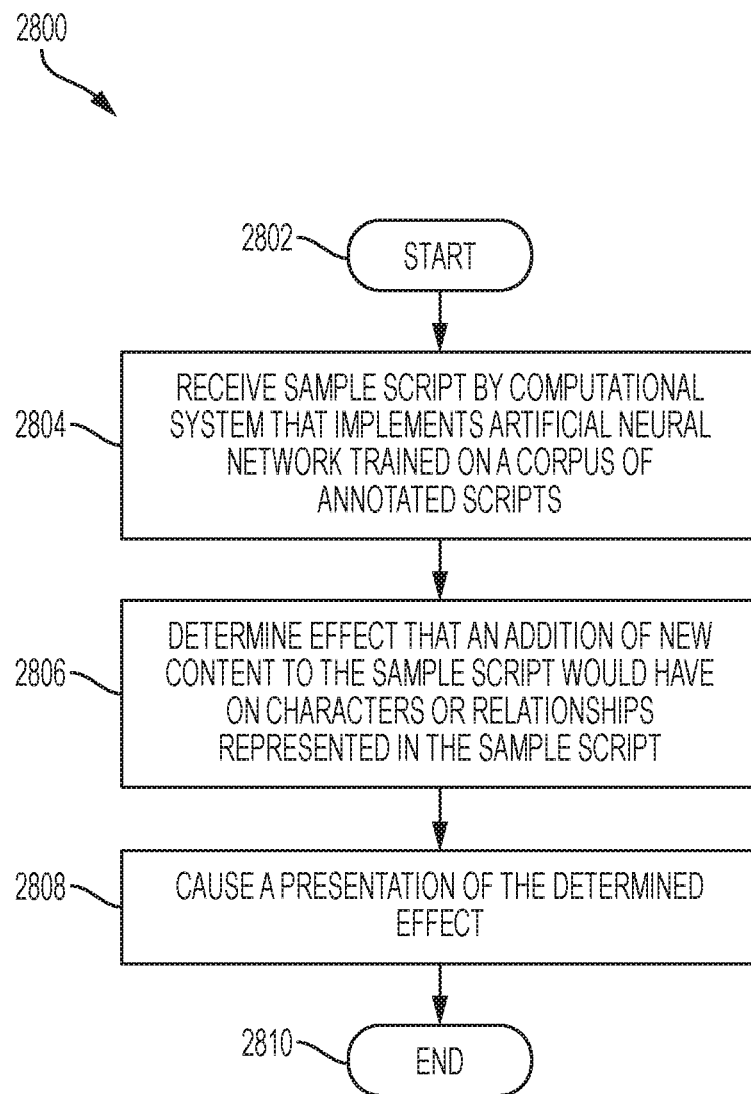
FIG. 28 is a flow diagram showing a method that implements an artificial neural network to determine effects of script changes, according to one illustrated embodiment.

FIG. 28 is a flow diagram showing a method 2800 that implements an artificial neural network to determine effects of script changes, according to one illustrated embodiment. The method 2800 that implements an artificial neural network to determine effects of script changes commences at 2802.

At 2804, the system for automated script generation and media production 200 receives at least one of a sample script or a portion of a sample script by a computational system. The at least one artificial neural network is trained on a corpus of one or more annotated scripts or portions of annotated scripts. The computational system may be, or may be part of, the system for automated script generation and media production 200, or may be a separate system remote from the system for automated script generation and media production 200.

At 2806, the system for automated script generation and media production 200 processes the at least one of the sample script or the portion of the sample script via the at least one artificial neural network implemented by the computational system to determine an effect that an addition of at least one instance of new content to the sample script or the portion of the sample script would have on at least one aspect of at least one character or one relationship represented in the sample script or the portion of the sample script.

At 2808, the system for automated script generation and media production 200 causes a presentation of a representation of the determined effect. The method 2800 that implements an artificial neural network to determine effects of script changes concludes at 2810.

Figure 29:
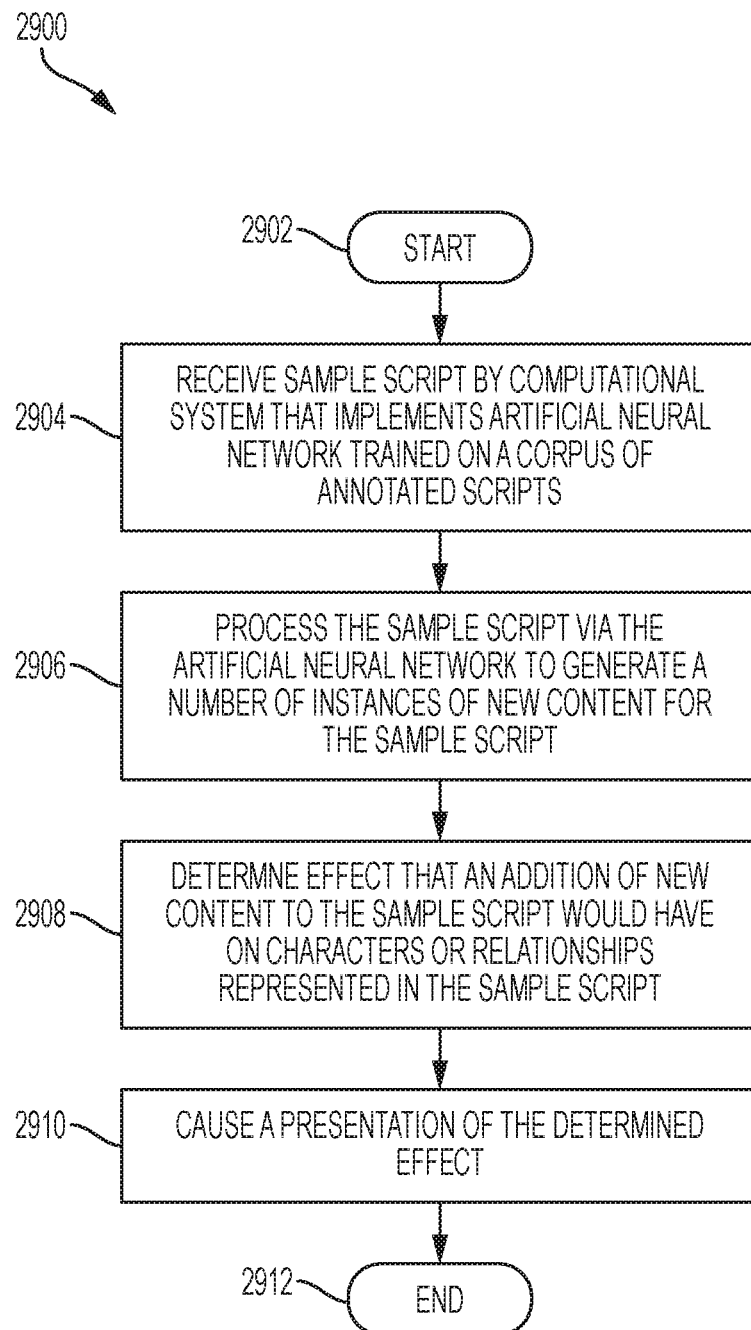
FIG. 29 is a flow diagram showing a method that implements an artificial neural network to generate new script content and determine effects of script changes, according to one illustrated embodiment.

FIG. 29 is a flow diagram showing a method 2900 that implements an artificial neural network to generate new script content and determine effects of script changes, according to one illustrated embodiment. The method 2900 that implements an artificial neural network to generate new script content and determine effects of script changes commences at 2902.

At 2904, the system for automated script generation and media production 200 receives at least one of a sample script or a portion of a sample script by a computational system. The computational system may be, or may be part of, the system for automated script generation and media production 200, or may be a separate system remote from the system for automated script generation and media production 200.

At 2906, the system for automated script generation and media production 200 processes the at least one of the sample script or the portion of the sample script via the at least one artificial neural network implemented by the computational system to generate a number of instances of new content for the sample script.

At 2908, the system for automated script generation and media production 200 processes the at least one of the sample script or the portion of the sample script via the at least one artificial neural network implemented by the computational system to determine an effect that an addition of at least one instance of the new content to the sample script or the portion of the sample script would have on at least one aspect of at least one character or one relationship represented in the sample script or the portion of the sample script.

At 2910, the system for automated script generation and media production 200 causes a presentation of a representation of the determined effect. The method 2800 that implements an artificial neural network to determine effects of script changes concludes at 2912.

Figure 30:
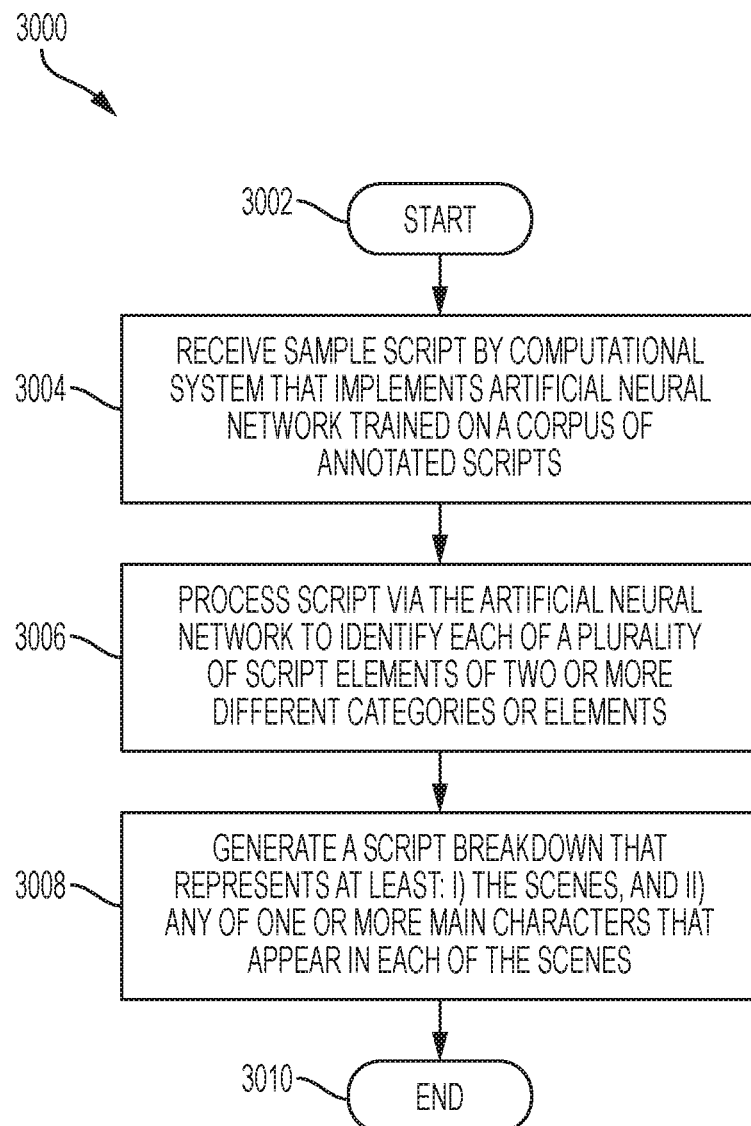
FIG. 30 is a flow diagram showing a method that implements an artificial neural network to perform pre-production operations including script breakdown, according to one illustrated embodiment.

FIG. 30 is a flow diagram showing a method 3000 that implements an artificial neural network to perform pre-production operations including script breakdown, according to one illustrated embodiment. The method 3000 that implements an artificial neural network to perform pre-production operations including script breakdown commences at 3002.

At 3004, the system for automated script generation and media production 200 receives at least one of a sample script or a portion of a sample script by the computational system. The at least one artificial neural network is trained on a corpus of one or more annotated scripts or portions of annotated scripts. The received script or portion of the script may include a plurality of scenes, a number of characters who appear in one or more of the scenes, and dialog that occurs during the scenes.

At 3006, the system for automated script generation and media production 200 processes the at least one of the sample script or the portion of the sample script via the at least one artificial neural network trained at least on the corpus of the at least one of annotated scripts or annotated portions of scripts to identify each of a plurality of script elements of two or more different categories or elements. The categories of script elements may include at least: i) scenes, ii) characters that appear in one or more scenes, iii) mise en scène elements, and iv) dialog for each of the characters.

At 3008, the system for automated script generation and media production 200 generates a script breakdown that represents at least: i) the scenes, and ii) any of one or more main characters that appear in each of the scenes. The method 3000 that implements an artificial neural network to perform pre-production operations including script breakdown concludes at 3010.

Figure 31:
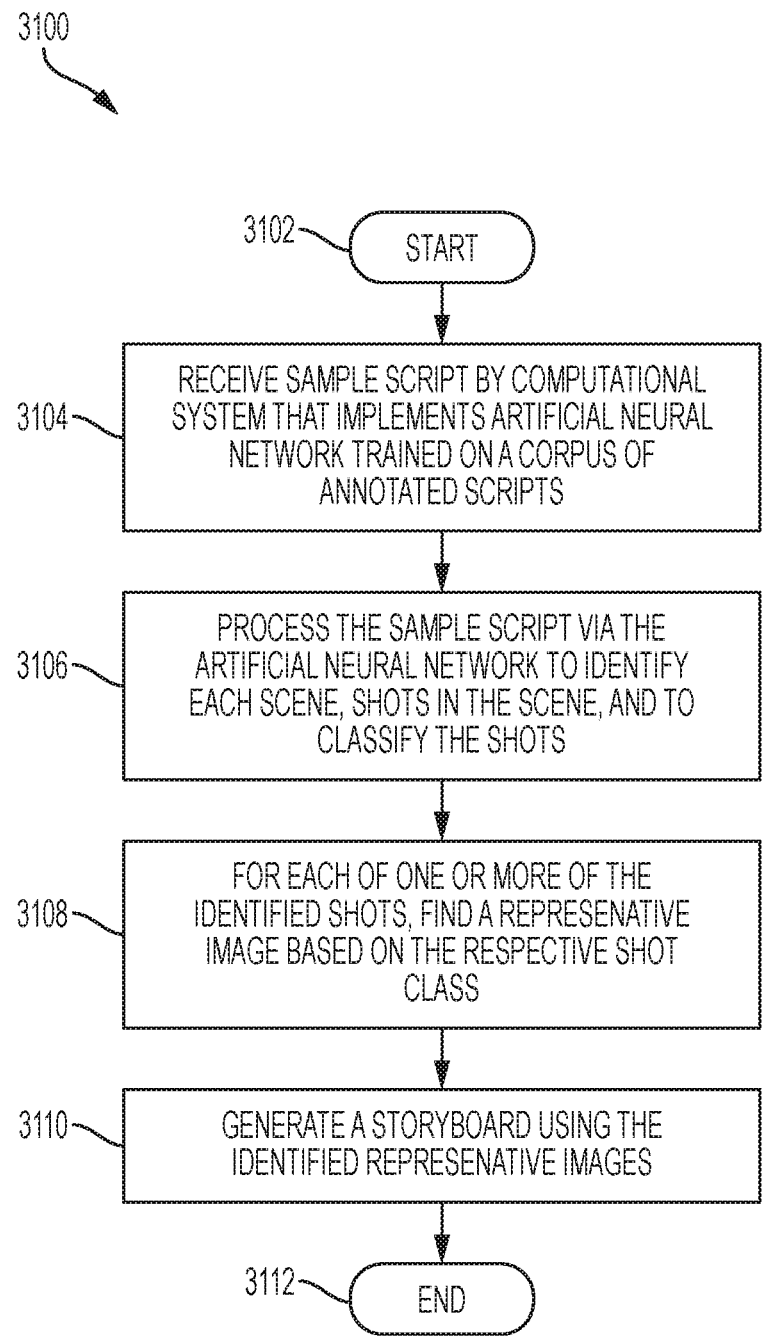
FIG. 31 is a flow diagram showing a method that implements an artificial neural network to perform pre-production operations including storyboard generation, according to one illustrated embodiment.

FIG. 31 is a flow diagram showing a method 3100 that implements an artificial neural network to perform pre-production operations including storyboard generation, according to one illustrated embodiment. The method 3100 that implements an artificial neural network to perform pre-production operations including storyboard generation commences at 3102.

At 3104, the system for automated script generation and media production 200 receives at least one of a sample script or a portion of a sample script by a computational system that implements at least one artificial neural network to perform pre-production operations including storyboard generation. The computational system may be, or may be part of, the system for automated script generation and media production 200, or may be a separate system remote from the system for automated script generation and media production 200. The at least one artificial neural network is trained on a corpus of one or more annotated scripts or portions of annotated scripts. The received script or portion of the script includes a plurality of scenes, a number of characters who appear in one or more of the scenes, and dialog that occurs during the scenes.

At 3106, the system for automated script generation and media production 200 processes the at least one of the sample script or the portion of the sample script via the at least one artificial neural network trained at least on the corpus of the at least one of annotated scripts or annotated portions of scripts to identify each scene in the sample script or the portion of the sample script. For each of a number of the scenes, the system for automated script generation and media production 200 identifies each of a number of shots in the scene, and for each of a number of the identified shots, classifies the respective shot as one of a plurality of shot classes.

At 3108, the system for automated script generation and media production 200, for each of one or more of the identified shots, finds a representative image based on the respective shot class.

At 3110, the system for automated script generation and media production 200 generates a storyboard using the identified representative images. The method 3100 that implements an artificial neural network to perform pre-production operations including storyboard generation concludes at 3112.

Figure 32:
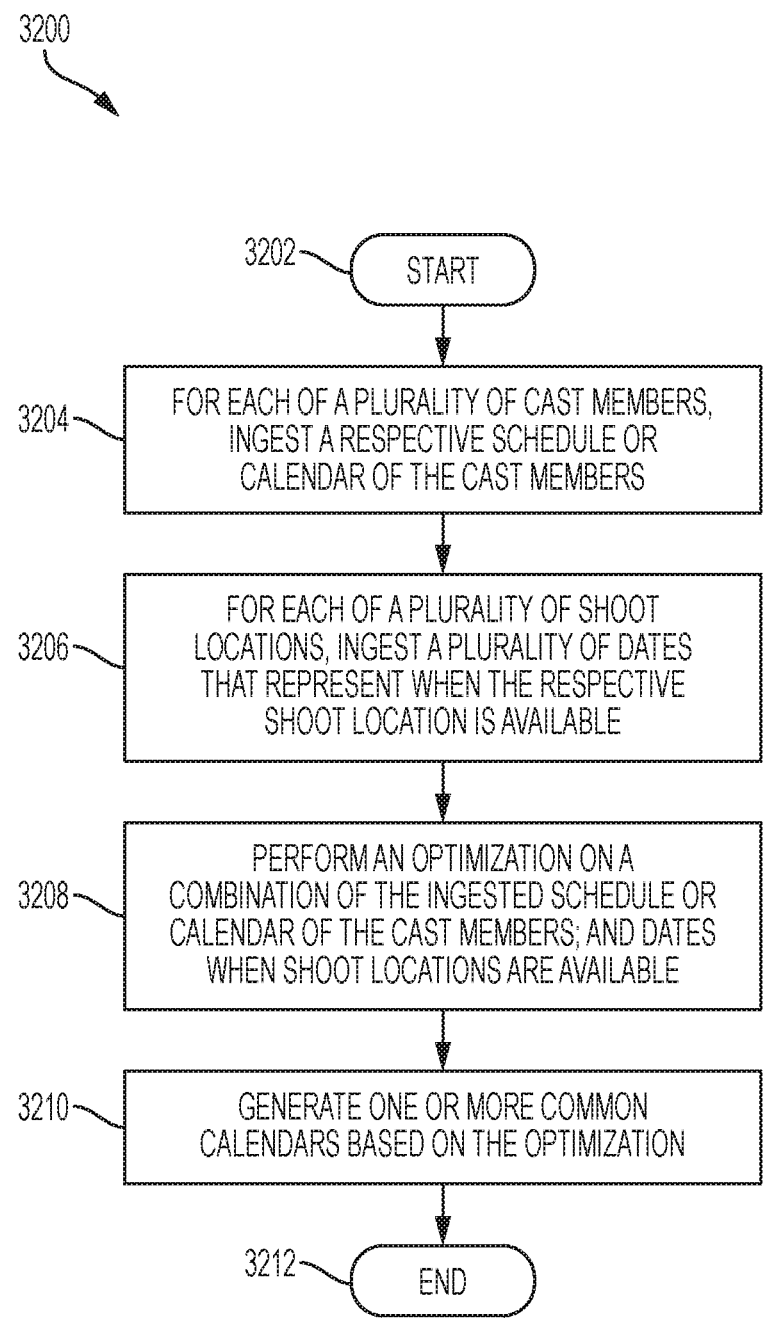
FIG. 32 is a flow diagram showing a method to perform optimization to generate a common calendar for production operations, according to one illustrated embodiment.

FIG. 32 is a flow diagram showing a method 3200 to perform optimization to generate a common calendar for production operations, according to one illustrated embodiment. The method 3200 to perform optimization to generate a common calendar for production operations commences at 3202.

At 3204, the system for automated script generation and media production 200, for each of a plurality of cast members, ingests a respective schedule or calendar of the cast members. The system 200 may also ingest One-liner, Day Out of Days (DOOD) and stripboard schedule information.

At 3206, the system for automated script generation and media production 200, for each of a plurality of shoot locations, ingests a plurality of dates that represent when the respective shoot location is available.

At 3208, the system for automated script generation and media production 200 performs an optimization on at least a combination of the ingested schedule or calendar of the cast members; and the dates that represent when the respective shoot locations are available.

At 3210, the system for automated script generation and media production 200 generates one or more common calendars based on the optimization. The method 3200 to perform optimization to generate a common calendar for production operations concludes at 3212.

Figure 33:
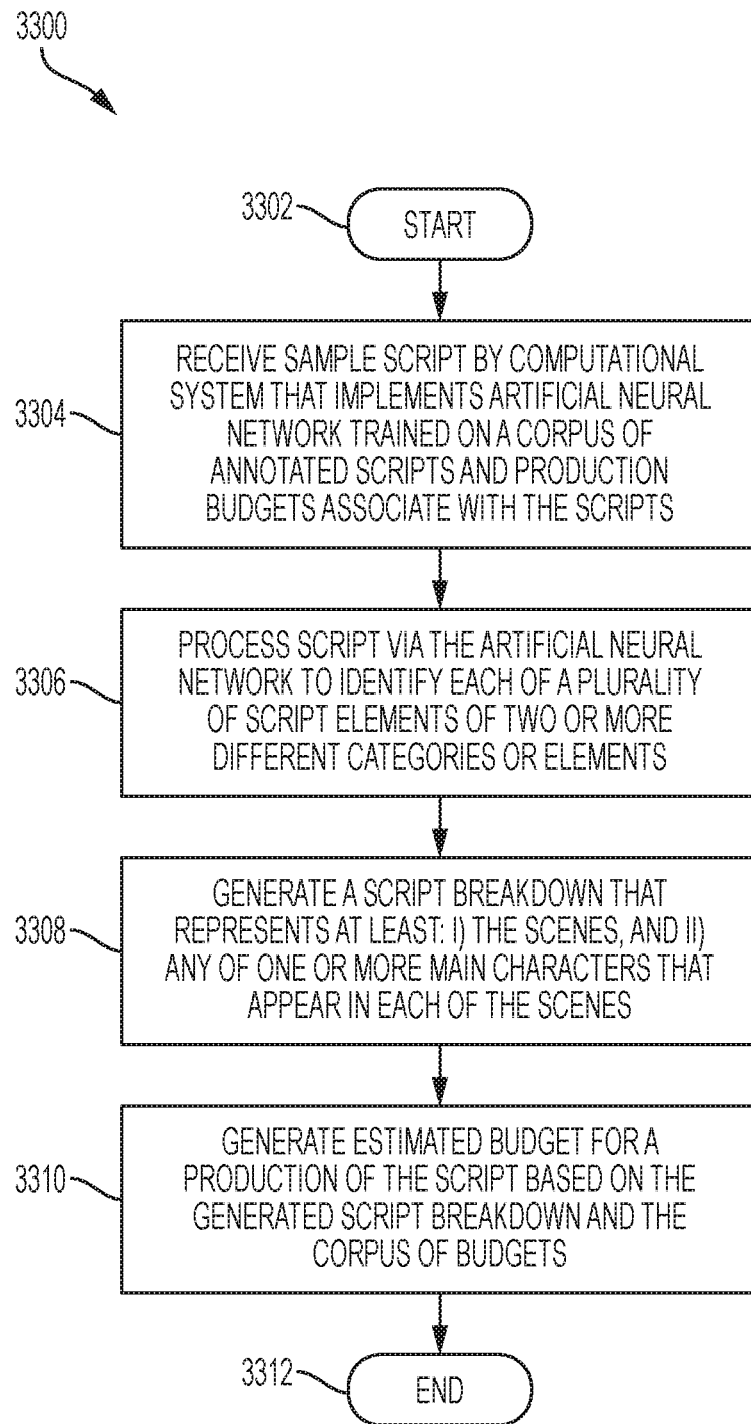
FIG. 33 is a flow diagram showing another method that implements an artificial neural network to perform pre-production operations including script breakdown, according to one illustrated embodiment.

FIG. 33 is a flow diagram showing another method 3300 that implements an artificial neural network to perform pre-production operations including script breakdown, according to one illustrated embodiment. The method 3300 that implements an artificial neural network to perform pre-production operations including script breakdown commences at 3302.

At 3304, the system for automated script generation and media production 200 receives a sample script by a computational system that implements at least one artificial neural network to perform pre-production operations including script breakdown. The computational system may be, or may be part of, the system for automated script generation and media production 200, or may be a separate system remote from the system for automated script generation and media production 200. The at least one artificial neural network is trained on a corpus of one or more annotated scripts or portions of annotated scripts and a corpus of budgets associated with respective productions of one or more of the annotated scripts. The received script includes a plurality of scenes, a number of characters who appear in one or more of the scenes, and dialog that occurs during the scenes.

At 3306, the system for automated script generation and media production 200 processes the sample script via the at least one artificial neural network trained at least on the corpus of the at least one of annotated scripts or annotated portions of scripts to identify each of a plurality of script elements of two or more different categories or elements. The categories of script elements may include at least scenes, characters that appear in one or more scenes, mise en scène elements, and dialog for each of the characters.

At 3308, the system for automated script generation and media production 200 generates a script breakdown that represents at least: i) the scenes, and ii) any of one or more main characters that appear in each of the scenes.

At 3310, the system for automated script generation and media production 200 generates an estimated budget for a production of the script based at least in part on the generated script breakdown and the corpus of budgets. The method 3300 that implements an artificial neural network to perform pre-production operations including script breakdown concludes at 3312.

Figure 34:
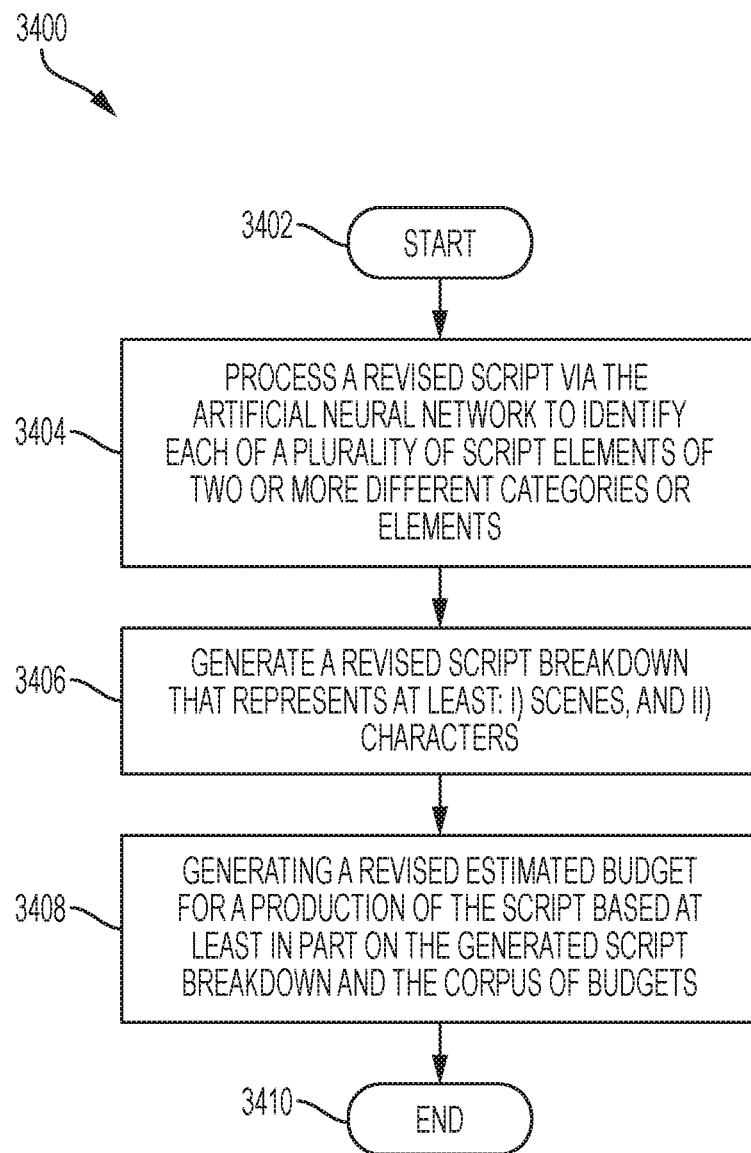
FIG. 34 is a flow diagram showing a method that implements an artificial neural network to perform pre-production operations including script breakdown for revised scripts, according to one illustrated embodiment.

FIG. 34 is a flow diagram showing a method 3400 that implements an artificial neural network to perform pre-production operations including script breakdown for revised scripts, according to one illustrated embodiment. The method 3400 that implements an artificial neural network to perform pre-production operations including script breakdown for revised scripts commences at 3402.

At 3404, the system for automated script generation and media production 200 processing a revised sample script via the at least one artificial neural network is trained at least on the corpus of the at least one of annotated scripts or annotated portions of scripts to identify each of a plurality of script elements of two or more different categories or elements. The categories of script elements may include at least scenes, characters that appear in one or more scenes, mise en scène elements, and dialog for each of the characters.

At 3406, the system for automated script generation and media production 200 generates a revised script breakdown that represents at least: i) the scenes, and ii) any of one or more main characters that appear in each of the scenes.

At 3408, the system for automated script generation and media production 200 generates a revised estimated budget for a production of the script based at least in part on the generated script breakdown and the corpus of budgets. The method 3400 that implements an artificial neural network to perform pre-production operations including script breakdown for revised scripts concludes at 3410.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary media production systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as, hard disk drives, DVD-ROMs, flash memory, and computer memory; and other non-transitory computer-readable storage media.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Provisional Patent No. 62/616,354 and U.S. Provisional Patent No. 62/616,364.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of a computational system that implements at least one artificial neural network to perform pre-production operations including script breakdown, the method comprising:

receiving at least one of a sample script or a portion of a sample script by the computational system, the at least one artificial neural network trained on a corpus of one or more annotated scripts or portions of annotated scripts, the received script or portion of the script including a plurality of scenes, a number of characters who appear in one or more of the scenes, and dialog that occurs during the scenes;

processing the at least one of the sample script or the portion of the sample script via the at least one artificial neural network trained at least on the corpus of the at least one of annotated scripts or annotated portions of scripts to identify each of a plurality of script elements of two or more different categories or elements, the categories of script elements including at least: i) scenes, ii) characters that appear in one or more scenes, iii) mise en scène elements, iv) character interactions, and v) dialog for each of the characters; and generating a script breakdown that represents at least: i) the scenes, ii) any of one or more main characters that appear in each of the scenes, and iv) interactions between the scenes and the any of one or more main characters that appear in each of the scenes.

2. The method of claim 1, further comprising:

processing the at least one of the sample script or the portion of the sample script via the at least one artificial neural network to identify a scene type for each of the scenes, and wherein generating a script breakdown includes generating a script breakdown that represents the scene type of each of the scenes.

3. The method of claim 1, further comprising:

processing the at least one of the sample script or the portion of the sample script via the at least one artificial neural network to estimate a scene length for each of the scenes, and wherein generating a script breakdown includes generating a script breakdown that represents the estimated scene length of each of the scenes.

4. The method of claim 1, further comprising:
processing the at least one of the sample script or the portion of the sample script via the at least one artificial neural network to estimate a number of shots for each of the scenes, and wherein generating a script breakdown includes generating a script breakdown that represents the estimated number of shots for each of the scenes.

5. The method of claim 1 wherein the categories of script elements further includes interactions, and processing the at least one of the sample script or the portion of the sample script via the at least one artificial neural network to identify each of a plurality of script elements of two or more different categories or elements further includes identifying one or more interactions between two or more characters that occur in one or more scenes.

6. The method of claim 5 wherein generating a script breakdown includes generating a script breakdown that represents interactions between characters for one or more scenes.

7. The method of claim 5 wherein generating a script breakdown includes generating a script breakdown that, for each scene, represents interactions between characters that occur in the respective scene.

8. The method of claim 5 wherein generating a script breakdown includes generating a script breakdown that represents which, if any, of the characters interact with one another in the scene.

9. The method of claim 1 wherein generating a script breakdown includes generating a script breakdown that, for each scene, represents any dialog that occurs during the respective scene.

10. The method of claim 1 wherein the categories of script elements further includes props, and processing the at least one of the sample script or the portion of the sample script via the at least one artificial neural network to identify each of a plurality of script elements of two or more different categories or elements further includes identifying one or more props that appear in one or more scenes.

11. The method of claim 1 wherein the categories of script elements further includes audio effects, and processing the at least one of the sample script or the portion of the sample script via the at least one artificial neural network to identify each of a plurality of script elements of two or more different categories or elements further includes identifying one or more audio effects that appear in one or more scenes.

12. The method of claim 1 wherein the categories of script elements further includes visual effects, and processing the at least one of the sample script or the portion of the sample script via the at least one artificial neural network to identify each of a plurality of script elements of two or more different categories or elements further includes identifying one or more visual effects that appear in one or more scenes.

13. The method of claim 1 wherein the categories of script elements further includes audio-visual effects, and processing the at least one of the sample script or the portion of the sample script via the at least one artificial neural network to identify each of a plurality of script elements of two or more different categories or elements further includes identifying one or more audio-visual effects that appears in one or more scenes.

14. The method of claim 1, further comprising:
storing at least one data structure that represents the identified information as a plurality of nodes and a plurality of edges, the edges which respectively define a logical association between respective pairs of the nodes, wherein storing at least one data structure includes storing at least one data structure in which scenes and characters are represented as respective nodes, and respective relationships between respective pairs of the scenes and, or characters, are represented by respective edges.

15. The method of claim 1 wherein processing the at least one of the sample script or the portion of the sample script via the at least one artificial neural network trained at least on the corpus of the at least one of annotated scripts or annotated portions of scripts to identify each of a plurality of script elements includes performing natural language processing on the sample script or portion of the sample script via at least one element of the computational system.

16. The method of claim 1 wherein processing the at least one of the sample script or the portion of the sample script via the at least one artificial neural network trained at least on the corpus of the at least one of annotated scripts or annotated portions of scripts to identify each of a plurality of script elements includes unsupervised processing of the sample script or the portion of the sample script via the at least one artificial neural network.

17. The method of any of claim 1 wherein the at least one artificial neural network is an auto-encoder and processing the at least one of the sample script or the portion of the sample script includes processing the at least one of the sample script or the portion of the sample script via the auto-encoder.

18. The method of claim 1 wherein the auto-encoder is a variational auto-encoder and processing the at least one of the sample script or the portion of the sample script includes processing the at least one of the sample script or the portion of the sample script via the variational auto-encoder with a set of assumptions regarding a distribution of a number of latent variables.

19. The method of claim 1 wherein the at least one artificial neural network is a hierarchical variational auto-encoder comprising a recurrent encoder artificial neural network, and a recurrent decoder artificial neural network with a loss function that is a variational upper bound on a log-likelihood of the corpus of annotated scripts or the portions of annotated scripts, and processing the at least one of the sample script or the portion of the sample script includes processing the at least one of the sample script or the portion of the sample script via the hierarchical variational auto-encoder.

20. The method of claim 1 wherein the at least one artificial neural network is a recurrent artificial neural network and processing the at least one of the sample script or the portion of the sample script includes processing the at least one of the sample script or the portion of the sample script via the recurrent artificial neural network.

21. The method of claim 1 wherein the at least one the artificial neural network is a long short term memory recurrent artificial neural network and processing the at least one of the sample script or the portion of the sample script includes processing the at least one of the sample script or the portion of the sample script via the long short term memory recurrent artificial neural network.

22. The method of claim 21 wherein the long short term memory recurrent artificial neural network comprises two or more of: a generation artificial neural network that generates predictions during a number of iterations, a memory structure that reintroduces previously generated predictions in subsequent iterations of predictions, and a forgetting artificial neural network that determines which of the previously generated predictions are reintroduced by the memory structure in the subsequent iterations of predictions.

23. The method of claim 22 wherein the long short term memory recurrent artificial neural network further comprises one or more of: an ignoring artificial neural network that filters the generated predictions based on relevancy, and a selection artificial neural network that determines which of the generated predictions to release to an output system and which of the predictions to retain internally in the artificial neural networks only for use in the subsequent iterations of predictions.

\* \* \* \* \*